United States Patent [19]

Muramatsu et al.

[11] Patent Number: 4,989,042

[45] Date of Patent: Jan. 29, 1991

[54] IMAGE SYNTHESIZING APPARATUS

[75] Inventors: Masanori Muramatsu, Yokohama; Takashi Sugiura, Tokyo, both of Japan

[73] Assignee: Canon Kabushiki Kaisha, Tokyo, Japan

[21] Appl. No.: 378,482

[22] Filed: Jul. 12, 1989

Related U.S. Application Data

[63] Continuation of Ser. No. 302,085, Jan. 26, 1989, abandoned, which is a continuation of Ser. No. 159,311, Feb. 23, 1988, abandoned.

[30] Foreign Application Priority Data

| | | | |
|---|---|---|---|
| Feb. 26, 1987 | [JP] | Japan | 62-44347 |
| Feb. 27, 1987 | [JP] | Japan | 62-44932 |
| Feb. 27, 1987 | [JP] | Japan | 62-44944 |
| Mar. 3, 1987 | [JP] | Japan | 62-47963 |

[51] Int. Cl.$^5$ ............................................. G03G 15/00
[52] U.S. Cl. ......................................... 355/244; 355/202
[58] Field of Search ..................... 355/244, 202, 218; 346/153.1, 160

[56] References Cited

U.S. PATENT DOCUMENTS

| | | | |
|---|---|---|---|
| 4,194,833 | 3/1980 | Lester et al. | 355/3 R |
| 4,297,022 | 10/1981 | Lester | 355/3 R |
| 4,448,513 | 5/1984 | Hirayama et al. | 355/244 X |
| 4,472,050 | 9/1984 | Stockburger et al. | 355/40 |
| 4,494,862 | 1/1985 | Tanaka | 355/244 X |
| 4,514,081 | 4/1985 | Tamura | 355/244 X |
| 4,551,008 | 11/1985 | Banton | 355/244 X |
| 4,632,538 | 12/1986 | Lemelson et al. | 355/244 X |
| 4,660,961 | 4/1987 | Kuramoto et al. | 355/244 X |
| 4,696,562 | 9/1987 | Urata et al. | 355/244 X |
| 4,761,673 | 8/1988 | Watanabe et al. | 355/218 X |
| 4,774,546 | 9/1988 | Corona et al. | 355/244 X |
| 4,803,520 | 2/1989 | Tomosada et al. | 355/218 |

*Primary Examiner*—R. L. Moses
*Attorney, Agent, or Firm*—Fitzpatrick, Cella, Harper & Scinto

[57] ABSTRACT

There is disclosed a copying machine with a function of superimposing characters on the copy. The characters to be superimposed are selected with a pointer from the characters arranged on a plate member.

52 Claims, 51 Drawing Sheets

FIG. 3B

|  | (0) | (1) | (2) | (3) | (4) | (5) | (6) | (7) | (8) | (9) |
|---|---|---|---|---|---|---|---|---|---|---|
| (00) | A | B | C | D | E | F | G | H | I | J |
| (01) | K | L | M | N | O | P | Q | R | S | T |
| (02) | U | V | W | X | Y | Z | ( | ) | % | & |
| (03) | a | b | c | d | e | f | g | h | i | j |
| (04) | k | l | m | n | o | p | q | r | s | t |
| (05) | u | v | w | x | y | z | " | . | ? | ! |
| (06) | 1 | 2 | 3 | 4 | 5 | 6 | 7 | 8 | 9 | 0 |
| (07) | ア | イ | ウ | エ | オ | ハ | ヒ | フ | ヘ | ホ |
| (08) | カ | キ | ク | ケ | コ | マ | ミ | ム | メ | モ |
| (09) | サ | シ | ス | セ | ソ | ヤ | ユ | ヨ | ワ | ヲ |
| (10) | タ | チ | ツ | テ | ト | ラ | リ | ル | レ | ロ |
| (11) | ナ | ニ | ヌ | ネ | ノ | ャ | ュ | ョ | ッ | ン |
| (12) | ァ | ィ | ゥ | ェ | ォ | 日 | 月 | 年 | ゜ | ゛ |
| (13) | . | ○ | , | ; | : | ・ | ー | / | → | ← |
| (14) | ＊ | ¥ | ☎ | 〒 | 1 | 2 | 3 | BLANK | | |

AUXILIARY CHARACTER (columns 4, 5, 6 of row (14))

FIG. 5A
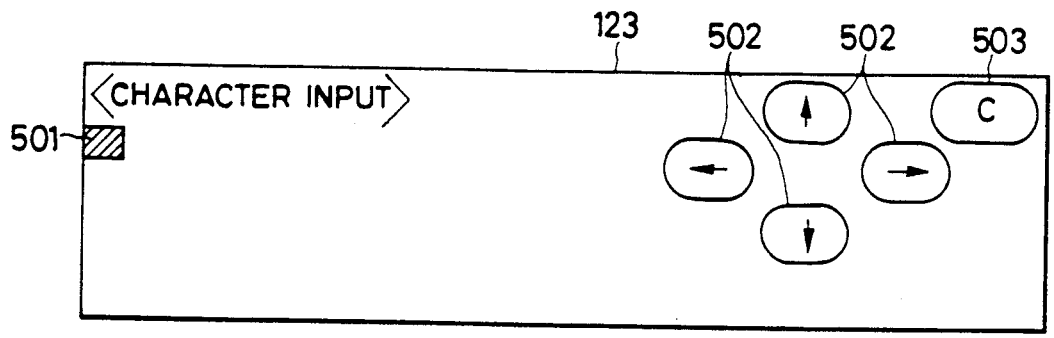
FIG. 5B
FIG. 6
| | |
|---|---|
| 60 | → 1 |
| 68 | → 9 |
| 67 | → 8 |
| 66 | → 7 |
| 149 | → ␣ |
| 0 | → A |
| 1 | → B |
| 23 | → X |
| 24 | → Y |
| 149 | → ␣ |

FIG. 8A
FIG. 8B
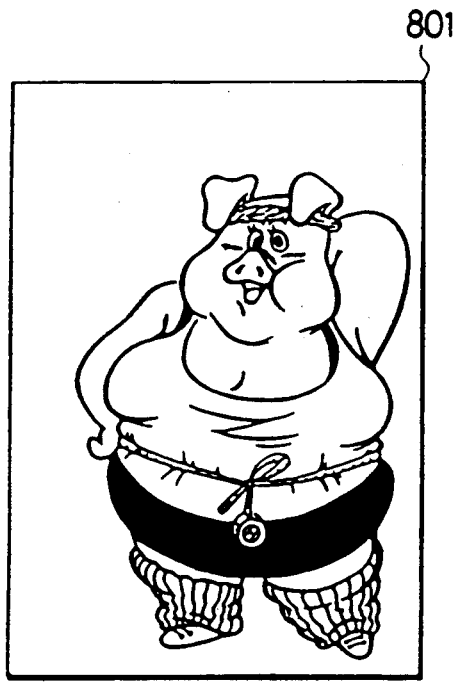
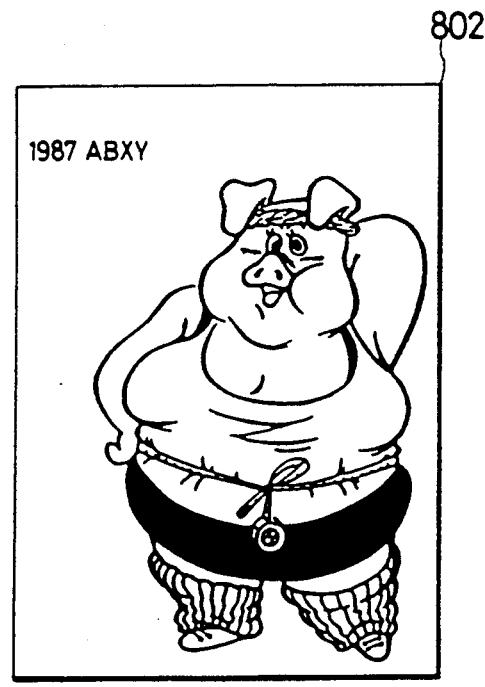

FIG. 13I
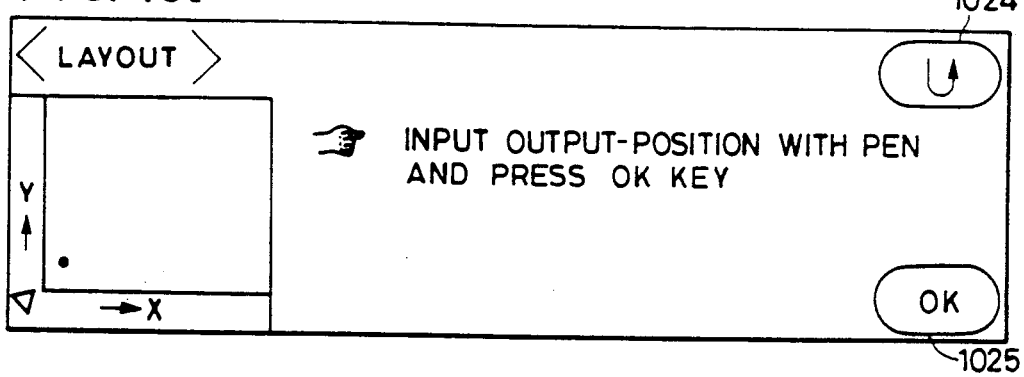
FIG. 25
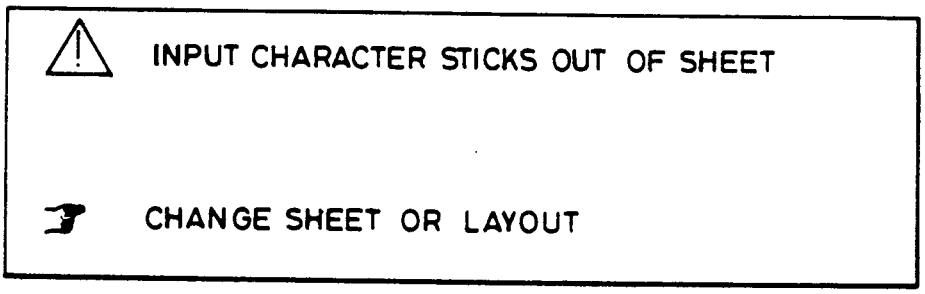
FIG. 26A    FIG. 26B
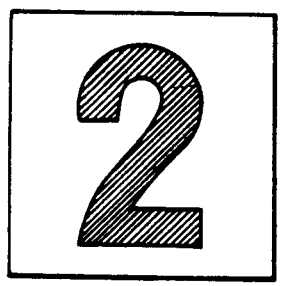 

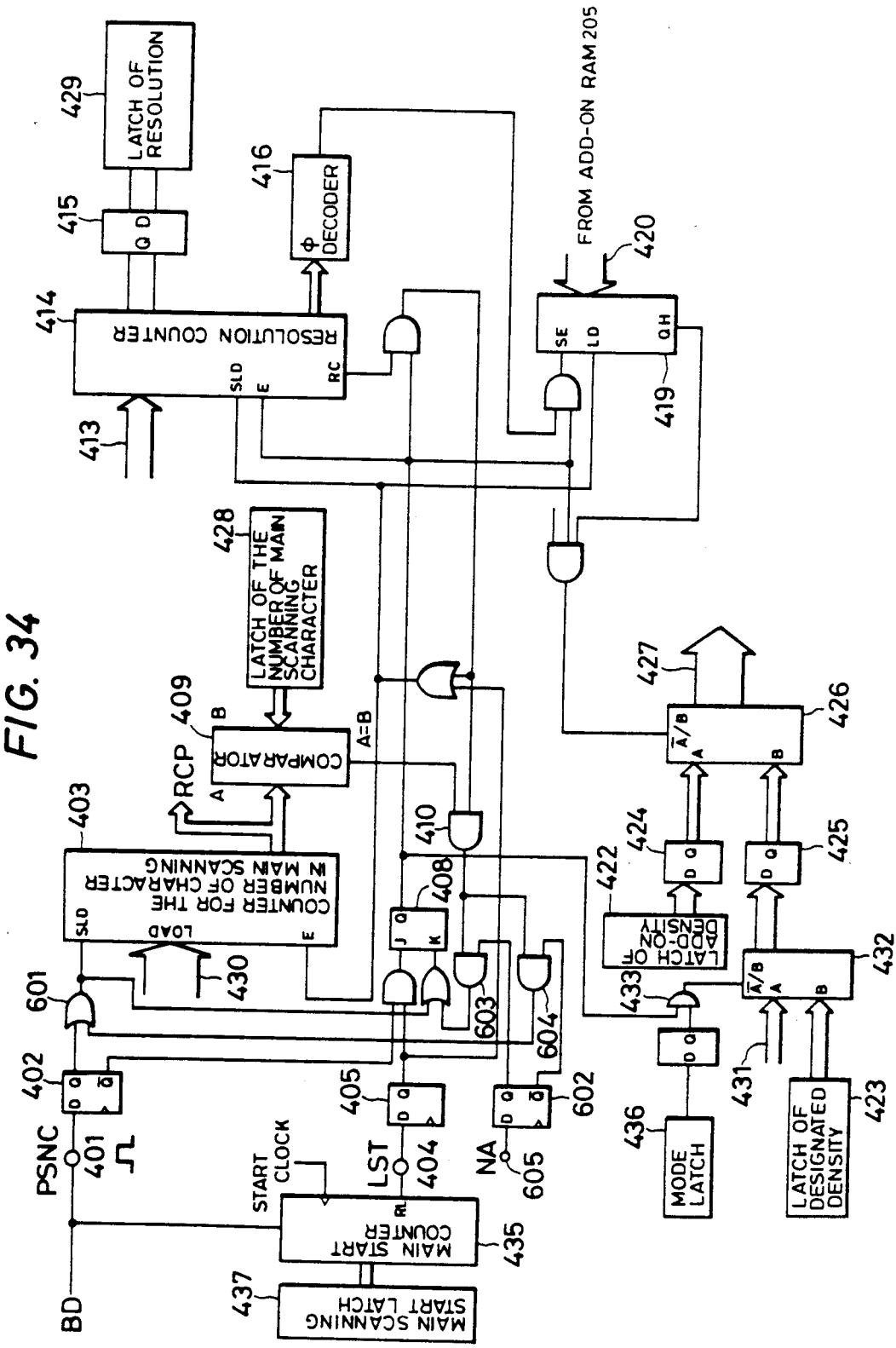

FIG. 36-1  FIG. 36-2  FIG. 36-3
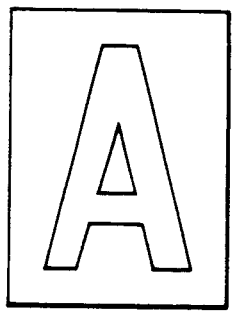 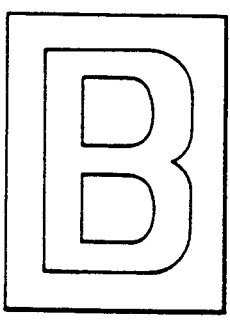 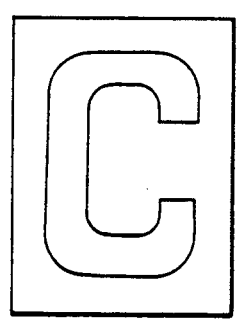
FIG. 36-4  FIG. 36-5  FIG. 36-6
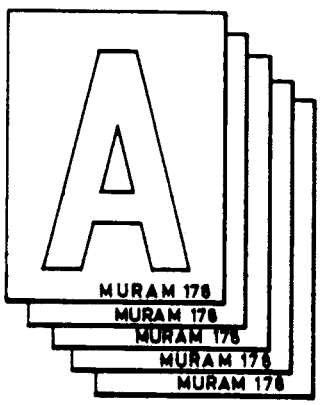 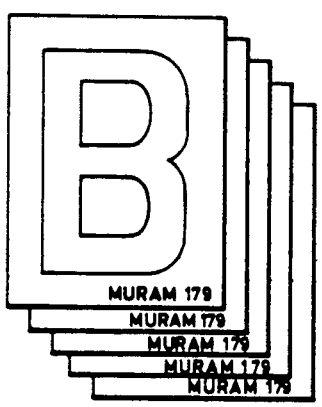 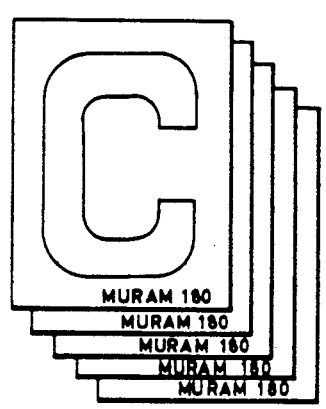

IMAGE SYNTHESIZING APPARATUS

This application is a continuation of application Ser. No. 302,085 filed Jan. 26, 1989, which in turn is a continuation of application Ser. No. 159,311 filed Feb. 23, 1988, both now abandoned.

BACKGROUND OF THE INVENTION

1. Field of the Invention

The present invention relates to an image synthesizing apparatus capable of synthesizing an image and characters.

2. Related Background Art

There has been proposed a so-called digital copying machine for reading an original image and printing an image corresponding thereto. For synthesizing other data with the copied image in such apparatus, it has been necessary to inscribe such data on the original image in advance, or to feed a copy sheet after recording of the original image to the printer unit again for superimposed recording of other data.

Also for synthesizing a predetermined format with the original image, it has been proposed, as disclosed in the U.S. Pat. No. 4,637,791, to read format data from a memory in synchronization with the reading of the original image thereby achieving such image synthesis.

However the output of arbitrary characters with arbitrary density, position and size is difficult and requires a large apparatus such as a work station.

The apparatus capable of superimposing characters on the copied image is also disclosed for example in U.S. Pat. Nos. 4,714,940 and 4,682,190 and the U.S. Pat. application Ser. No. 893,358, but a personal computer or a word processor is required for the input of characters.

The use of such character input equipment not only increases the dimensions of the apparatus but also elevates the cost thereof. Also the character input may be difficult for a beginner.

Also in such copying apparatus there may be conducted an image shifting or zooming process, so that the position of image on the copy may be different from that of the original. Therefore, if the position of synthesis of characters is determined on the original image, the result of synthesis obtained on the copy sheet may be different from what is expected.

Also in a case of copying plural originals in succession on such copying apparatus, it has been difficult to shift upwards the page number starting from a desired number.

SUMMARY OF THE INVENTION

An object of the present invention is to provide an improved image synthesizing apparatus not associated with the drawbacks mentioned above.

Another object of the present invention is to provide an inexpensive image synthesizing apparatus allowing easy input of the patterns to be synthesized, equipped with a flat member on which arranged are plural character patterns for synthesis, wherein the patterns designated on said flat member are synthesized with an original image.

Still another object of the present invention is to provide an image synthesizing apparatus capable of altering the characters to be synthesized with the original image, without difficulty.

Still another object of the present invention is to provide an image synthesizing apparatus capable of satisfactorily synthesizing original information and pattern information regardless of the nature of image processing to be applied to the original information.

Still another object of the present invention is to provide an image synthesizing apparatus capable of synthesizing original images and characters utilizing an automatic original feeder.

The foregoing and still other objects of the present invention will become fully apparent from the following description, to be taken in conjunction with the attached drawings, and from the appended claims.

BRIEF DESCRIPTION OF THE DRAWINGS

FIG. 3B is a magnified view of a character input board of an editer unit;

FIGS. 5A and 5B, 9A to 9M and 11A to 11D are schematic views showing different states of the display unit;

FIG. 6 is a schematic view of a memory map;

FIGS. 8A and 8B are views showing examples of output image;

FIGS. 13A to 13I, 18 and 25 are schematic views showing different states of a liquid crystal display unit;

FIGS. 20A to 20C, and 26A and 26B, are views showing font data;

FIGS. 28-1 to 28-3, 30 and 33-1 and 33-2 are views showing examples of output image;

FIGS. 32-1 and 32-2 are views showing the contents of the add-on RAM;

FIG. 34 is a block diagram of an add-on image generating circuit;

FIGS. 36-1 to 36-6 are views showing examples of image processing;

FIGS. 37-1 to 37-4 are views showing different states of a liquid crystal display unit;

FIGS. 39-1 and 39-2 are views showing the content of an add-on display RAM.

DETAILED DESCRIPTION OF THE PREFERRED EMBODIMENTS

Now the present invention will be clarified in detail by description of the preferred embodiments thereof.

Figure 1:
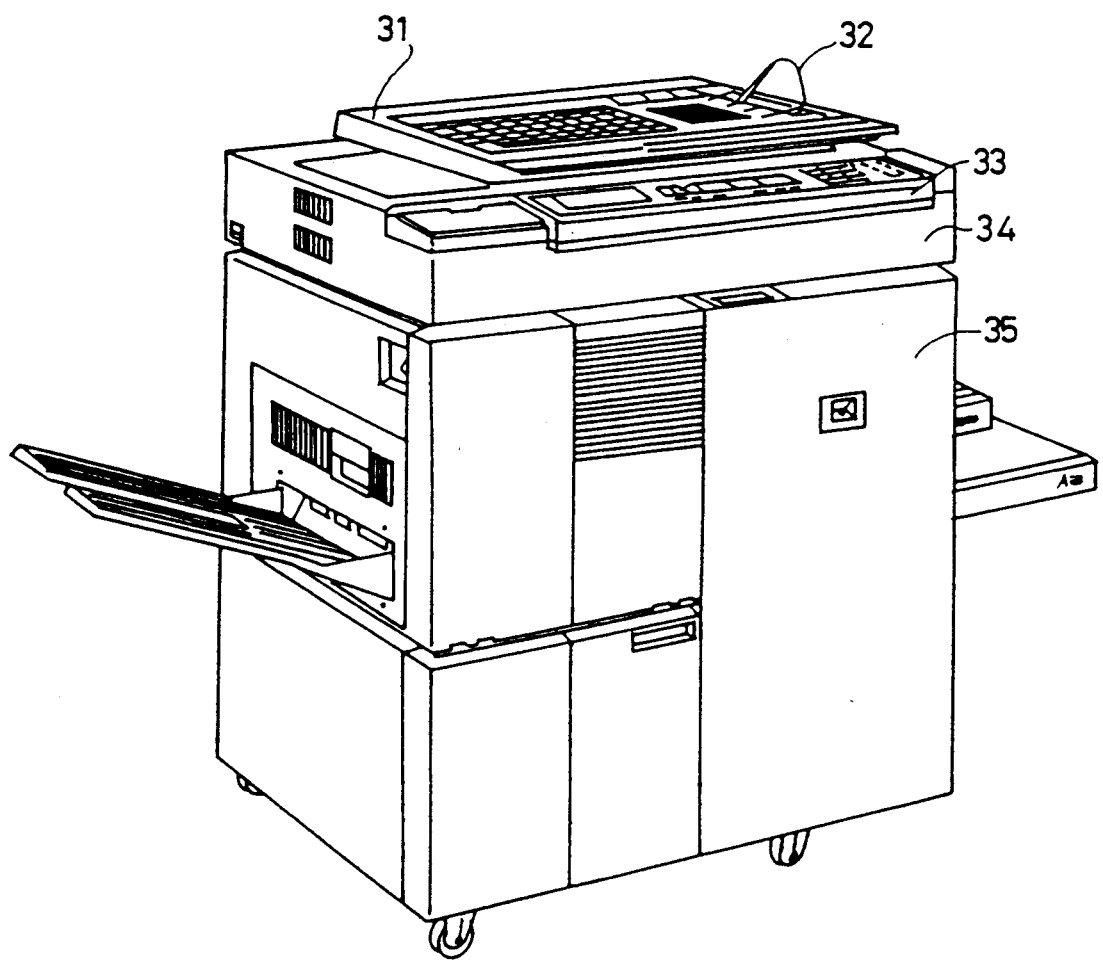
FIG. 1 is an external view of a copying apparatus embodying the present invention.

FIG. 1 is an external view of a copying apparatus embodying the present invention, wherein are provided an editer 31 used for point setting or mode setting; an electronic pointer 32 for point input on said editer 31; an operation unit 33 for setting various modes; a reader unit 34 for reading the original image; and a printer unit 35 for printing the image read by the reader unit 34.

Figure 2:
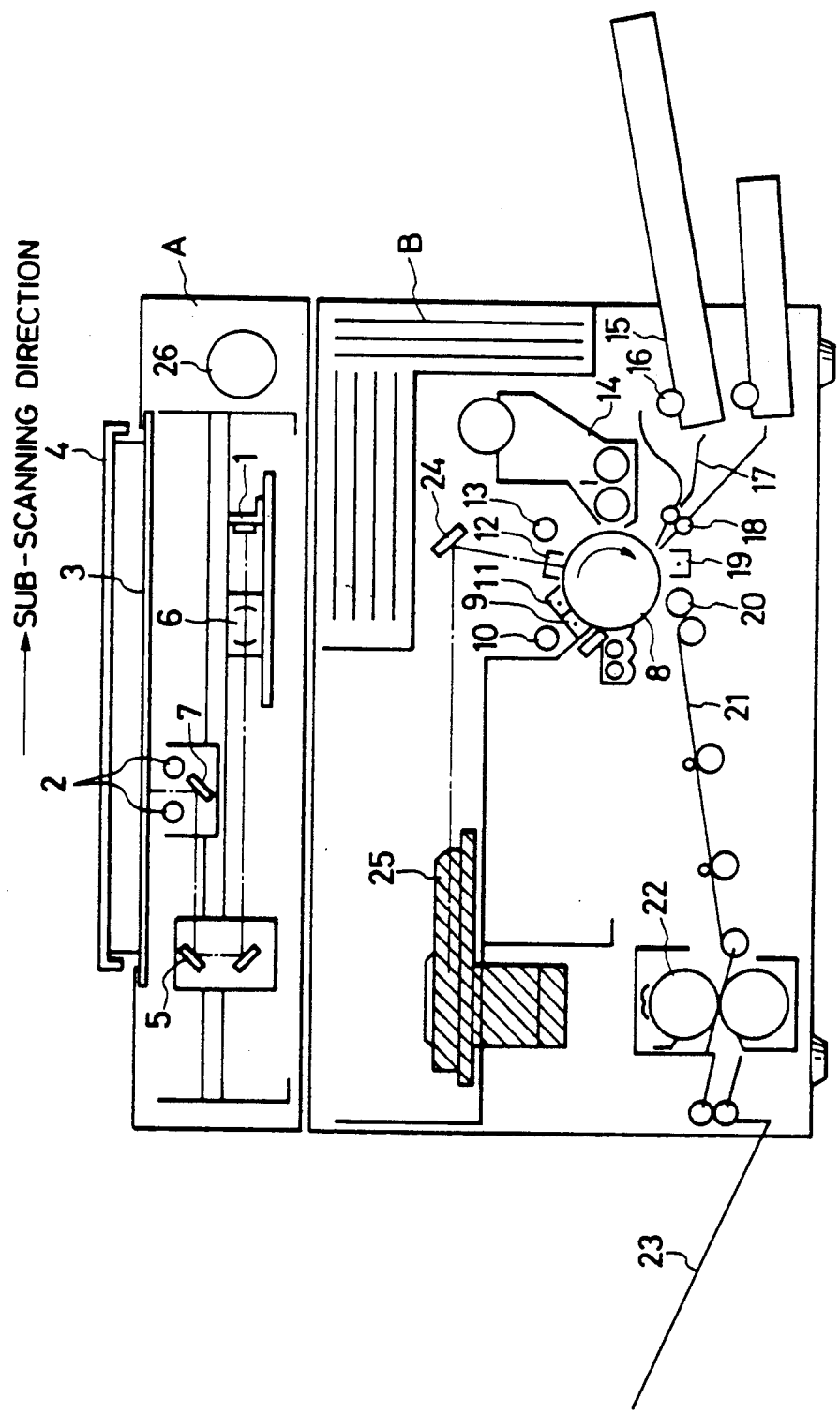
FIG. 2 is a schematic cross-sectional view of the copying apparatus.

FIG. 2 is a cross-sectional view of the reader unit A and the printer unit B. An original is placed, with its face down, on a support glass plate 3, and is pressed there against with an original cover 4. The original is illuminated by a fluorescent lamp 2, and the reflected light is guided through mirrors 5, 7 and a lens 6, and is focused on a CCD 1.

The mirrors 5 and 7 are moved with a relative speed ratio 2:1. These optical system components move forward, from left to right, with a speed corresponding to the image reading magnification, under a phase locked loop control by a DC servo motor 26.

A reverse movement, from right to left, is made with a constant speed regardless of the image magnification. The reader unit A can accommodate an original of A3 size at maximum. Since the resolving power is 400 dots/inch, there is employed a CCD of about 5,000 pixels.

An image signal, representing the image density, is obtained by the successive line scannings of the original image with the CCD 1 while the image reading position is moved by the mirrors 5, 7.

The bit-serial image signal obtained in the reader unit A is supplied to a laser scanning unit 25 of the printer B. Said unit 25 is composed of a semiconductor laser, a collimating lens, a rotary polygon mirror, an F-$\theta$ lens, and an image inclination correcting optical system.

The image signal from the reader A is supplied to the semiconductor laser and converted into a light beam, which is introduced through the collimating lens into the polygon mirror rotated at a high speed, and the light reflected therefrom scans a photosensitive member 8. Said photosensitive member 8 is associated with image forming process components including a charge pre-eliminator 9; a charge pre-eliminating lamp 10, a primary charger 11; a secondary charger 12; a flush exposure lamp 13; a developing unit 14; a sheet cassette 15; a sheet feeding roller 16; sheet guide members 17; registration rollers 18; a transfer charger 19; a separating roller 20; a conveyor guide 21; a fixing unit 22; and a tray 23. The photosensitive member 8 and the conveyor are driven at a speed of 180 mm/sec. Thus the printer B constitutes a so-called laser beam printer.

Outside the photosensitive member 8, there is provided an unrepresented photosensor for detecting the laser beam put into the scanning motion by the unit 25, and a horizontal synchronization signal BD, indicating the start of each horizontal scanning motion of the laser beam, is obtained from the output of said photosensor.

The copying apparatus of the present embodiment has so-called intelligent image editing functions, including synthesis of arbitrary characters or symbols with the read image, image zooming with an image magnification variable with a pitch of 1% within a range from 0.35 to 4.0 times, a trimming function for extracting a designated image area, and an image shifting function for shifting the trimmed image to an arbitrary position on the sheet.

Figure 3A:
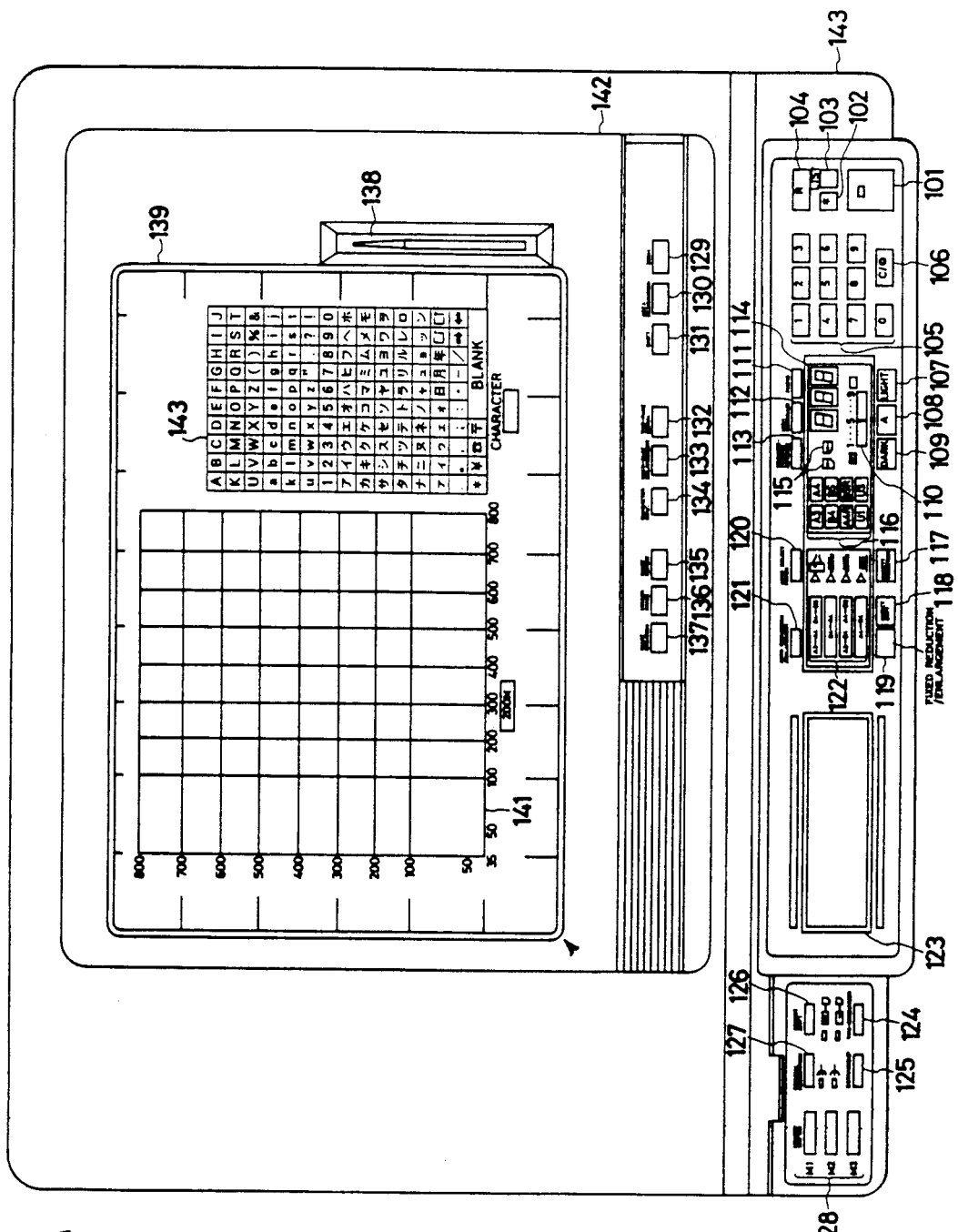
FIG. 3A is a plan view of a reader unit.

FIG. 3A is a plan view of the original reader unit, composed of an operation unit 143 and an original cover 142 having the editer thereon.

The operation unit 143 is connected to the original reader, and also displays the information of the unrepresented printer unit, which forms an image according to the image information.

A start key 101 starts the original reading.

An asterisk key 102 is used for setting service modes. A recall key 103 is used for recalling a copy mode previously used. A reset key 104 is used for restoring various settings to a standard mode. Numeral keys 105 are used for example for entering the number of desired copies.

A clear/stop key 106 is used for clearing the number of copies designated by said numeral keys, and for stopping the copying operation. Exposure control keys 107, 108, 109 select manual exposure control or automatic exposure control (AE) of the copy, and the selected mode is displayed on an indicator 110.

A photo mode key 111 is used for making a copy from a photograph original. A high contrast key 112 is used for making a copy with an enhanced image contrast. A negative/positive inversion key 113 is used for making a copy with inverted black and white levels.

A copy number display 114 displays the set number of copies, and, in the course of a copying operation, the remaining number of copies to be made. An indicator 115 indicates the placing direction of the original, determined from the image magnification and the sheet size. An indicator 116 indicates the size of the sheets set in the printer. A cassette selection key 117 selects the sheet feeding units of the printer. A direct copy key 118, a fixed ratio key 119 and an automatic reduce/enlarge key 120 select the image magnification of a reduced or enlarged copy; and indicators 122 displays the size changes in the reduced or enlarged copying with fixed ratio.

An automatic sheet selection key 120 is used for automatic sheet size selection according to the original size. A liquid crystal display unit 123 has a capacity of 240×64 dots, and displays various information under the control of a microcomputer to be explained later.

Said liquid crystal display unit 123 is covered by a transparent touch panel, incorporating transparent switches arranged in a 4×10 matrix, whereby a position designated by a finger or the like can be transmitted and identified by the microcomputer. A two-sided/ overlay key 124 is used for selecting a two-sided/ overlay operation in the printer. A sort/collate key 125 is used for selecting the operating mode of a sorter to be connected to the printer. A center shifting key 126 is used for obtaining a copy with the image shifted to be center of the sheet. An automatic original recognition key 127 is used for selecting whether or not automatic recognition of the original size is to be carried out.

Memory keys 128 are used for storing and recalling various operation modes in collective manner.

The original cover plate 142 is used for pressing the original placed on an unrepresented copy board, and is provided with an operation unit for setting various copying modes and entering the characters, numerals, symbols, etc.

A digitizer 139 transmits the coordinate data, selected by an electronic pointer 138, to the microcomputer, and said coordinate data are recognized, in combination with the operation mode, as positional information on the original or reproduction ratio information entered from a zoom scale input board 141, or character information entered from a character list board 143. As the reproduction ratio is obtained from the coordinate values by conversion with the microcomputer, the scale of reproduction ratio can be enlarged in a desired range as illustrated (in the present embodiment a range from 35 to 100% is expanded).

A zoom key 129 is used for determining the reproduction ratio, which is designated by the electronic pointer 138 on the zoom scale input board 141 after said zoom key is actuated.

An area designation key 130 is used for designating an area of image editing. An arbitrary area can be selected by designation, with the electronic pointer 138 on the zoom scale input board 141, of the position of desired image editing on the original, after said key is actuated.

A shift key 131 is used for shifting the image. After said key is actuated, a desired position to which the image is to be shifted is designated either by the electronic pointer 138 on the zoom scale input board 141, or with the touch panel 123.

A two-page serial copy key 132 is used in case of printing an original image into a plural sheets.

A multi-page enlargement key 133 is used in a case of printing an enlarged image of the original onto plural sheets.

A mirror image key 136 is used in a case of inverting the original image in the main scanning direction.

An image create key 137 is used for various image editing, for example in a case of forming italic characters.

A character input key 134 is used in a case of inserting characters, numeral, symbols, etc. into the image of the original. Said characters, numerals, symbols, etc. are designated with the electronic pointer 138 on the character list board 143, after said key is depressed.

An image repeat key 135 is used for recording the image of the entire original or a trimmed image, plural times on the same recording sheet.

FIG. 3B shows the character list board 143, which contains, as illustrated, upper-case alphabet keys (A, B, C, ... Z), lower-case alphabet keys (a, b, c,... z), numeral keys (1, 2, 3, ..., 0), large katakana keys ( ７ １ ７ , .. , ７ ) small katakana keys ( ７ ４ ７ ... ７ ・ ), kanji keys (a 月, 丸 · etc), symbol keys ((,), %, ?, /, ...), auxiliary character keys corresponding to three other characters to be arbitrarily registered, and a space key, and any desired character can be selected by depressing a desired key with the electronic pointer 138.

The characters corresponding to the above-mentioned keys are given sequential codes from 0 to 147 in such a manner that the characters "A, B, C, ..., J" in the first row are respectively given codes "0, 1, 2, ..., 9" while the characters "K, L, M, ... T" in the second row are respectively given codes "10, 11, 12, ..., 19". In FIG. 3B, the numerals (0), (1), (2), ..., (9) indicate the lowest digit of said codes while those (00), (01), (02), ..., (14) indicate the upper two digits of said codes.

Figure 4:
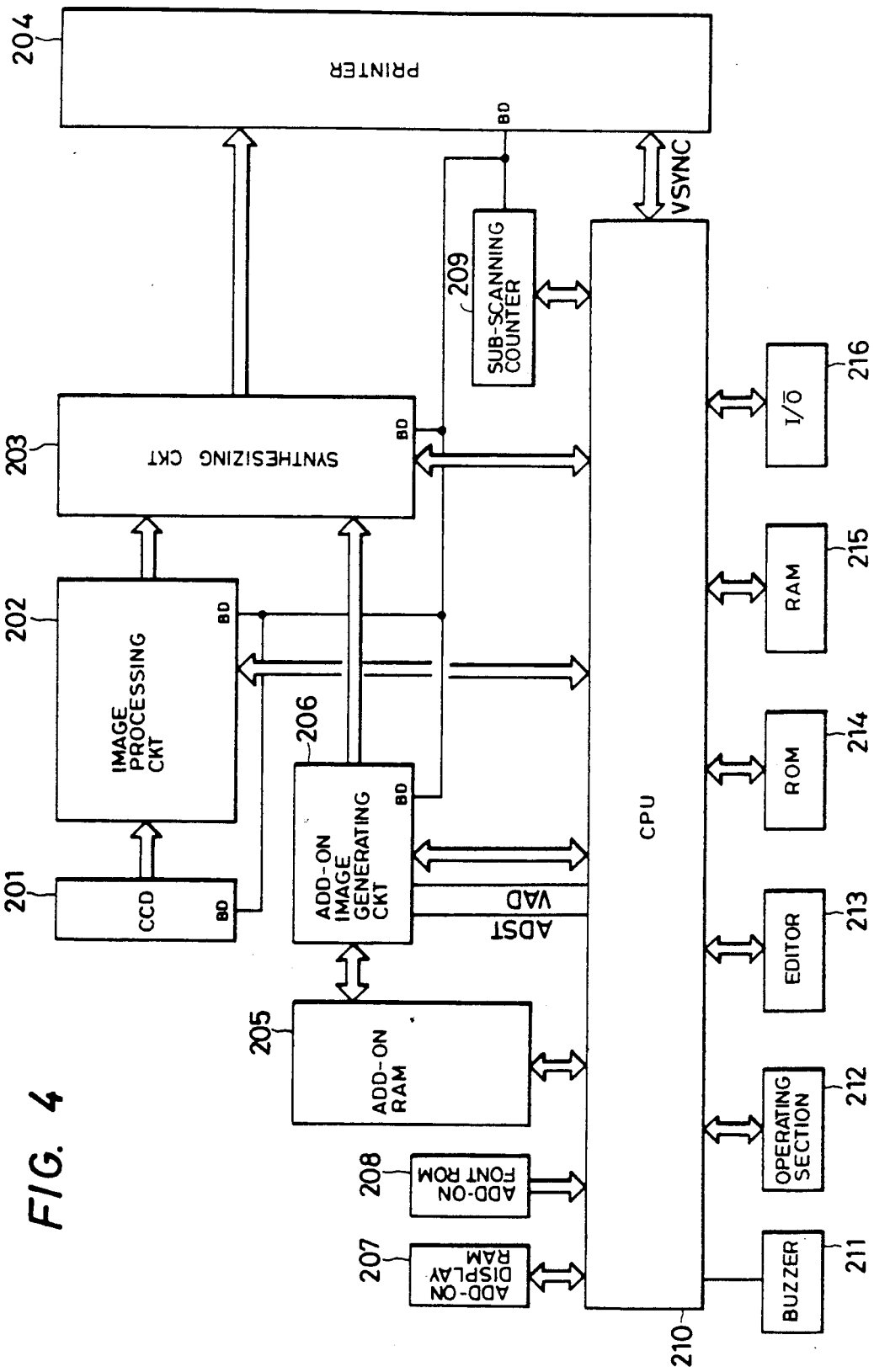
FIG. 4 is a block diagram showing the circuit structure of the copying apparatus.

FIG. 4 is a block diagram of a control unit of the copying apparatus shown in FIG. 1.

A CCD 201, corresponding to the CCD 1 shown in FIG. 2, converts the image of the original on the original support plate 3 into an image signal. An image processing circuit 202 applies, to the image signal from the CCD 201, a shading correction for correcting the unevenness of the output, a gamma correction for correcting the density characteristic, etc. There are further provided an add-on display RAM 207 for storing the code data of the characters and symbols to be superimposed or added on the copy; an add-on front ROM 208 for providing dot data representing characters corresponding to said code data; and add-on RAM 205 for storing the dot data supplied from the add-on font ROM 208; an add-on image generating circuit 206 for generating, in response to an add-on start signal ADST, add-on image data to be inserted into the image of the original by controlling the output of the dot data stored in said add-on RAM; a synthesizing circuit 203 for synthesizing the original image data from the image processing circuit 202 and the add-on image data from the add-on image generating circuit 206; and a printer 204 for effecting a printing operation according to the image data supplied from the synthesizing circuit 203.

A control unit or CPU 210 controls the function of the blocks of the reader, through a RAM 215 and an I/O port 216, according to a program stored in a ROM 214.

There are further shown an editor provided on the original cover plate 142; an operation unit 212 corresponding to that shown in FIG. 3A; a buzzer for giving a sound alarm to the operator; and a sub-scanning counter 209 for counting the recording lines of the printer.

The above-explained structure allows one to obtain, as shown in FIG. 8, an image (FIG. 8B) by inserting characters, symbols, etc. of an arbitrary size in a desired position of the original image (FIG. 8A) read by the reader.

Figure 7:
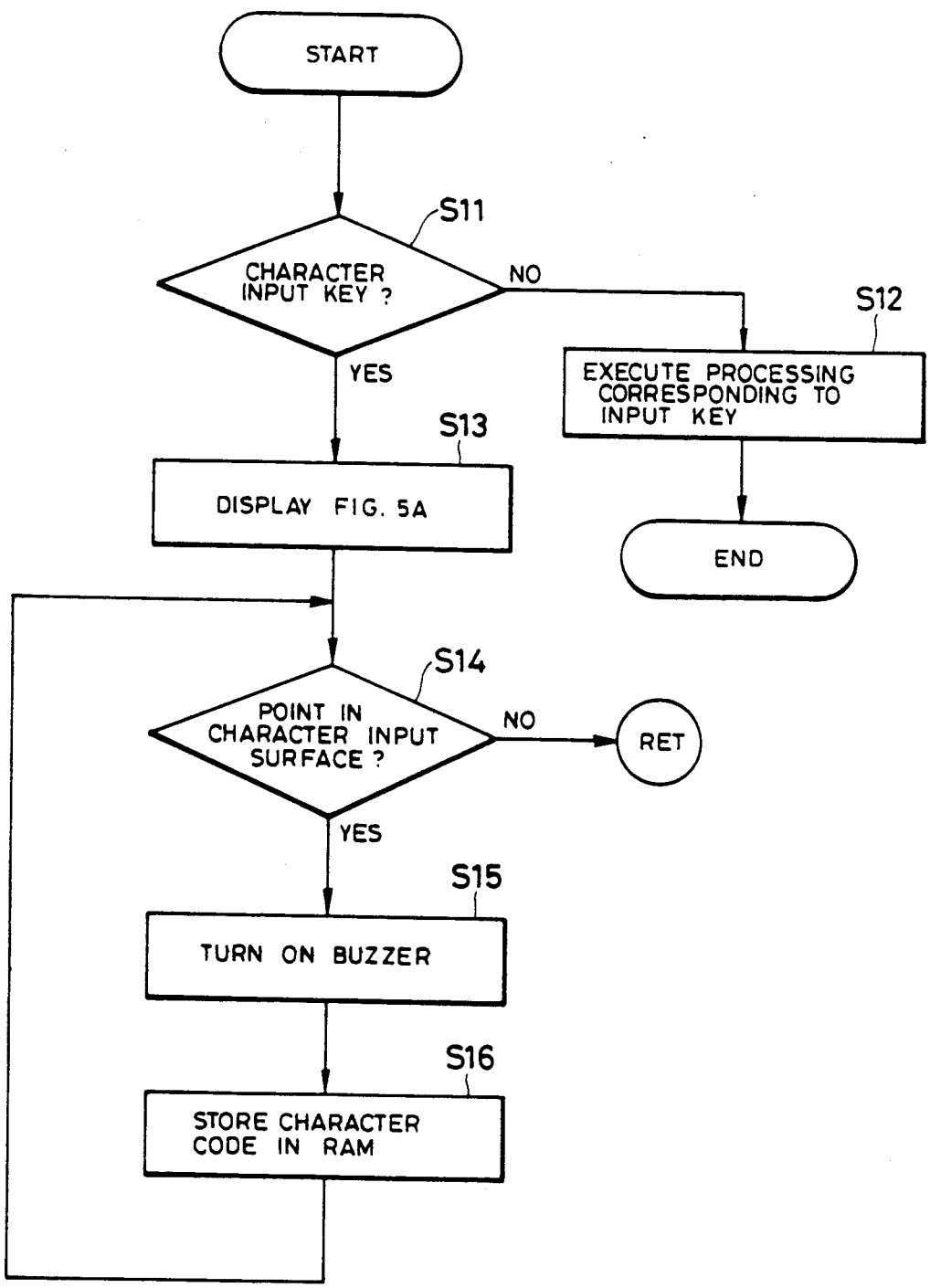
FIGS. 7 and 12 are flow charts showing control sequences.

FIG. 7 is a flow chart showing the control sequence for character input to be executed by the CPU 210.

In the following there will be explained the method of setting various modes by means of the editor and the operation unit, while making reference to FIG. 7.

When the character input key 134 of the editor is depressed (S11), the liquid crystal display unit 123 shows a display shown in FIG. 5A (S13). A cursor 501 flashes at a display position corresponding to the character input, and said cursor can be moved vertically or horizontally by pushing one of four displayed cursor moving keys 502.

The operator can correct a mistaken character input by moving the cursor 501 to such mistaken character and entering the correct character. Also all the displayed characters are erased by pushing a displayed clear key 503.

The input of characters with the editor 213 is executed in the following manner.

The position pointed by the electronic pointer 138 on the editor 213 is transmitted to the CPU 210 through serial communication between the CPU 210 and the editor 213. When the operator points to a position on the editor 213 with the pointer 138, the CPU 210 discriminates whether the coordinate information of the point from the editor 213 is within the character input board 143 (S14). If the indicated position is within the character input board 143, the buzzer 39 generates a beeping sound to inform the operator of a character input (S15). Then a code corresponding to the character is determined (for example 0 for "A", 1 for "B", ... as shown in FIG. 3B) and stored in the add-on display RAM 207 (S16). A character corresponding to the code stored in the add-on display RAM 207 is displayed, and the cursor is normally shifted to right by a digit. If the cursor is at the right-end position, it is moved to the left-end position of the next row. The characters to be added on the original image are entered in this manner, and the liquid crystal display unit 123 gives a display as shown in FIG. 5B.

FIG. 6 shows contents of the add-on display RAM 207 corresponding to the display shown in FIG. 5B.

In this state, the characters entered as explained above are merely stored in the form of codes in the add-on display RAM 207, and do not have the characteristics of image information.

When the start of an image forming operation is instructed by the start key 7, the CPU 210 reads the font information corresponding to the codes stored in the add-on display RAM 207, and develops said font information in the add-on RAM 205. In this state the add-on RAM 205 merely stores the font information of the entered characters in successive order, so that image information cannot be obtained by direct reading of the add-on RAM 205. Consequently the CPU 210 sets various parameters such as the number of characters in the horizontal direction, number of characters in the vertical direction, number of dots constituting each character in the font, character size, etc. in the add-on image generating circuit 206, whereby proper image information can be obtained by reading the font information stored in the add-on RAM 205 through said add-on image generating circuit 206.

After the development of the font information in the add-on RAm 205 and the parameter setting in the add-on image generating circuit 206, the CPU 210 moves the optical system of the reader in the sub-scanning direction to read the original. The CCD 201 executes photoelectric conversion while the image processing circuit 202 executes image processing such as shading correction and gamma correction, and the synthesizing circuit 203 synthesizes the image data of the characters from the add-on image generating circuit 206 and the image data of the original for supply to the printer 204.

In this manner is obtained a print 802 as shown in FIG. 8B, in which the character information displayed as shown in FIG. 5B is synthesized with the original image 801.

In the following there will be explained a zoom mode. In response to the depression of the zoom mode key 129, there is given a display shown in FIG. 9A. In a case of entering the reproduction ratio from the liquid crystal display unit 123, the touch panel input key 900 is depressed to alter the display to a state shown in FIG. 9B. Thus the reproduction ratio is set by an X-down key 902, an X-auto key 903, an X-up key 904, a Y-down key 905, a Y-auto key 906, a Y-up key 907, an XY-down key 908, an XY-auto key 909, and an XY-up key 910, in the X- and Y-directions.

Figure 9A:
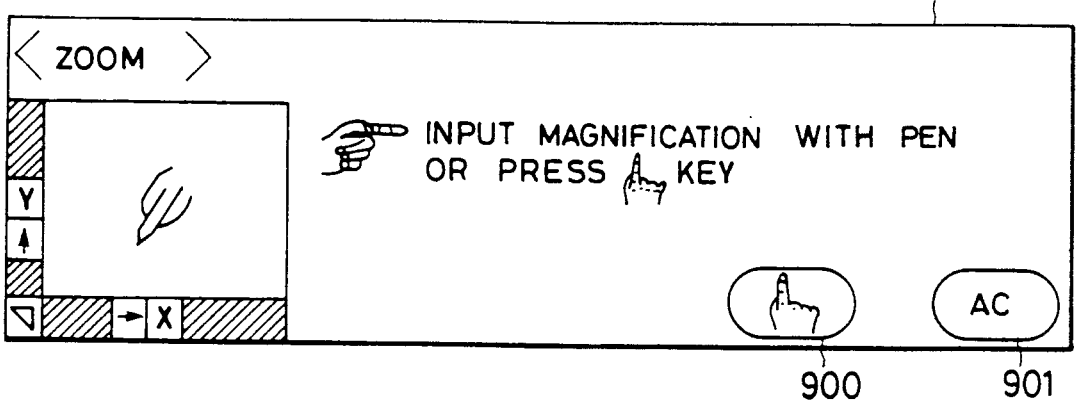
Figure 9B:
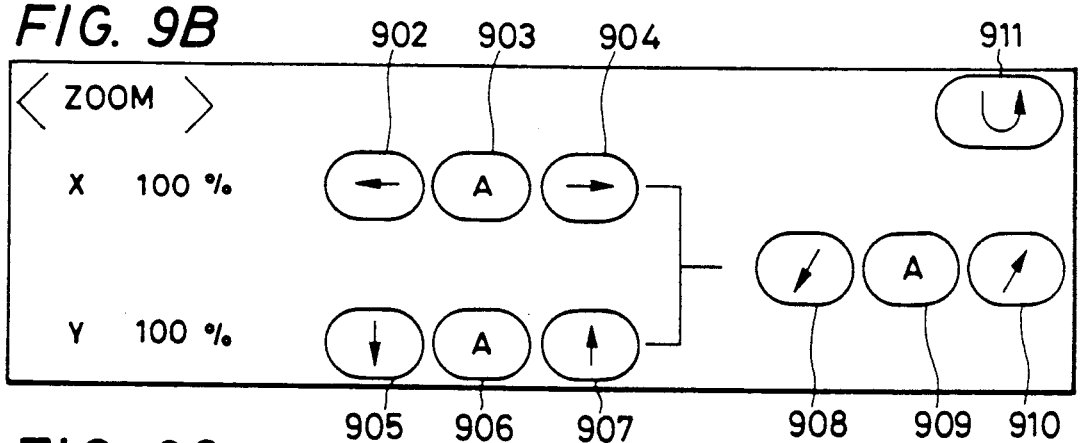

Also in the display state shown in FIG. 9A, by pointing a zoom scale of the zoom scale input board 141 on the editor 213 with the pointer 138, the CPU 210 converts the coordinate data into a reproduction ratio corresponding to the zoom scale, and alters the display to a state shown in FIG. 9B, thereby displaying the entered reproduction ratio.

Figure 9C:
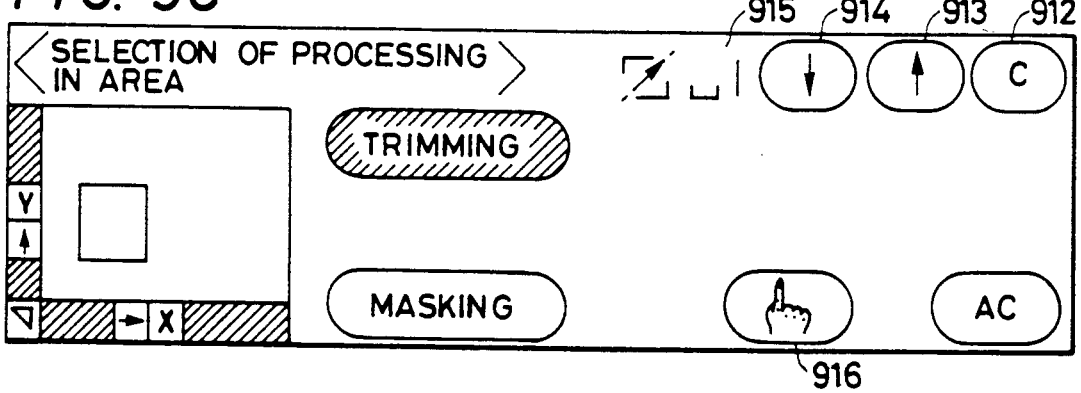
Figure 9D:
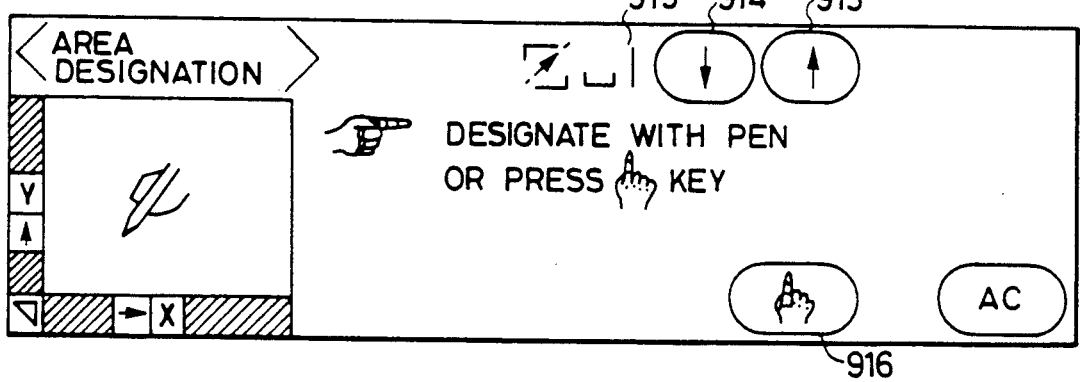

In the following there will be explained an area designating mode. In the present embodiment there can be entered three rectangular areas at maximum on a single original, and, in response to the depression of the area designating key 130, there is obtained a display shown in FIG. 9C if an area has been set corresponding to the area number (1, 2 or 3) displayed at said depression, or a display shown in FIG. 9D if such area has not been set. In FIG. 9C, there are shown an area clear key 912 for clearing the presently displayed area; an area up key 913 for shifting up the area number; an area down key 914 for shifting down the area number; and an area number 915.

Figure 9E:
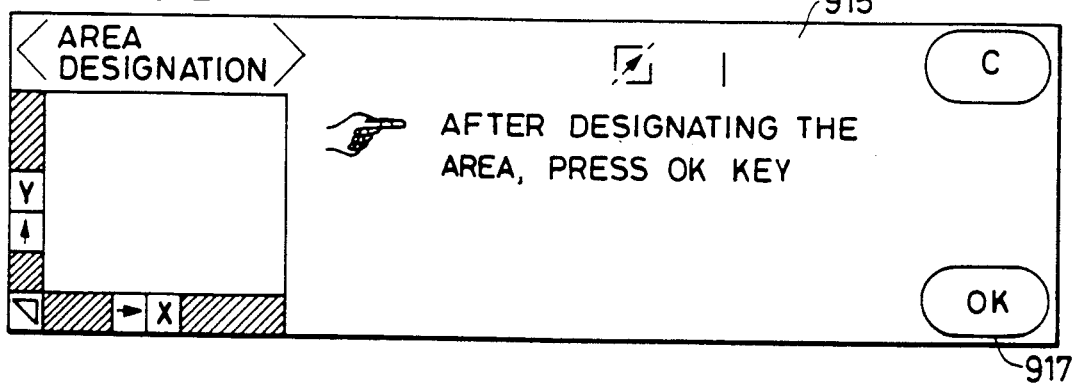
Figure 9F:
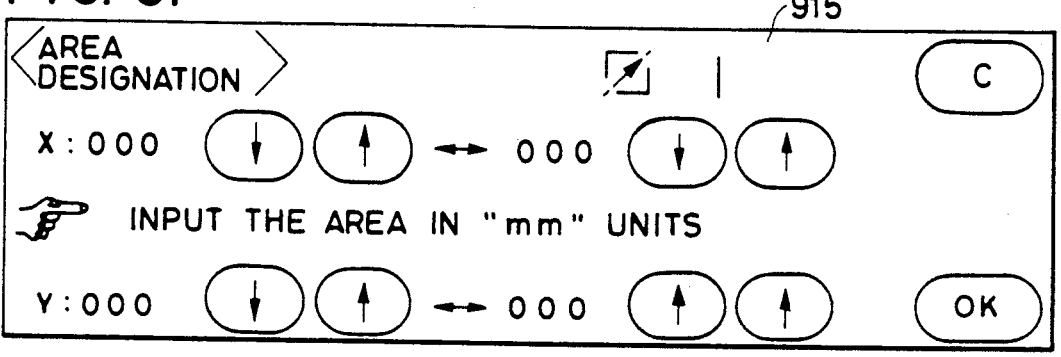

In response to the depression of the area up key 913 in the illustrated state, if another area has been registered, the display shown in FIG. 9C changes the area number 915 to "2" and also shows a trimming or a masking mode and an area corresponding to the set values at the left-hand side of the liquid crystal display unit 123. If such other area has not been registered, the display changes to a state shown in FIG. 9D, with an area number "2". If a touch panel input key 916 is depressed in a state shown in FIG. 9C or 9D, the display changes to a state shown in FIG. 9F to enable correction of points of the entered area in units of millimeters, or registration of a new area with the liquid crystal display unit 123. If one of the diagonal points of an area is entered in a display state shown in FIG. 9D, the display changes to a state shown in FIG. 9E. When an OK key 917 is depressed after the entry of the other point, a new area is registered and the display changes to a state shown in FIG. 9C.

Figure 9G:
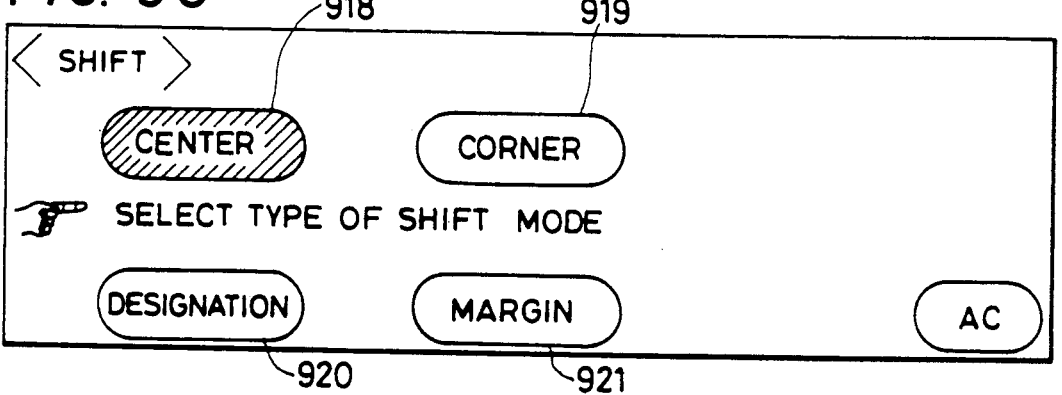

In the following there will be explained a shifting mode. In response to the depression of the shift key 131, the liquid crystal display unit 123 gives a display shown in FIG. 9G.

Figure 9H:
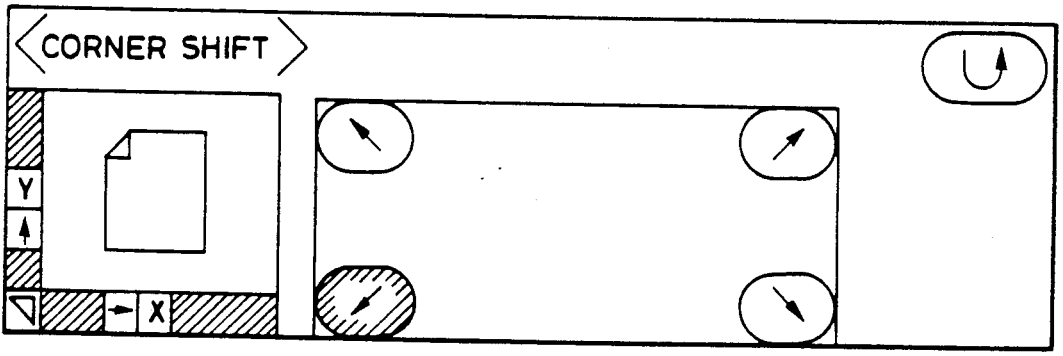
Figure 9I:
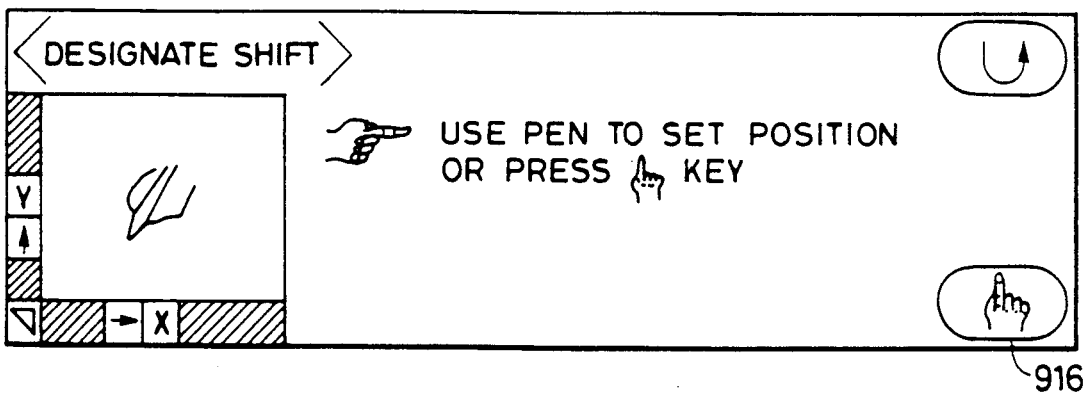
Figure 9J:
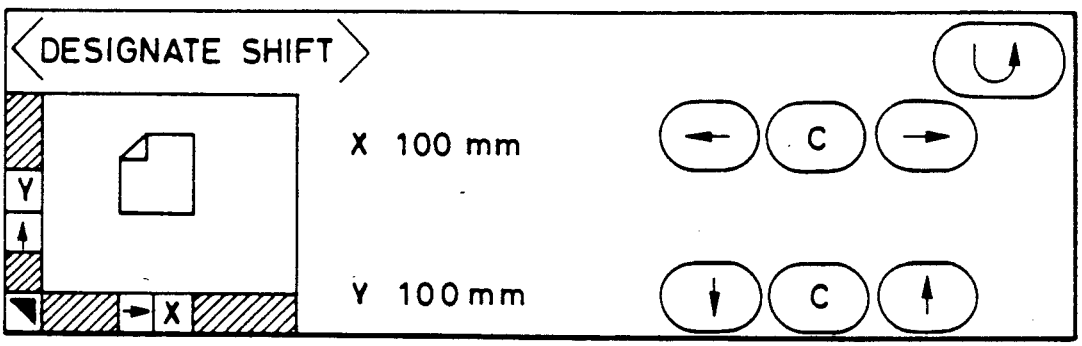
Figure 9K:
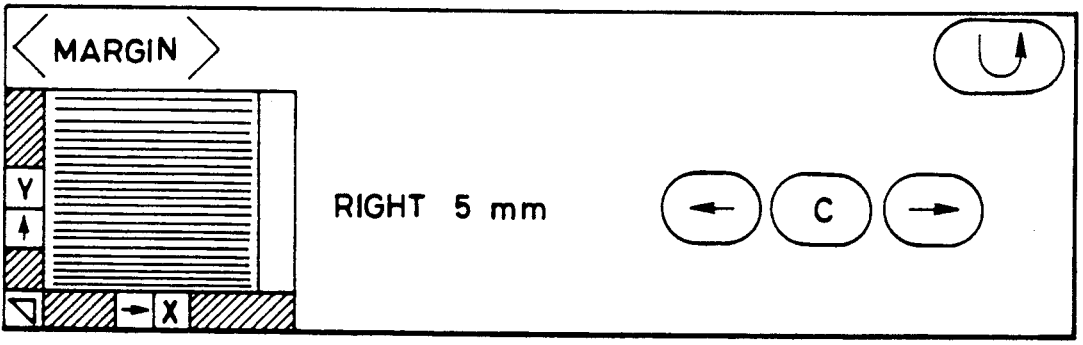

The operator depresses one of a center key 918, a corner key 919, a designated shift key 920, or a margin key 921, and a display shown in FIG. 9H, 9I or 9K is obtained corresponding respectively to the last three cases.

In a display state shown in FIG. 9H, the operator can designate the kind of corner shifting. In a display state shown in FIG. 9I, the display changes to a state shown in FIG. 9J by designating the destination of shift on the editor 213 or by depressing the touch panel input key 916, thereby enabling a correction of the point designated on the editor 213 or a new entry. Also in a display state shown in FIG. 9K, there can be set the amount of margin or of image shift in the margin mode.

Figure 9L:
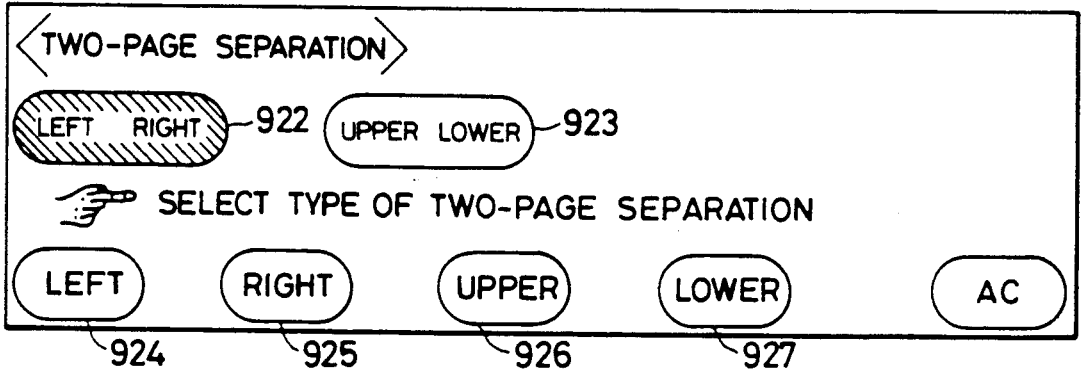

In the following there will be explained a page serial mode. Upon depression of the page serial key 132, there is obtained a display shown in FIG. 9L. In this state there can be selected a left-right page serial mode or an upper-lower page serial mode, in which the left half and right half, or upper half and lower half, of the read original are respectively recorded on separate sheets, or a left page serial mode, a right page serial mode, an upper half serial mode or a lower half serial mode in which the left half, right half, upper half or lower half alone of the original is recorded on a sheet can be selected respectively by page serial mode keys 922-927.

Figure 9M:
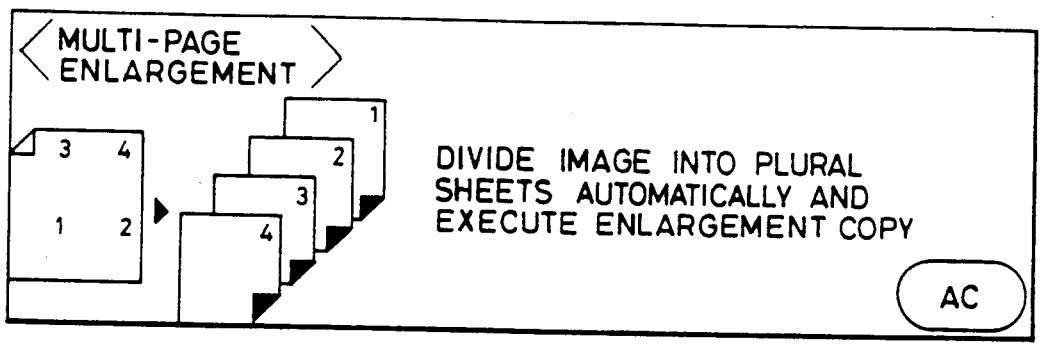

In the following there will be explained a multi-page enlargement mode, in which a copy with a predetermined reproduction ratio, if not recordable on a sheet, is divided into plural sheets, and an output copy can be obtained by uniting said plural sheets. Said mode can be selected by depressing the multi-page enlargement key 133, whereby a display shown in FIG. 9M is obtained.

As explained in the foregoing, six independent modes can be selected with the editor 213 and the liquid crystal display unit 123. Stated inversely, the operator has to decompose the desired result of copy into respective modes and set such modes independently.

Therefore, in order to improve the operation efficiency, it is rendered possible to set complex modes frequently used. However, if new keys are added for selecting such complex modes, such keys may be confused with the six mode keys for the above-explained independent modes and may thus impede the operation efficiency. Also for setting plural complex modes there will be required the addition of hardware keys and/or the modification in circuitry. Consequently, in the present embodiment, the mode is set with the character input board 143 of the editor 213, used in the character input mode.

Figure 10A:
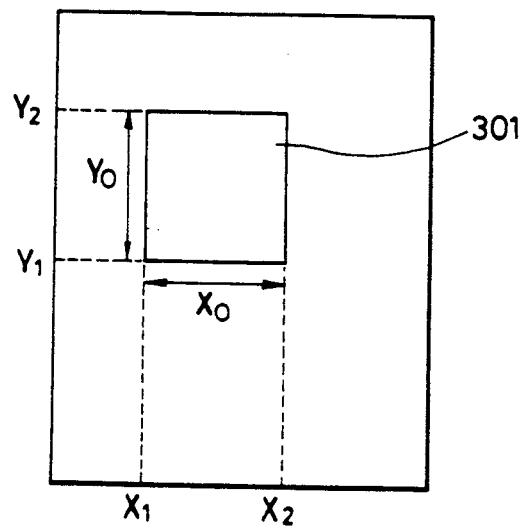
FIGS. 10A and 10B are schematic views showing an example of process modes.
Figure 10B:
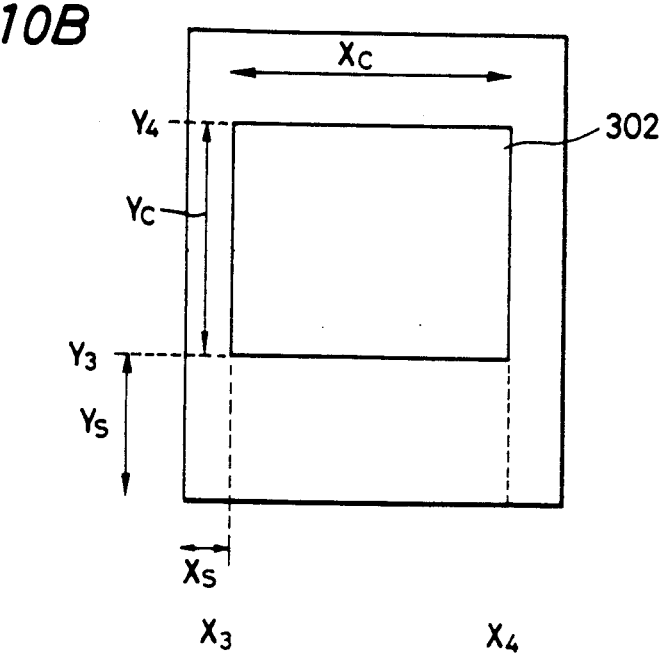

As an example of such complex mode, there will be explained an AZS mode, in which the area designating mode, zooming mode and shift mode explained above are combined, for moving an area 301 of the original, shown in FIG. 10A, to an area 302 shown in FIG. 10B with a size change. In the absence of such complex mode, it is necessary to designate the area 301 in the area designating mode, then to determine the reproduction ratios in the X and Y directions from YC/YO and XC/XO in the zoom mode, and to designate the recording sheet, and the values Xs, Ys in the designated shift mode, so that the mode keys have to be actuated three times in total.

However, in said complex mode, the designated area, destination of shift and reproduction ratio can be determined from the data X1, Y1, X2, Y2, X3, Y3, X4 and Y4 shown in FIG. 10.

Figure 11A:
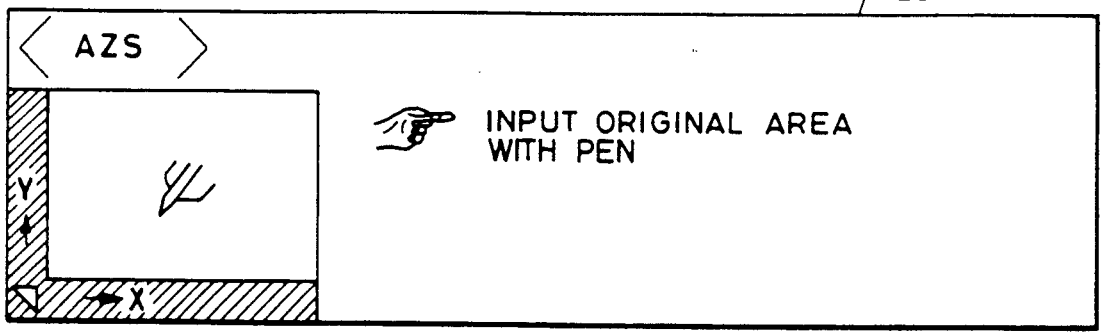
Figure 11B:
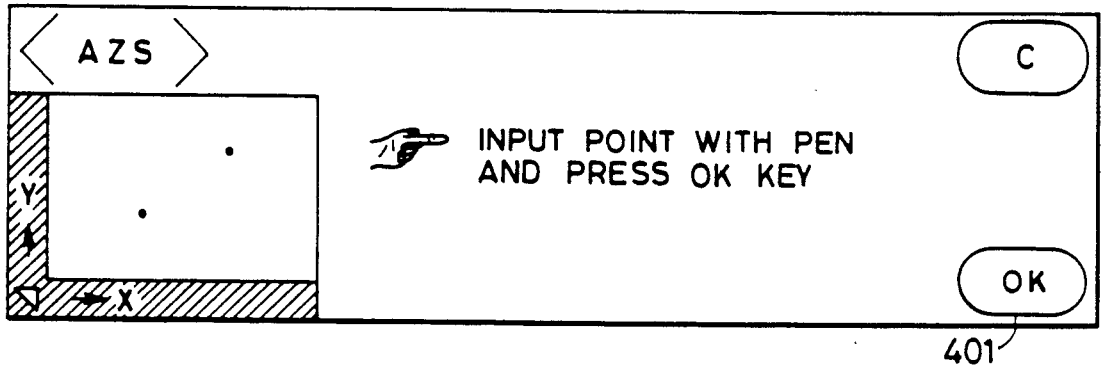
Figure 11C:
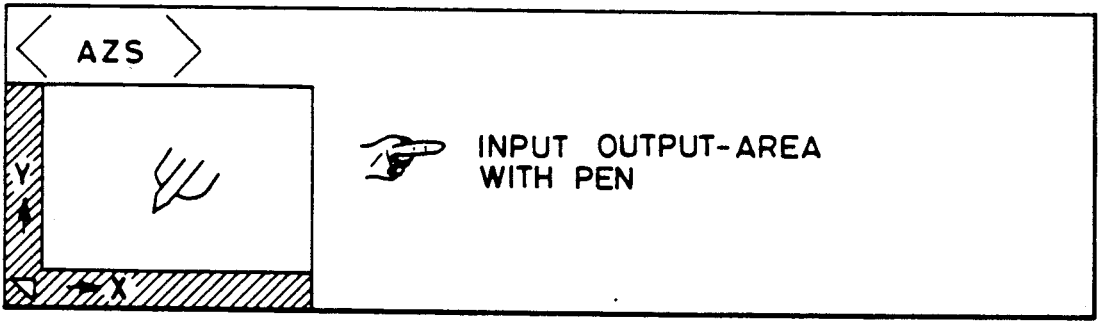
Figure 11D:
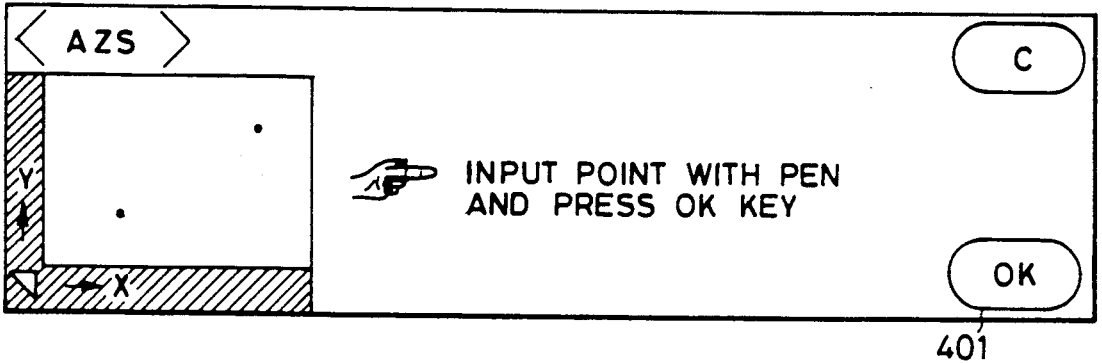
Figure 12:
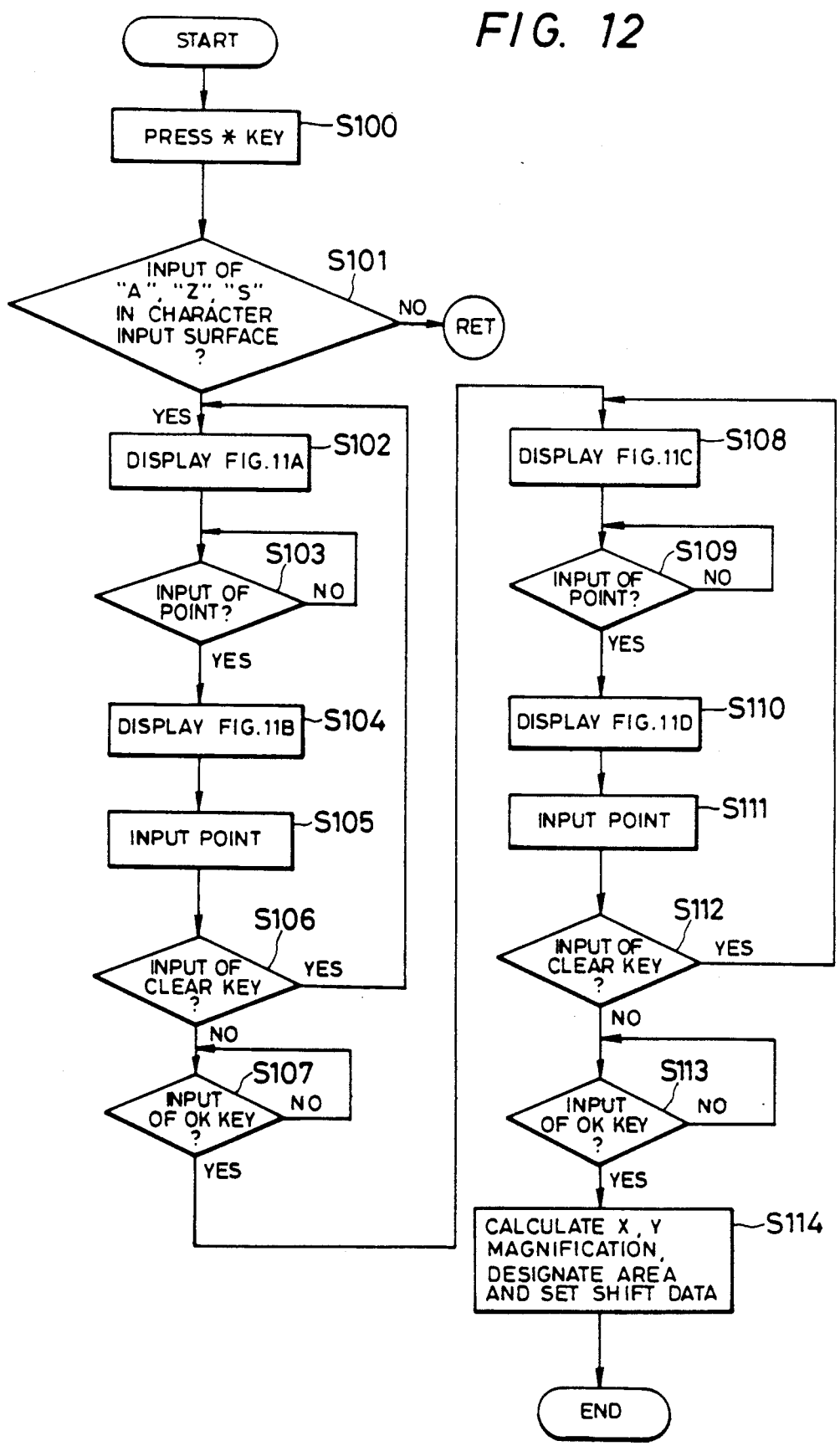

The function of said complex mode will be explained in detail, while making reference to FIG. 11 showing the display state of the liquid crystal display unit 123 in the setting of complex mode, and FIG. 12 showing the control sequence of the CPU 210 in the setting of the complex mode.

For setting a complex mode, the operator at first depresses the asterisk key 102 shown in FIG. 3A (S100), whereby the characters entered from the character input board 143 represent a mode input. Then, in response to the input "AZS" with the pointer 138 on the character input board 143 (S101), there is obtained a display state shown in FIG. 11B (S102). Then, in response to the input of a point with the pointer 138 (S103), there is obtained a display state shown in FIG. 11B (S104). Subsequently the other diagonal point is entered (S105), and the OK key 401 is depressed (S107) to complete the input of data X1, X2, Y1 and Y2 in the original area.

Then there is given a display shown in FIG. 11C (S108) for designating the output area. In this state, in response to the entry of a point (S109), there is obtained a display state shown in FIG. 11D. Subsequent to the entry of the other diagonal point (S111), the OK key 401 is depressed (S113) to determine the output area X3, X4, Y3 and Y4. Then there are conducted the calculation of reproduction ratios in the X and Y directions, setting of the input area and setting of the shaft data (S114).

The parameters for the complex mode are set in this manner, and an image forming operation is started by the subsequent actuation of the start key by the operator. In the foregoing explanation, the complex mode is set by the character input board of the editor in the character input mode, but it is also possible to utilize other methods, such as a method of utilizing a keyboard and a cathode ray tube.

On the other hand, the character input utilizing the character input board 143 may be utilized, in addition to the setting of complex modes, also to a version display of the apparatus, data displays in a service mode, or displays for self diagnosis.

In the following there will be explained the process of setting various parameters for the character input, while making reference to FIG. 13 showing various display states of the liquid crystal display unit 123 in the parameter setting for the character input, and to FIG. 14 showing the control sequence of the CPU 210 in said parameter setting.

Figure 13A:
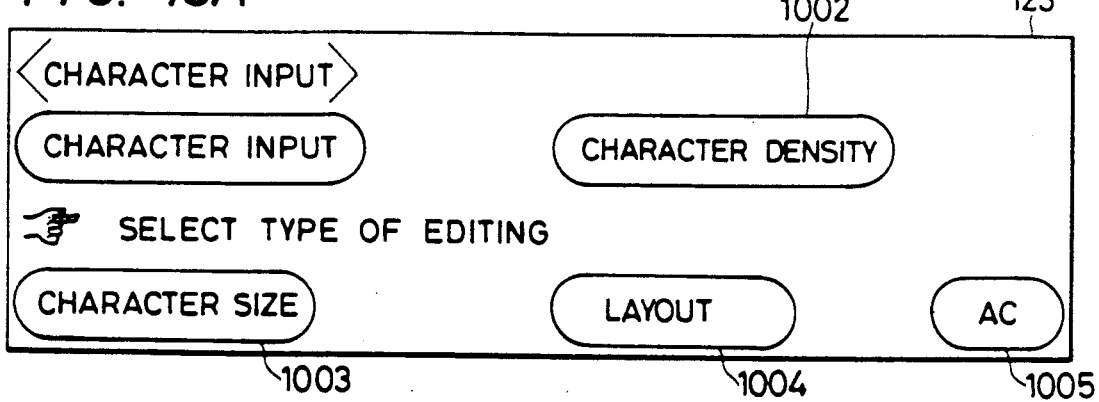

In response to the depression of the character input key 134 on the editor, the liquid crystal display unit 123 provides a display shown in FIG. 13A (S1).

As explained in the foregoing, the liquid crystal display unit 123 is formed as a touch panel display, so that, when the operator touches one of the displays "character input", "character density", "character size", "layout" and "AC" surrounded by elongated circles, the CPU 210 recognizes the input from said liquid crystal display unit 123 as a part of the operation unit 143, thereby setting necessary data, varying the display or awaiting the entry of new parameters.

Figure 13B:
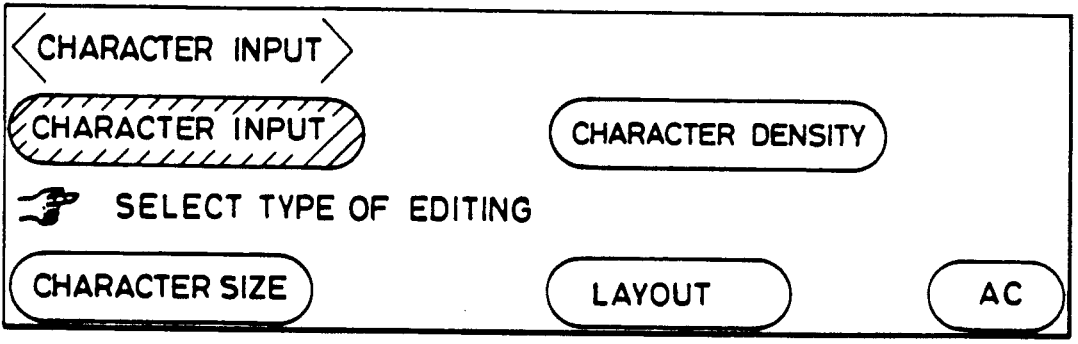

If the characters to be added on have already been entered by a method to be explained later, the "character input" key is displayed in a reversed state as shown in FIG. 13B (S3), thus informing the operator of the already entered characters. Such step will be hereinafter called a key reverse check. The operator selects the mode of character input editing in the display state shown in FIG. 13A or 13B, and sets the parameters for the character input on a display frame (S4, S5, S6, S7 and S8).

In the following there will be explained the operation sequences when the character input key 1001, character density key 1002, character size key 1003 or layout key 1004 is depressed on the liquid crystal display unit 123.

When the character input key 1001 is depressed, there is executed a discrimination as to whether the characters to be added on have been entered (S9). If already entered, said add-on characters are displayed as shown in FIG. 13E (S17).

Figure 13C:
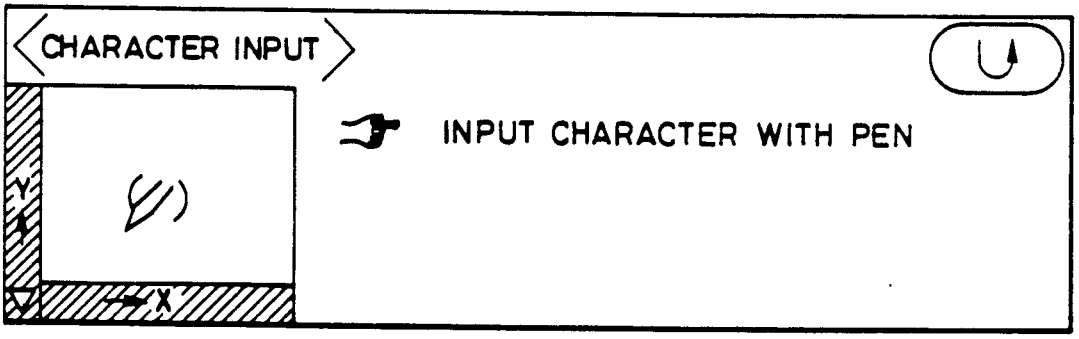

On the other hand, if the add-on characters have not been entered, a 10-second timer is set (S10), and a display as shown in FIG. 13C is given to request the operator to designate the characters with the pointer 138 on the character input board 143 of the editor (S11). Said display automatically changes to a state shown in FIG. 5D, after the expiration of 10 seconds.

If the editor is pressed by the pointer 138 before the lapse of said 10 seconds (S12), there is discriminated whether the pressed position is within the character input board 143 of the editor (S14), and, if so, the CPU 210 activates the buzzer 211 for informing the operator of the pressing of the character input board 143 (S15). The CPU 210 identifies the pressed character from the point information of the editor, and registers a corresponding character code in the add-on display RAM 207 (S16).

As the character input board 134 contains 148 characters, the entered character is registered, by one of the codes 0-147, in the add-on display RAM 207, and said code is utilized in displaying the entered character on the liquid crystal display unit 123.

If the pressed position is not within the character input board 134, the buzzer 211 is not activated, whereby the operator can know that he has to repeat the character input with the pointer 138. In this manner it is rendered possible to prevent an error in the input operation.

The character input with the character input board 143 of the editor and the electronic pointer 138 is more direct for the operator and induces less mistakes in the entry of characters, in comparison for example with the entry of character codes with the numeral keys 105. The editor can also be utilized for the settings in other editing modes, such as the setting of zoom ratio or the designation of an area.

Figure 13D:
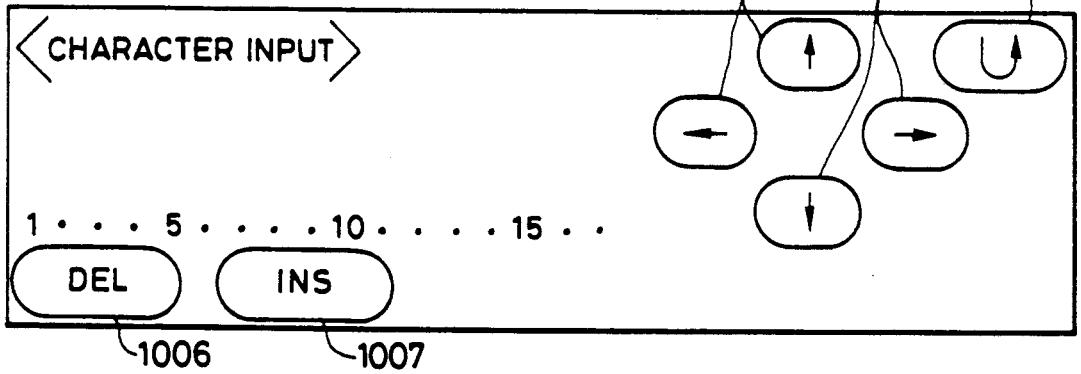
Figure 13E:
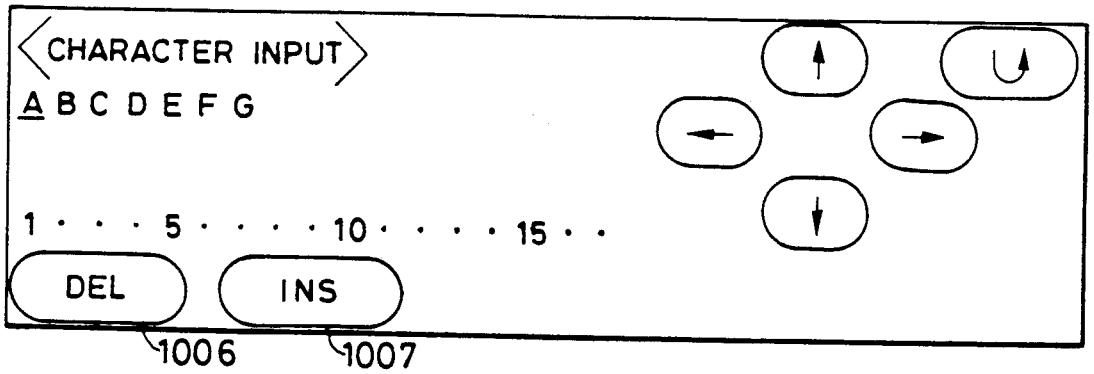

For displaying the add-on characters thus entered, the CPU 210 at first causes the liquid crystal display unit 123 to display a state shown in FIG. 13D (S17), wherein are shown are a deletion key 1006, an insertion key 1007 and a cursor moving keys 1008.

The content stored in the add-on display RAM 207 is displayed on the display unit 123 (S18). If an add-on character is designated in the display state shown in FIG. 13D, there is displayed only one character. However, after the input of character or characters, if another copy code such as the shift mode is selected and then the character input key is depressed again, the restored display of the character input mode shows all the characters previously entered as shown in FIG. 13E. The liquid crystal display unit 123 displays, as shown in FIG. 13E, the content of the add-on display RAM 207 in 8×8 dot matrixes in an area of 3 lines ×17 characters. The CPU 210 moves the cursor to a position "A" shown in FIG. 13E (S19). Then, in case of the insertion mode, the insertion key 1007 is displayed in reverse state (S20).

If an add-on character is designated with the pointer 138 (S22, S23), the buzzer 211 is activated (S24) to inform the operator of the character input. If the insertion mode has not been selected (S25), the designated character is displayed at the cursor position regardless whether a character has been displayed at the cursor position (S26), and a character code is stored in a position of the add-on display RAM 207 corresponding to the cursor position and a corresponding character is displayed (S27), and the cursor is moved to the next digit (S28).

Figure 15:
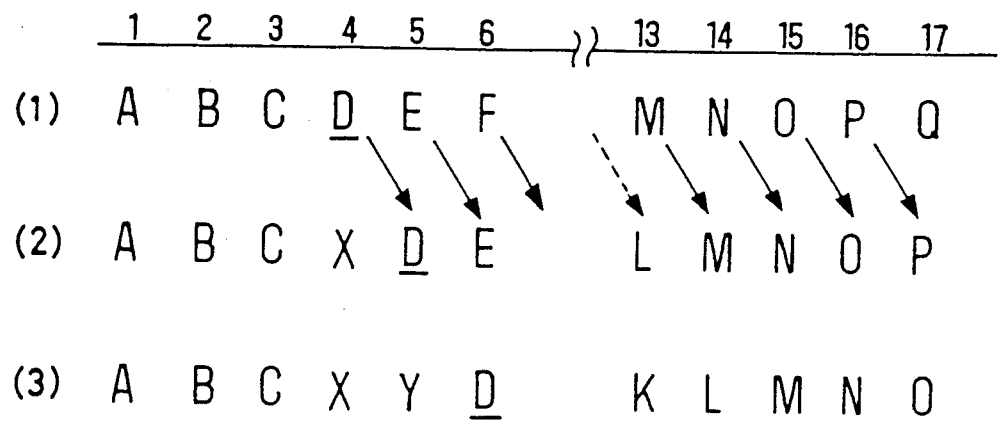
FIGS. 15 and 16 are schematic views showing different stat of character display.
Figures 1, 28:
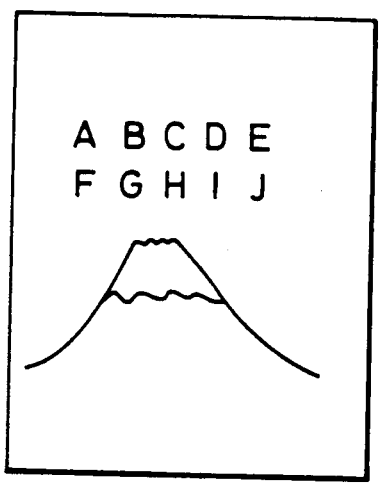
Figures 2, 28:
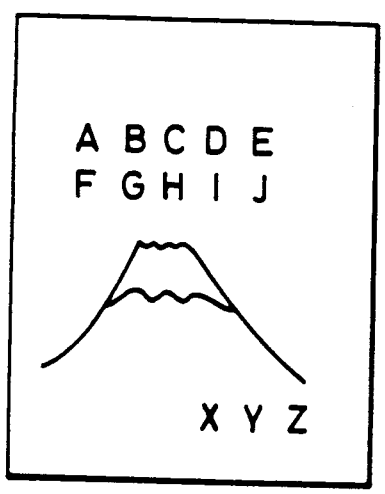
Figures 3, 28:
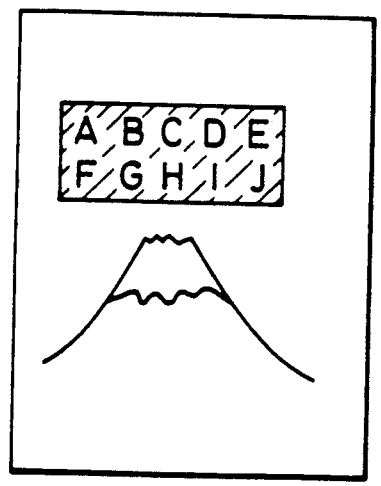

On the other hand, if the insertion mode has been selected when the add-on character is designated by the pointer 138, the insertion key 1007 is displayed in reverse manner in FIG. 13E, and the designated character is inserted immediately before the cursor position. Now reference is made to FIG. 15 for explaining the changes in the display in this operation. There will be explained an example of inserting, in a display of "A, B, C, ..., P, Q" shown in FIG. 15-1, characters "X" and "Y" between "C" and "D". The rearrangement of characters resulting from insertion is conducted only in a line where the cursor is positioned. The last (17th) character of a line in which a character is inserted is erased from the add-on display RAM 207, and the rearrangement is conducted in succession as shown in FIG. 15-2 and FIG. 15-3 (S29). Then the cursor is advanced by a digit (S30), and the line containing an inserted character is entirely displayed again since the characters have been rearranged (S31).

Figure 16:
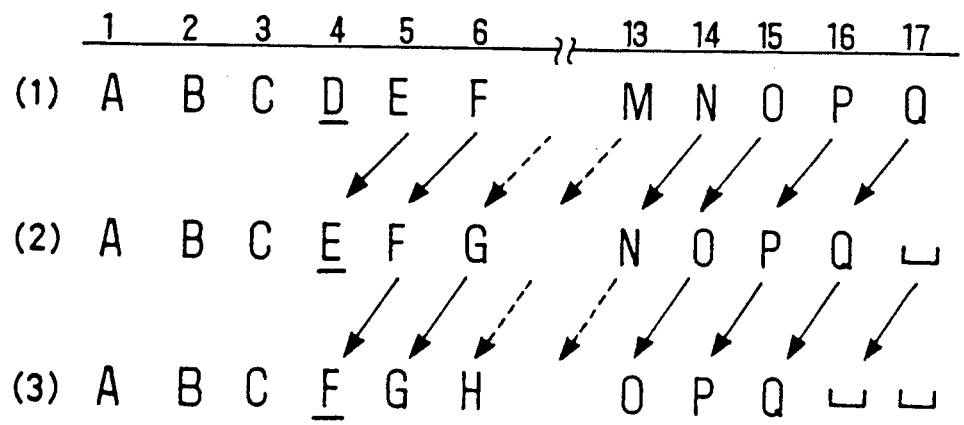

In the following there will be explained the operation when the deletion key 1006 is depressed, while making reference to FIG. 16. As shown in FIG. 16-1, it is assumed that characters "A, B, C, ..., P, Q" are displayed. When the deletion key 1006 is depressed while the cursor is at the character "D" (S32), the character indicated by the cursor is deleted from the add-on display RAM 207, and the ensuing characters in the same line are rearranged as shown in FIG. 16-2 (S36). Due to the deletion of a character, a space code "_" is inserted at the end of line.

After such rearrangement of characters following the depression of the deletion key 1006, the rearranged line is displayed again (S36), and the sequence again enters a state of awaiting a key input. In a case where the insertion key 1007 is depressed (S33), the insertion mode is set if it has not been set, or said mode is cancelled if it has been set (S37).

If one of four cursor moving keys 1008 is actuated (S34), the cursor is moved in a direction indicated by the actuated key (S38), and the sequence enters a state awaiting a key input. Also the depression of a preceding frame key 1009 returns the display to a state (A) or (B) for setting the character input modes. (S35).

If any other key, for example one of the numeral keys 105, editor mode keys 129-137 and density keys 107-109, a corresponding process is executed (S39) and the sequence again enters a state awaiting a key input.

In the following explained is the function when a character density key 1002 is depressed in a display state shown in FIG. 13A or 13B.

Figure 13F:
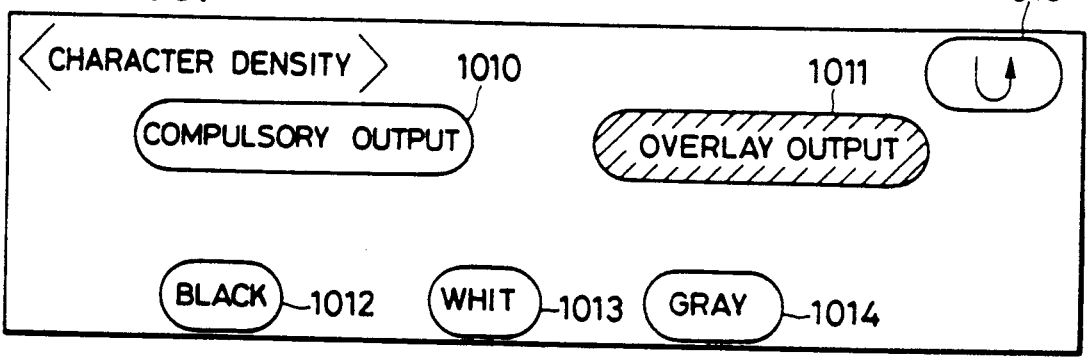
Figure 13G:
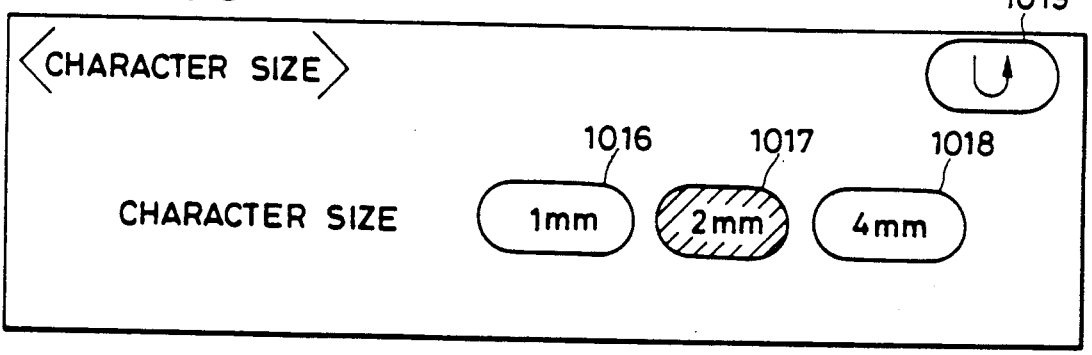

The density of the add-on characters is determined either in a compulsory output mode or an overlay output mode, which can be selected by depressing, in a display state of the liquid crystal display unit 123 shown in FIG. 13F, a compulsory output key 1010 or an overlay output key 1011, respectively.

The compulsory output mode and the overlay output mode will be explained in the following, with reference to FIG. 17A to 17D.

Figure 17A:
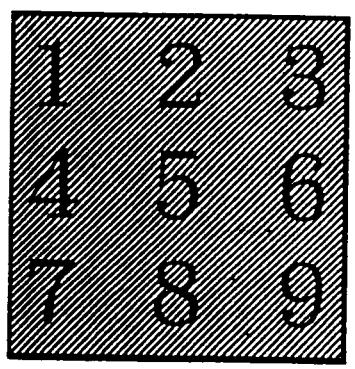
FIGS. 17A to 17D are views showing synthesizing operation.
Figure 17C:
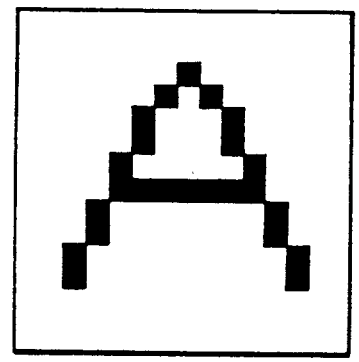
Figure 17B:
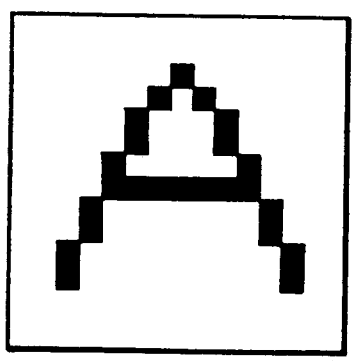
Figure 17D:
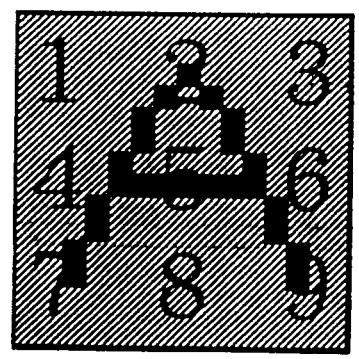

In the compulsory output mode, in superposing the characters entered in the character input mode with the original image read by the reader, if the add-on character area, defined as explained later, overlaps with the black image of the original image, only the information of said add-on character area is supplied to the printer. On the other hand, in the overlay output mode, the black area of the font information of the add-on characters is supplied to the printer with a designated density, while the white area of said font information and the original image information are supplied, through an OR gate, to the printer. FIG. 17A shows the original image read by the reader; FIG. 17B shows the font information; FIG. 17C shows the result of output in the compulsory output mode (black); and FIG. 17D shows the result of output in the overlay output mode (black).

In a display state shown in FIG. 13B, when the character density key 1002 is depressed (S5), the display changes to a state shown in FIG. 13F (S40), in which, however, the key 1011 is not in the reverse display state. The compulsory output key or the overlay output key is reverse displayed respectively in the compulsory output mode or in the overlay output mode (S41). FIG. 13F shows a state in which the overlay output mode has been designated so that the overlay output key is in reverse display. The sequence awaits a key input (S42). If the compulsory output key 1010 is depressed (S43), a signal "1" is set in a mode latch 436 (S47), and the sequence again awaits a key input (S42). If the overlay output key 1011 is depressed, a signal "0" is set in the mode latch 436 (S47), and the sequence again awaits the key input (S42). If a black key 1012, a white key 1013 or a gray key 1014 is depressed (S44), a corresponding density value 0FFH 00H or 07FH is set in a density register (S48), and the sequence again awaits the key input (S42).

If the previous frame key 1015 is depressed (S45), the display changes to a state shown in FIG. 13B, thus enabling to select the character input modes. If any other key is depressed, a corresponding process is executed (S46), and the sequence again awaits the key input (S42).

In the following there will be explained a case when the character size key 1003 is depressed in a display state shown in FIG. 13A. In the present embodiment there can be obtained add-on characters of three different sizes (1, 2 or 4 mm) from the same content of the add-on RAM 205 by controlling a reading clock signal therefor. When the character size key 1003 is depressed, there is obtained a display shown in FIG. 13G (S49), and a key reverse check is executed for a 1-mm key 1016, a 2-mm key 1017 and a 4-mm key 1018 (S50). If any of said keys is depressed (S51), a corresponding resolution is set (S52). If a key 1019 is depressed (S54), the display changes to a state shown in FIG. 13B.

In the following there will be explained a case in which the layout key 1004 is depressed in a display state shown in FIG. 13A. The layout key 1004 allows the output of the characters, entered in the above-explained manner, in an arbitrary position of the recording sheet, either in the horizontal or vertical direction.

These two parameters are set by the layout key 1004. When it is depressed, there is obtained a display shown in FIG. 13H for selecting the output direction of the characters (S56), and the selected output direction key is reverse displayed (S57). If a horizontal layout key 1021 or a vertical layout key 1022 is depressed (S59), data indicating the output direction is set (S60). Said data is utilized in the access to the content of the add-on font ROM 208. More specifically there are provided a vertical font and a horizontal font, either of which is selected by said data. If the key 1020 is depressed the display changes to a state shown in FIG. 13B (S61), and, if the OK key 1023 is depressed there is obtained a display shown in FIG. 13I for selecting the layout.

Figure 18:
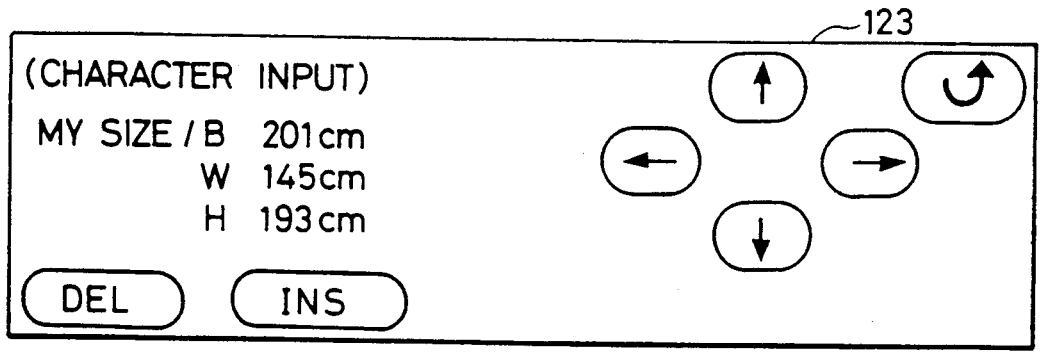
Figure 19B:
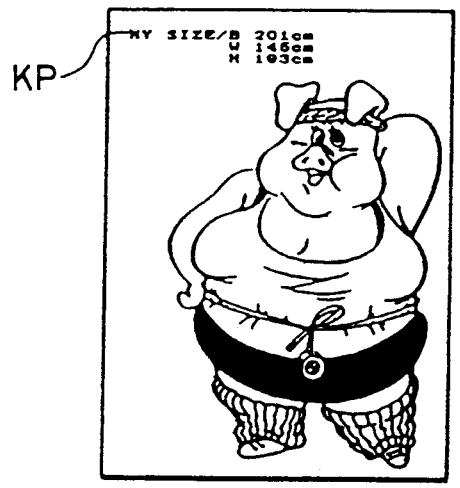
FIGS. 19A to 19C and 23 are views showing examples of synthesized image.
Figure 19A:
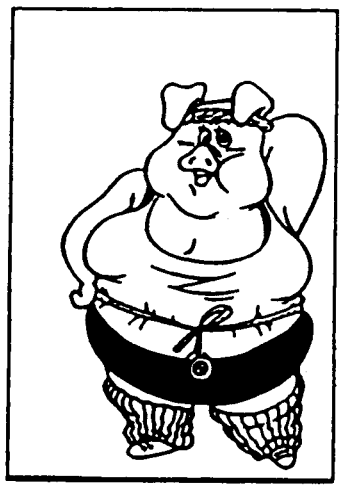
Figure 19C:
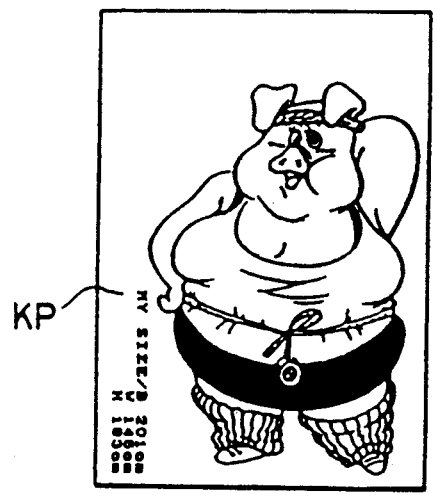

Then an output reference position is designated, for determining the output position of characters on the recording sheet. In the following said output reference position is explained with reference to FIGS. 18 and 19. FIG. 18 shows the liquid crystal display unit 123 indicating the characters entered in the above-explained manner. The character output is so controlled that, in case of horizontal output, the upper left corner of the first character "M" in the first row, or, in case of vertical output, the lower left corner of the first character (space) in the third row, coincides with said output reference position. The horizontal output or vertical output is made as respectively shown in FIGS. 19B or 19C, starting from the output reference position KP on the recording sheet. FIG. 19A shows the original image.

Figure 13H:
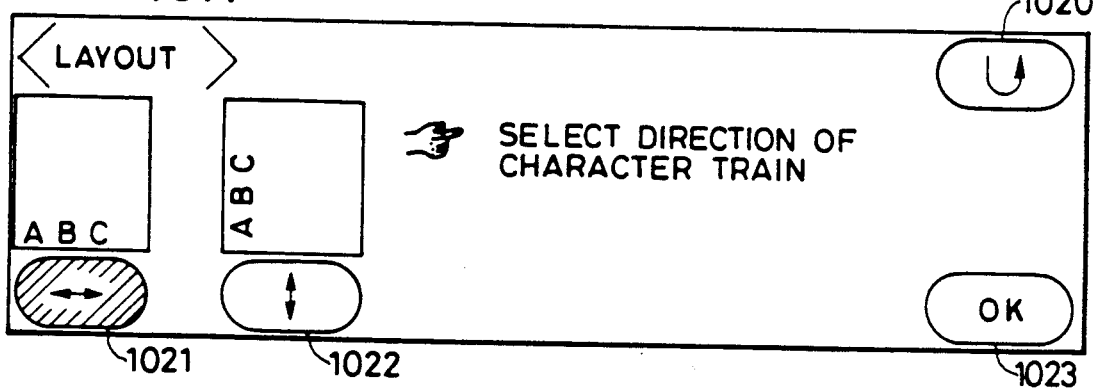

For determining said output reference position KP, after the selection of the horizontal or vertical output in a display state shown in FIG. 13H, the OK key 1023 is depressed, whereby is obtained a display state shown in FIG. 13I (S64). The already entered output reference position KP is displayed by a dot (S65).

If a new input is made with the pointer 138 (S66), the information of entered point is converted into a new output reference position KP and stored (S67), and displayed (S65).

If the previous frame key 1024 is depressed, the display returns to a state shown in FIG. 13H, and, if the OK key 1025 is depressed, the display changes to a state shown in FIG. 13B.

The input of the characters, symbols, etc. to be inserted into the original image, and the setting of the size of said characters, position of insertion, direction of characters, density thereof, etc. are completed in this manner. Then, in response to the subsequent depression of the start key 101, there is printed an image synthesized from the original image and the character information.

In the following there will be explained the functions in the printing operation.

Figure 24:
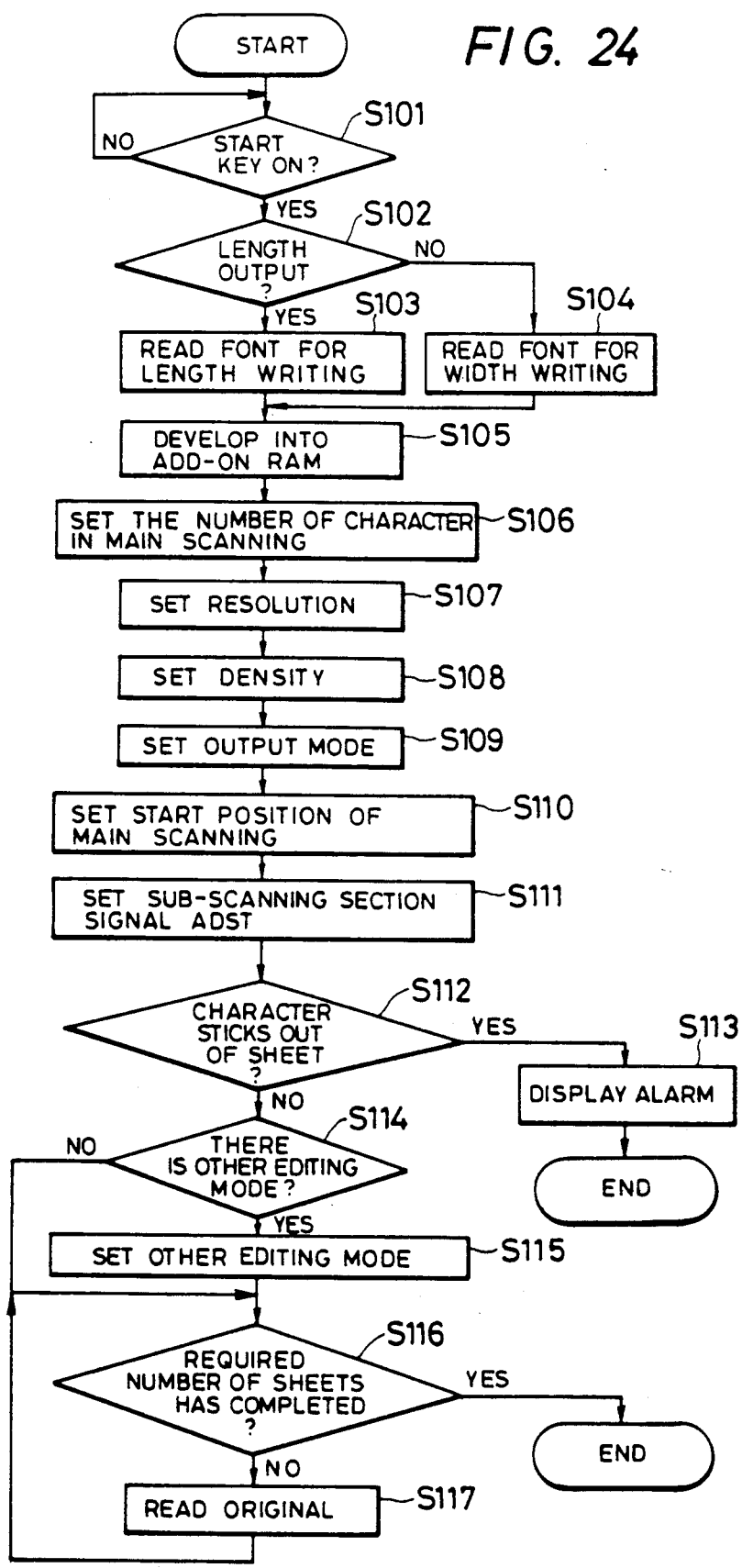

FIG. 24 shows the control sequence of the CPU 210 for the printing operation.

Figure 21:
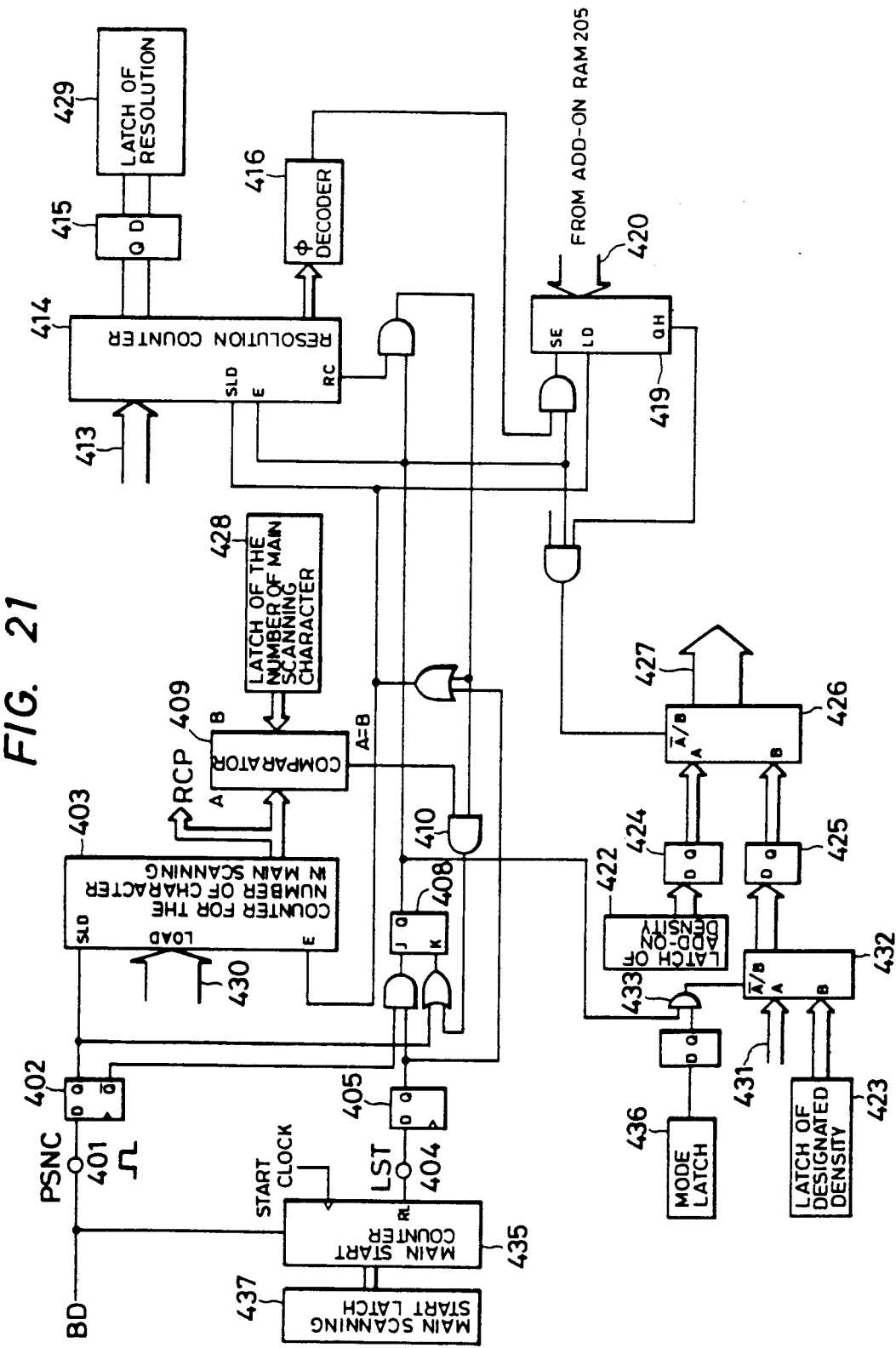
FIG. 21 and 22 are block diagrams of an add-on image generating circuit.
Figure 22:
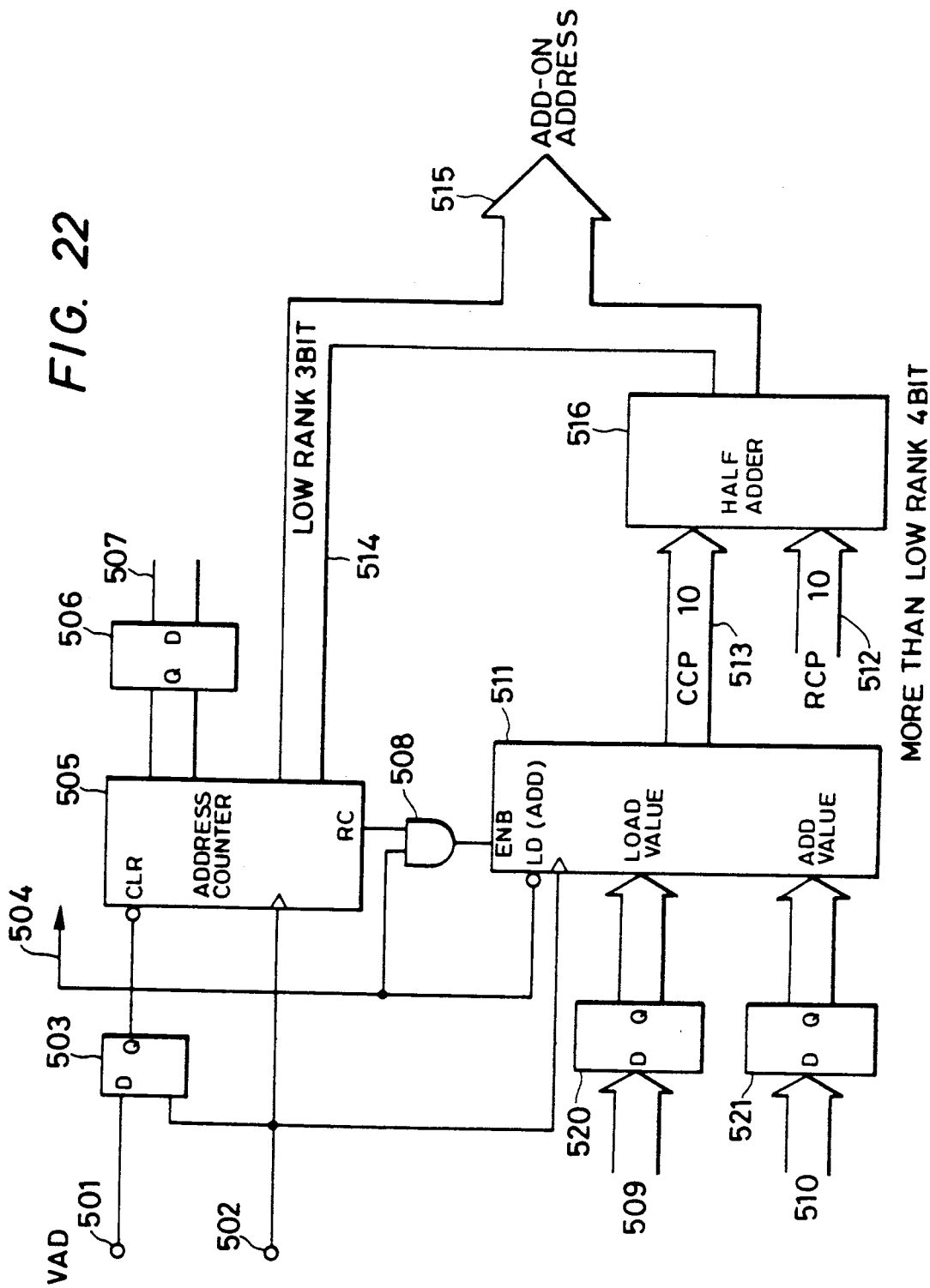

Also FIGS. 21 and 22 show the structure of the add-on image generating circuit 206.

Figure 20C:
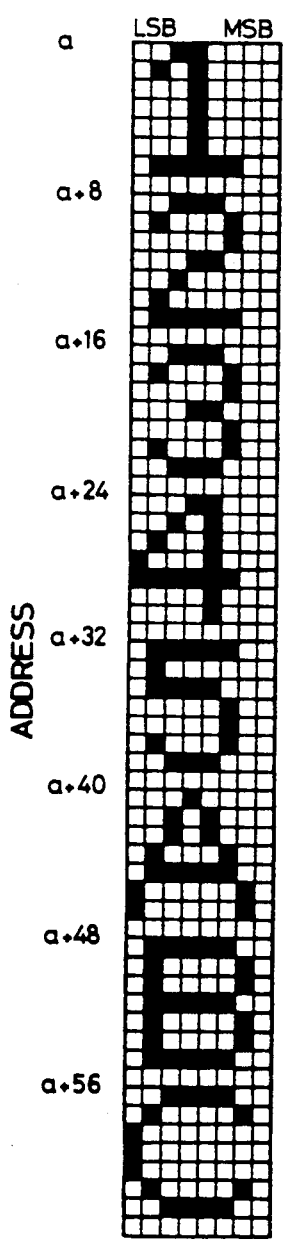
Figure 20A:
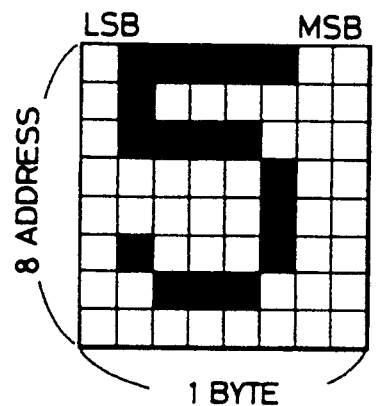
Figure 20B:
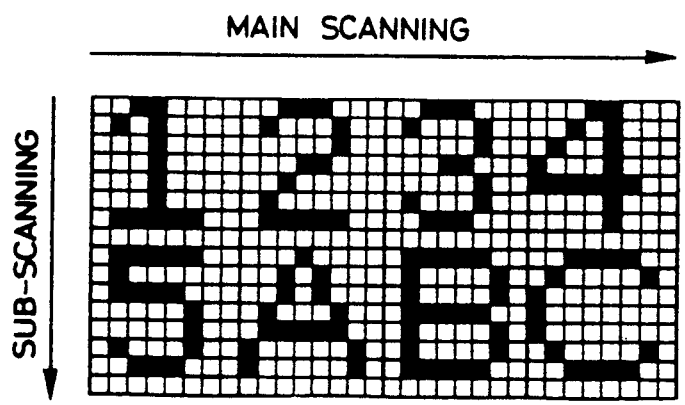

In the following there will be explained an example of recording the characters, shown in FIG. 20B, in the character mode in a position shown in FIG. 23.

After the actuation of the start key (S101), the CPU 210 discriminates whether the vertical output is selected, and sets the vertical font or the horizontal font respectively if the vertical output is selected or not (S103, S104). Then access is made to the add-on font ROM 208 for the font information corresponding to the character code information stored in the add-on display RAM 207, and said font information is developed in the add-on RAM 205 constituting a bit map memory (S105). In the present embodiment each character in the font is composed of 8×8 dots as shown in FIG. 20A, and the add-on RAM 205 has a capacity in number of bytes equal to 8 times the maximum number of characters in the main scanning direction, enough for accommodating characters of maximum displayable number. FIG. 20C shows the mode of development of the characters, shown in FIG. 20B, in the add-on RAM 205. In FIG. 20C, the vertical direction shows different addresses, and the horizontal direction shows the memory of a byte corresponding to each address. In the present example the information is developed in a form of 4 characters in the horizontal direction and 2 characters in the vertical direction, since 13 blank characters following "1234" in the first row need not be recorded.

The add-on image generating circuit 206 makes access to said add-on RAM 205 by reading the bits a, a+8, a+16, a+24, ... in FIG. 20C to obtain a main scanning line, then the bits a+1, a+9, a+17, a+25, ... to obtain a succeeding main scanning line. By repeating these procedures, there can be obtained binary image data corresponding to FIG. 23. Also the character size can be varied by the control of a clock signal for access to the add-on RAM 205. In the present embodiment each character can be obtained with a resolving power of 50, 100 or 200 dpi (dot/inch), so that each character is obtained with a size of about 4 mm, 2 mm or 1 mm, by releasing each 8×8 matrix, shown in FIG. 20A, respectively with a resolving power of 50, 100 or 200 dpi. The signals "1" and "0" of the binary data from the add-on RAM 205 can be recorded respectively with the densities set in the add-on density latch 422 and the designated density latch 423.

The CPU 210 sets the number of characters in the main scanning direction ("4" in the example of FIG. 20B) in a main-scanning character number latch 428 (S106) whereby the order of data reading from the add-on RAM is determined. Then the above-explained resolving power corresponding to the character size is set in a resolution latch 429 (S107), and the density of the image information "1" read from the add-on RAM 205 is set in an add-on density latch 422 (S108). A signal "1" or "0" is set in a mode latch 436 respectively in the compulsory output mode or in the overlay output mode (S109). In a case of the compulsory output mode, the density of the image information "0" read from the add-on RAM 205 can be set in the designated density latch 423, and said density can be selected by a selector 432. In a case of the overlay output mode, the original image information supplied through a signal line 431 is selectively released by the selector 432.

Figure 23:
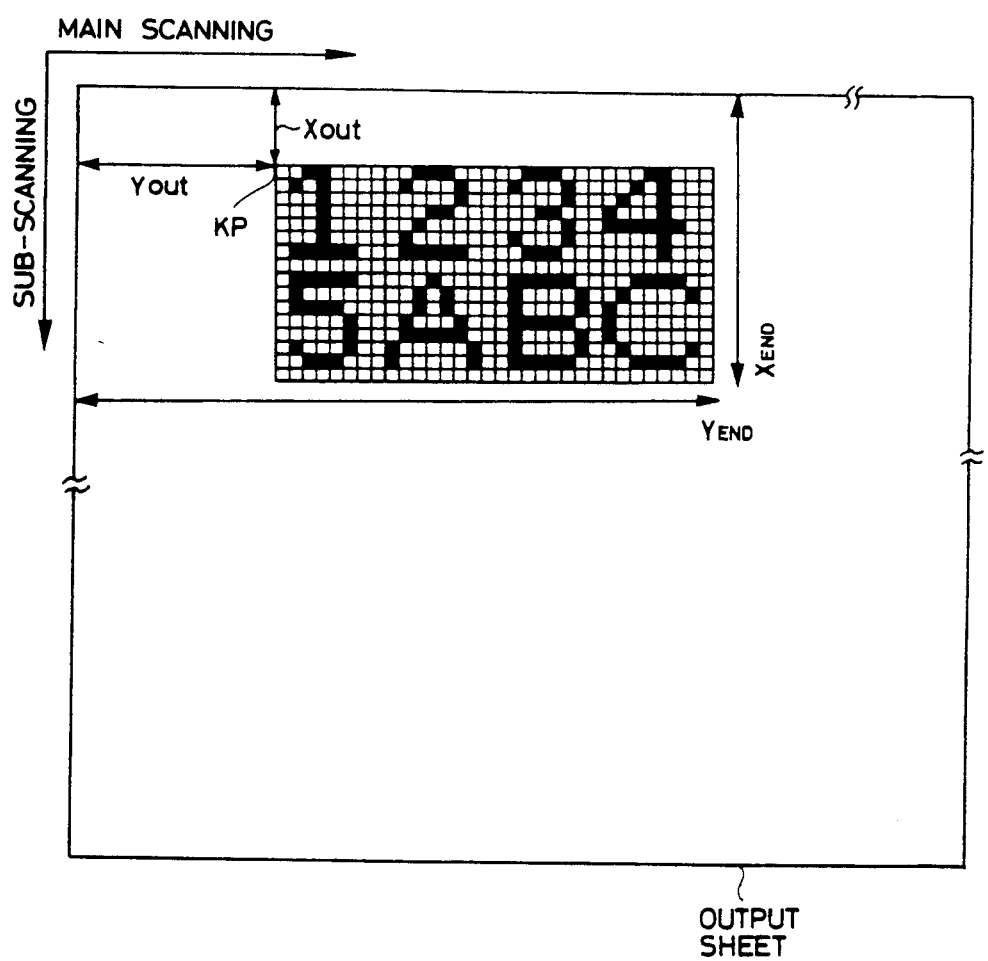

Then data Yout in FIG. 23, corresponding to the main scanning start position of the information to be added on, or to the aforementioned reference output position KP, are set in a main scanning start latch 437 (S110). More specifically the CPU 210 calculates the output timing of ripple carry of the main scanning counter 435, and sets the load value of the counter 435 in the main scanning start latch 437. In response to the BD signal (main scanning reference signal), the main scanning counter 435 loads the initial value from the latch 437 and starts a counting operation. A signal RC released from the counter 435 is used as the add-on main scanning start signal corresponding to the position Yout shown in FIG. 23.

Also a value Xend is calculated from the subscanning start position Xout, the number of characters in the sub-scanning direction ("2" in the example shown in FIG. 20B) and the designated resolving power and is set in a sub-scanning counter 209, for generating an add-on sub-scanning section signal ADST (S111).

Then a value Yend is calculated from the resolving power and the number of characters in the main scanning direction, and said values Xend, Yend are compared with the sizes in the main and sub-scanning directions of the sheets in a cassette selected by the cassette selection key 117, in order to discriminate whether the entered characters can be accommodated in the recording sheet (S112). If either or both of Xend and Yend exceeds the sizes of the sheet, the image formation is interrupted, and an alarm message for the operator as shown in FIG. 25 is displayed on the liquid crystal display unit 123 (S113). In response to said alarm, the operator either changes the sheet size, or the layout of the input characters or the number or resolving power thereof.

If the input characters can be accommodated in the sheet, there is discriminated whether another editing mode, for example a size change, an image shifting, a trimming or a masking is designated (S114), and, if designated, parameters required for such mode are set in the image processing circuit 202 (S115). Then the original reading operation is started and repeated until the prints of a desired number are obtained (S116, S117).

In the following there will be explained the function of the add-on image generating circuit 206 and the synthesizing circuit 203 shown in FIGS. 21 and 22.

The binary image information from the add-on RAM 205 is supplied, byte by byte, from a signal line 420 to a shift register 419. A pulse signal PSNC, generated from the BD signal from the printer and indicating the start of a main scanning line, is supplied from an input terminal 401 to a flip-flop 402, thereby setting said flip-flop 402 and initializing a main scanning character number counter 403 composed of a synchronous up-counter. The output signal of the flip-flop 402 resets a flip-flop 408 and shifts an enable signal for the main scanning character number counter 403 and the resolution counter 414 to the L-level. The main scanning counter 435 counts the clock signal in synchronization with the main scanning of the reader unit, and, at the start position of output of the add-on image where the counting of the value set in the main scanning start latch 437 is completed, an H-level pulse signal LST is supplied to an input terminal. In response, a set output signal of a flip-flop 405 increases the count of the main scanning character number counter 403 by one, and initializes the resolution counter 414, whereby the add-on information of a byte, for example the information a in FIG. 20, is loaded in the shift register 419. The resolution counter 414 counts downwards from the initial value. A 0-decoder 416 identifies a state in which the lower three bits of the resolution counter 416 are all zero, and sends an output signal to the shift register 419 every time such state is reached, whereby the binary add-on image data are released, bit by bit, from a terminal $Q_H$ of the shift register 419.

For example when a signal "1" is released from said terminal $Q_H$ of the shift register 419, a selector 426 selects an input terminal A, whereby the add-on density set in the add-on density latch 422 is supplied, through the latch 424 and the selector 426, to the printer 204.

On the other hand, when a signal "0" is released from said terminal $Q_H$ of the shift register 419, the selector 426 selects an input terminal B, whereby the original density of a signal line 431, in case of the overlay output mode or the white density set in the designated density latch 423 in a case of the compulsory output mode, is selected by a selector 432 and released through a latch 425. After the release of the add-on information of a byte in this manner from the shift register 419, the resolution counter 414 releases a ripple carry signal RC to increase the count of the main scanning character number counter 403 by one and again initializes the counter 414 Thus the add-on information of next byte (information at the address a+8 in FIG. 20C) is loaded in the shift register 419.

The number of characters in a main scanning line, counted by the counter 403, reaches the number of characters ("4" in case of FIG. 20) set in advance in the main scanning character number latch 428, a comparator 409 releases an H-level signal to terminate the function of the counter 414. Even in the compulsory output mode in which the selector 432 selects the information from the designated density latch 423, a gate 433 is closed to select the original image density from a signal line 431. Then the same procedure is repeated for the next main scanning line.

The resolution is switched by controlling the output signal from the resolution counter 414 to the 0-decoder 416. For example a decrease in the resolving power can be achieved by passing the output signal of the resolution counter 414 through a gate and shifting the output thereof upward by a bit. In such case a similar control has to be applied also to the ripple carry signal from the resolution counter 414.

Now reference is made to FIG. 22 for explaining a hardware structure for supplying the add-on information, developed on the RAM 205, to the shift register 419 shown in FIG. 21. At first an add-on start address (a in FIG. 20C) is set to latch 520 from a signal line 509, and a address jump value (32 in case of FIG. 12C; this value is variable according to the number of characters in a row and is defined by m×n wherein m is said number and the font matrix size is n×n) is set in a latch 521 from a signal line 510. An input terminal 502 receives a main scanning start signal same as that received by the input terminal 401 shown in FIG. 21, and a signal line 512 supplies the number of characters in the main scanning direction, from the counter 403 shown in FIG. 21. The add-on address 515 is composed of lower three bits 514, and higher bits 512. Also an input terminal 501 receives the sub-scanning address section signal set by the CPU 210.

Now reference is made to FIG. 20 for explaining the changes in the addresses. At first an L-level signal is supplied to the input terminal 501, and the start address a is supplied from a latch 520 to a counter 511. At each count of the number of characters in the main scanning direction, the fourth bit from the lowest bit in the signal line 512 is counted up whereby the add-on address 515 releases a+8, a+16, a+24, .... After the access of the data of a main scanning line, a clock pulse is entered from the input terminal 502 to increase the count of the address counter 505 by one. Thus the add-on addresses 515 are increased by one, and become a+1, a+9, a+17, .... This procedure is repeated, and, after the access of the addresses a+7, a+15, ..., the counter 505 releases a ripple carry signal, whereby a latch 521 add a value 32, corresponding to the jump value, to the counter 511 for making access to the addresses a+32, a+40, a+48, ....

In this manner the add-on character data developed in the add-on RAM 205 are released in succession to the shift register 419.

As explained in the foregoing, the present embodiment allows to insert or overlay the information composed of character, numerals, symbols etc. with a desired size and a desired density in a desired position of an original image read by the reader unit.

The characters to be entered are not limited to alphabetic characters and numerals, but various symbols or kanji characters may be stored as font patters for enabling insertion of various information.

Also the font information need not necessarily be limited to the ones shown in FIG. 26A but may also include inverted ones shown in FIG. 26B, and various image editings are made easily possible in this manner, such as the printing of white characters on black background.

In the following the character input mode will be explained in further detail. The character input mode is classified into two, as shown in FIG. 28 wherein (1) indicates an original image while (2) and (3) are prints obtained in said modes. In the first character mode, input characters "X, Y, Z" are printed in an arbitrary position on the recording sheet, in overlay with the original image (1), to obtain a print (2). In the second shading mode, a designated pattern, indicated by a hatched area, is repeatedly printed in an arbitrary area of the original (1), in overlay with the original image (1), to obtain a print (3).

Figure 27A:
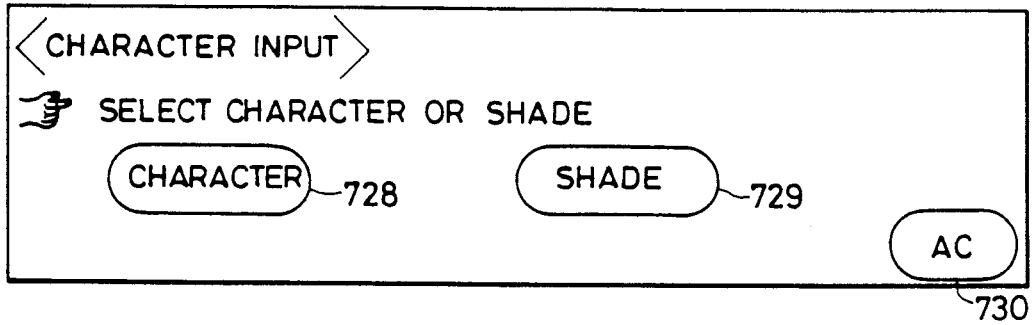
FIGS. 27A to 27C are views showing different states of a liquid crystal display unit.

In response to the depression of the character input key 134 on the editor, there is obtained a display shown in FIG. 27A, for selecting either of the above-mentioned two modes. Said character mode and shading mode cannot be designated at the same time, since they are realized with a same circuit. In FIG. 27A there are shown a character key 728 for selecting the character mode; a shade key 729 for selecting the shading mode; and all clear key 730 for cancelling the character or shade mode.

In the following the character mode will be explained in detail.

Figure 27B:
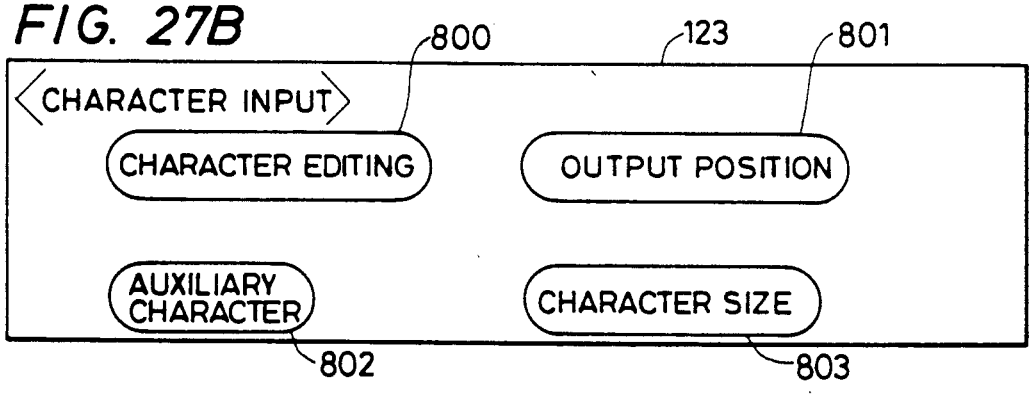

In the display state of FIG. 27A obtained on the liquid crystal display unit 123 in response to the depression of the character input key 134, a depression of the character key 728 changes the display to a state shown in FIG. 27B, wherein shown are a character edit key 800 for changing the display to a frame for entering characters to be overlaid; an output position key 801 for changing the display to a frame for determining the output position of the entered characters on the recording sheet; an auxiliary character key 802 for changing the display to a frame for registration of arbitrary character patterns; and a character size key 803 for changing the display to a frame for selecting the character size.

Figure 27C:
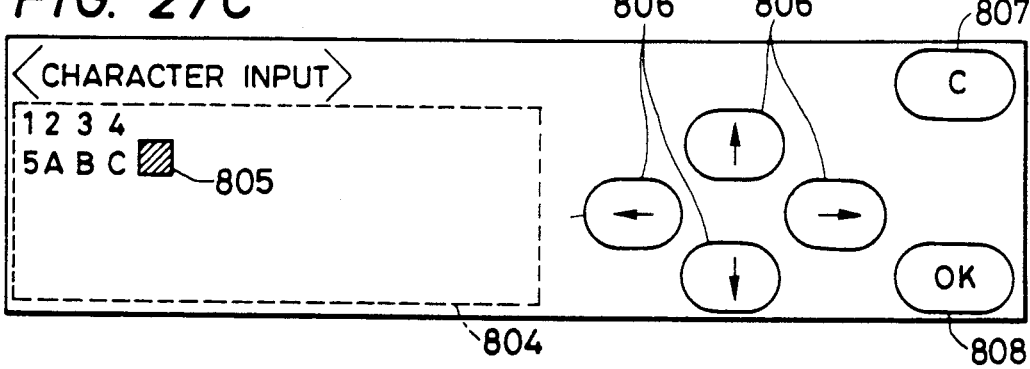

In response to the depression of the character edit key 800, the display changes to a state shown in FIG. 27C, which can display 16 character in the horizontal direction and 6 characters in the vertical direction, in a character area 804 indicated by broken lines.

The operator can move a cursor 805 to a desired character input position with cursor moving keys 806, and enter a character at the position of said cursor by designating a desired character (including a numeral or a symbol) on the character input board 143 of the editor with the pointer 138.

The operator also can correct an erroneously entered character by moving the cursor 805 on such character and entering a correct character. The depression of the clear key 807 erases all the characters and returns the cursor 805 to the start position.

In the following there will be given a detailed explanation on the control sequence of the CPU 210 in the character input with the character input board 143 of the editor, making reference to a flow chart shown in FIG. 29.

The position of the editor 213 pointed by the pointer 138 is transmitted to the CPU 210, through serial communication between the editor 213 and the CPU 210.

When the character input mode is set through the above-explained procedure (S11), there is obtained a display shown in FIG. 27C (S13). When a point on the editor 213 is pointed by the pointer 138, the CPU 210 discriminates whether the coordinate information of said point, supplied from the editor 213, is within the character input board 143 (S14). If it is within said board, the buzzer 39 is activated to inform the operator of a character input (S15), and a code corresponding to each pointed character (0 for "A", 1 for "B", ..., 144 for "auxiliary character 1", 145 for "auxiliary character 2", 146 for "auxiliary character 3" and 147 for blank) is determined and stored in the add-on display RAM 207 (S16). The entered character is displayed, and the cursor is normally advanced to right by a digit. If the cursor is at the right-hand end, it is moved to the left-hand end of a next row.

The characters displayed on the liquid crystal display unit 123 in FIG. 27C use a font matrix size of 8×8 dots same as that of the actually overlaid characters, but the auxiliary characters to be explained later are displayed in the actually registered font matrix.

Figure 27D:
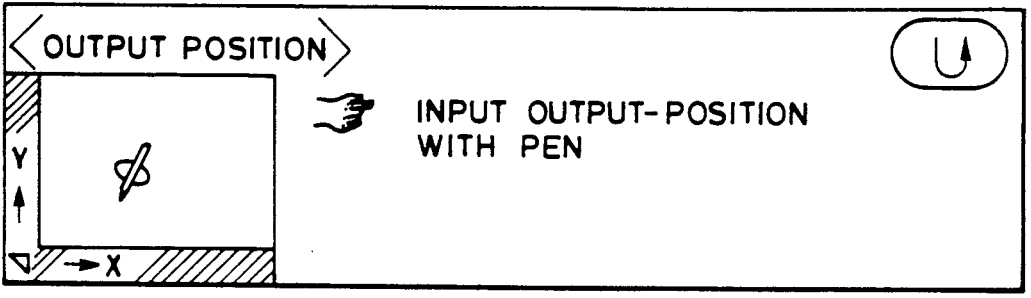
Figure 27E:
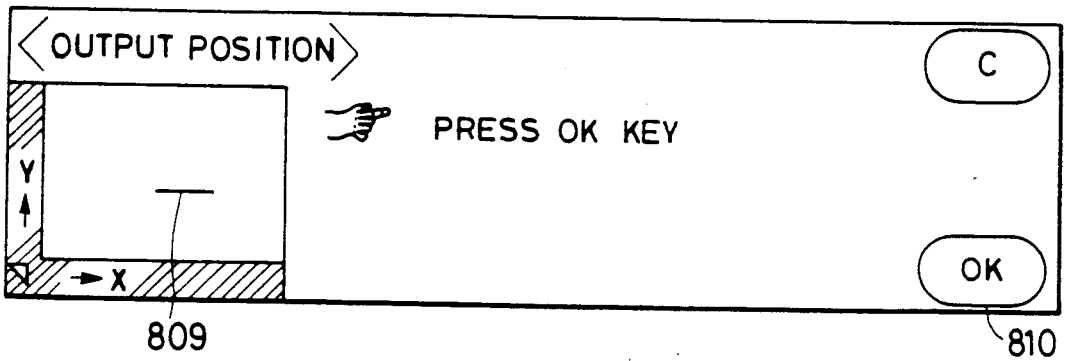

In the following there will be explained a case of depressing the output position key 801 in a display state shown in FIG. 27B. In response to said depression there is obtained a display shown in FIG. 27D on the display unit 123. Then a point on the coordinate input board 141, corresponding to the output position of the upper left corner of the first character "1" on the recording sheet, is pointed with the pointer 138, whereby the display is changed to a state shown in FIG. 27E and an approximate output position is displayed by a bar 809. Then the OK key 810 is depressed (pointed position being KP in FIG. 30), the output reference positions Xout, Yout are stored in a RAM 215, and the display is changed to a state shown in FIG. 27B.

In the following there will be explained a case of depressing the auxiliary character key 802 in a display state shown in FIG. 27B. In response to said depression the display changes to a state shown in FIG. 27F, in which the operator can arbitrarily set a font corresponding to the auxiliary character 1, 2 or 3 in a matrix of $8 \times 8$ dots. One of said auxiliary characters is selected by an auxiliary character-1 key 811, an auxiliary character-2 key 812 or an auxiliary character-3 key 813. For example if the auxiliary character-2 key 812 is depressed, the font information registered as the auxiliary character 2 is displayed in a matrix of $8 \times 8$ dots, in an auxiliary character registration area 819 indicated by broken lines.

Figure 27F:
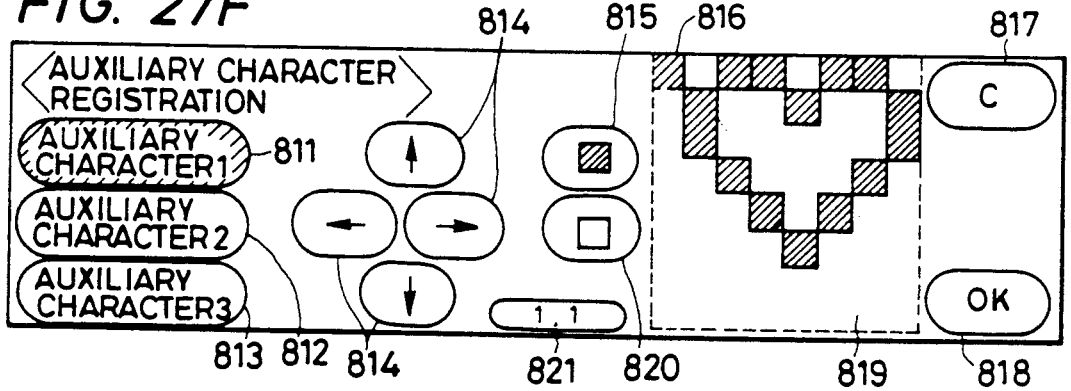

In the display state shown in FIG. 27F, the operator depresses an auxiliary character key, then moves a cursor 816 with cursor moving keys 814, and forms a desired pattern or character in the area 819 by using a black dot key 815 and a white dot key 820. All the dots in the area 819 are cleared to white state by depressing a clear key 144. Also the current cursor position is indicated in a cursor position indicator 821, so that the cursor position can be recognized even when the cursor is positioned on a black dot.

Figure 27G:
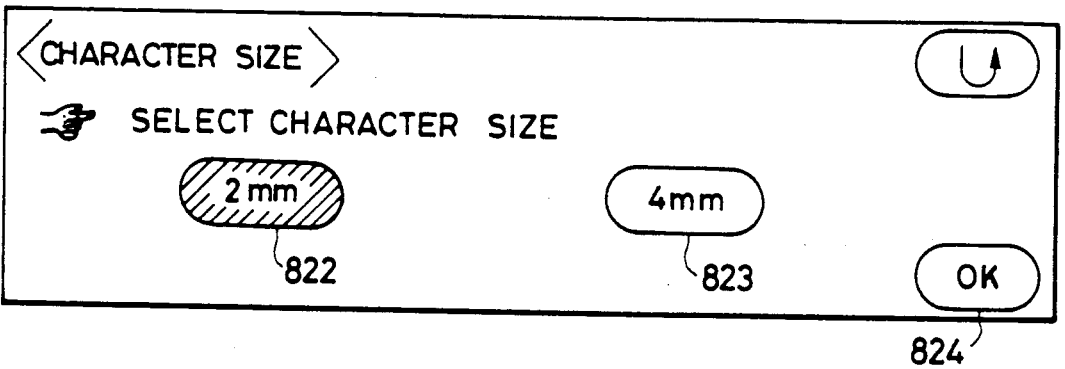

The pattern displayed in the auxiliary character registration area 819 is thus represented by 8 bytes and is stored in a back-up auxiliary font area (24 bytes for 3 characters) of the RAM 215, and can be used for the development data in the add-on RAM 205, in the same manner as the data of the add-on RAM 208. Then in response to the depression of the character size key 803 in a display state shown in FIG. 27B, there is obtained a display shown in FIG. 27G, in which a 2-mm key 822 or a 4-mm key 823 is selected. Either character size is set by the subsequent depression of the OK key 824, and the display returns to a state shown in FIG. 27B.

In the following the shade mode will be explained in detail.

Figure 27H:
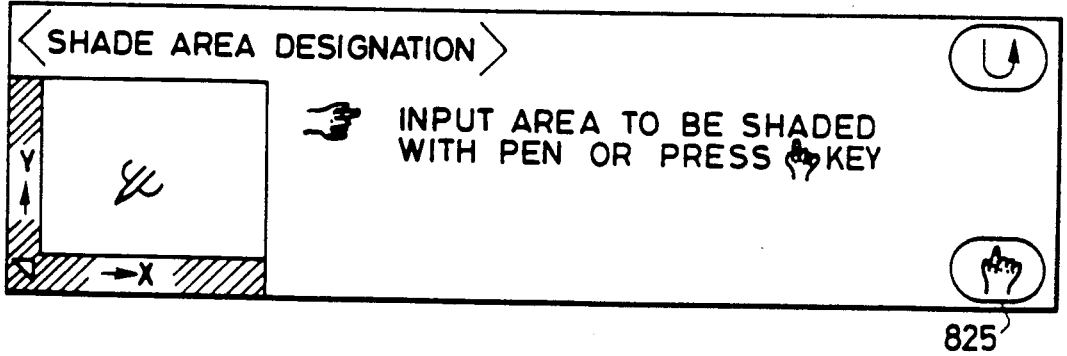
Figure 27I:
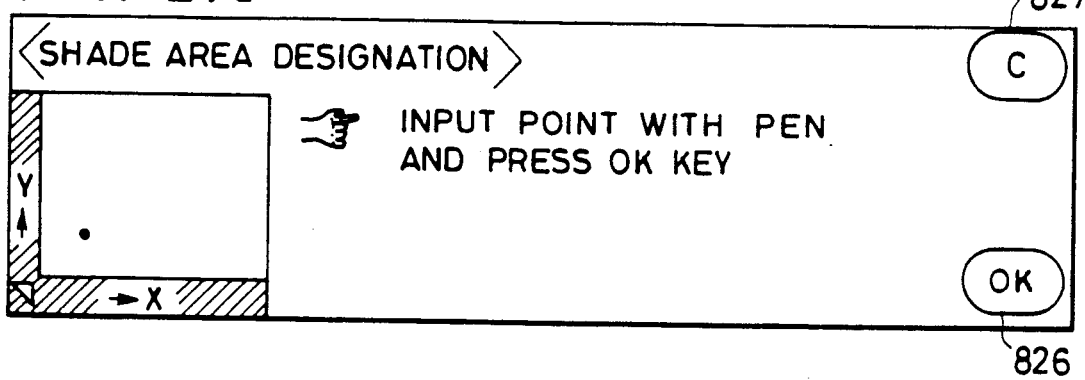
Figure 27J:
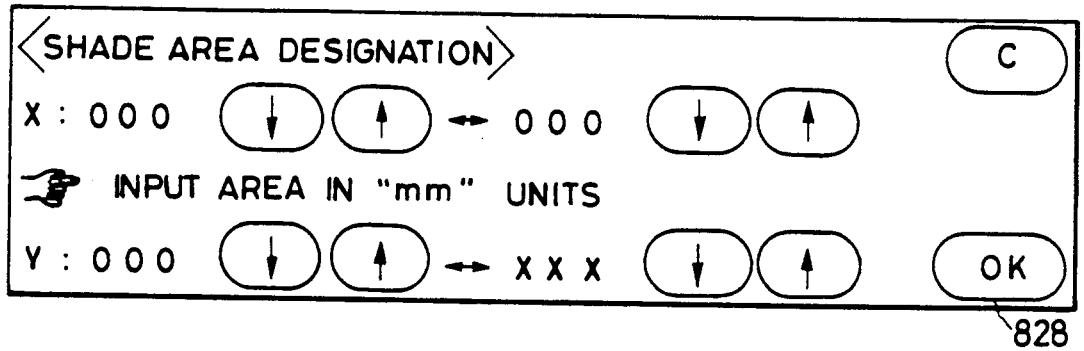

If the shade key 729 is depressed in a display state shown in FIG. 27A, the liquid crystal display unit 123 shows a frame shown in FIG. 27J or FIG. 27H respectively when the shade mode has been selected. In the following there will be explained the method of setting the shade mode for the first time.

In the display state shown in FIG. 27H, the operator maintains the original at the original reference position at the lower left corner of the coordinate input area 141 of the editor 213, and points, with the pointer 138, one of two diagonal points of a desired rectangular shading area on the original, or presses a key 825 on the touch panel. When said key 825 is depressed, there is obtained a display shown in FIG. 27J, on which the shading area can be set in the units of millimeters in the X and Y directions from the reference point of the original. On the other hand, if a diagonal point of the area is entered by the pointer 138 in the display state shown in FIG. 27H, the display changes to a state shown in FIG. 27I. The shading area can be determined by entering the other diagonal point with the pointer 138 and depressing the OK key 826. In this state the approximate positions of the entered points are displayed on a left portion of the liquid crystal display unit 123. A clear key 827 cancels the already entered points, thereby enabling the resetting of the area.

In this shade mode, auxiliary shading patterns can be registered as in the character input mode. After the setting of the shading area in the state of FIG. 27I or 27J, the depression of an OK key 826 or 828 changes the display to a state shown in FIG. 27K, in which the operator can select either shading with a registered pattern or shading with a pattern determined by the operator.

Figure 27K:
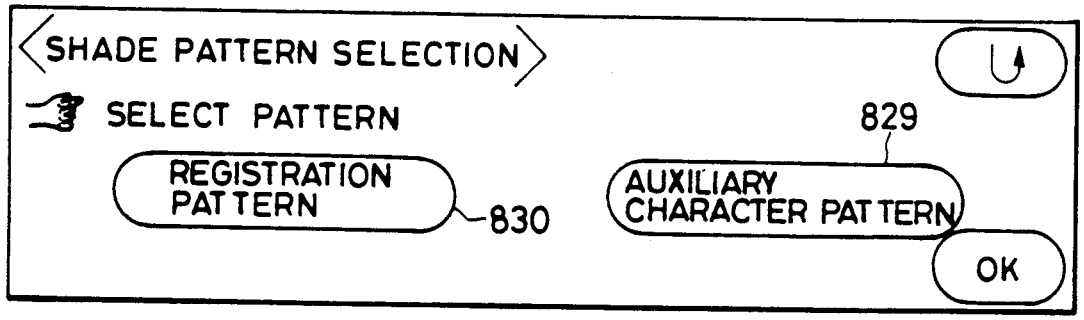
Figure 27L:
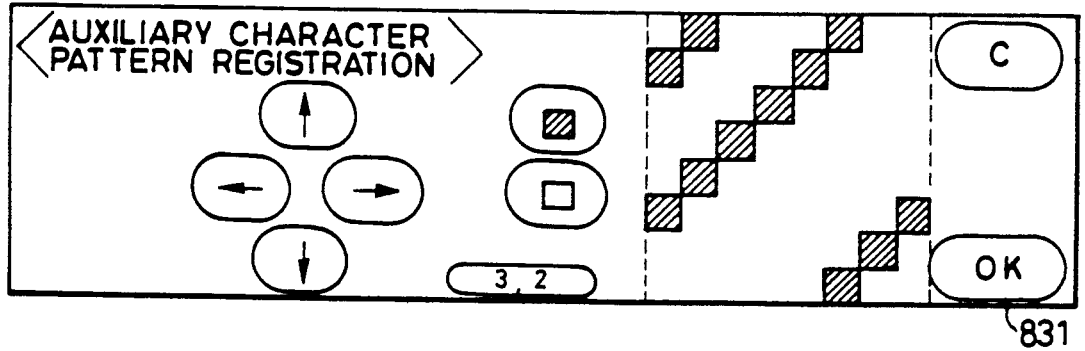

In a display state shown in FIG. 28K, the depression of an auxiliary pattern key 829 changes the display to a state shown in FIG. 27L in which the operator can arbitrarily determine a shading pattern of $8 \times 8$ dots. The procedure will not be explained in detail as it is similar to that for the registration of auxiliary characters in the character mode.

Figure 27M:
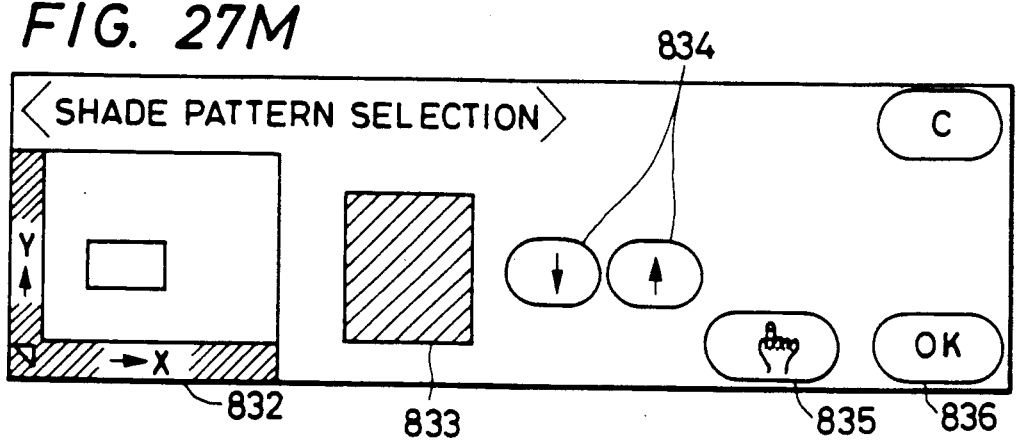

If the OK key 831 is depressed in this state or if a registered pattern key 830 is depressed in a display state shown in FIG. 27K, the display changes to a state shown in FIG. 27M in which the designated area is displayed in an area display 832 at left and the designated pattern is displayed in a pattern display 832 at the center.

Figure 27N:
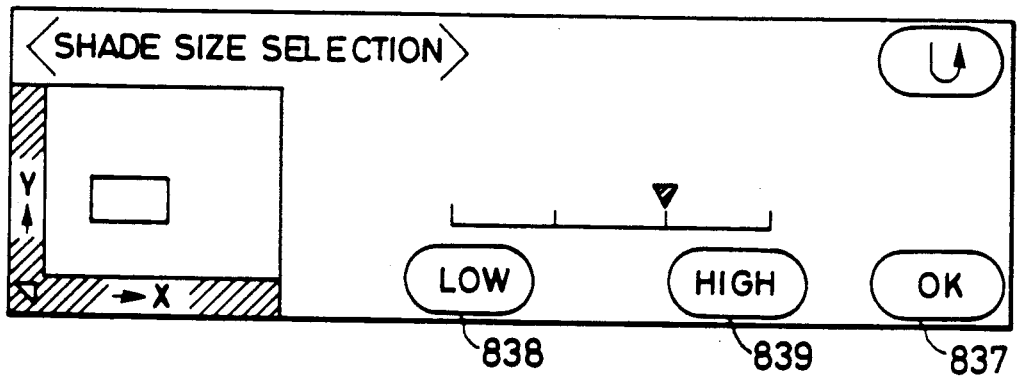
Figure 27O:
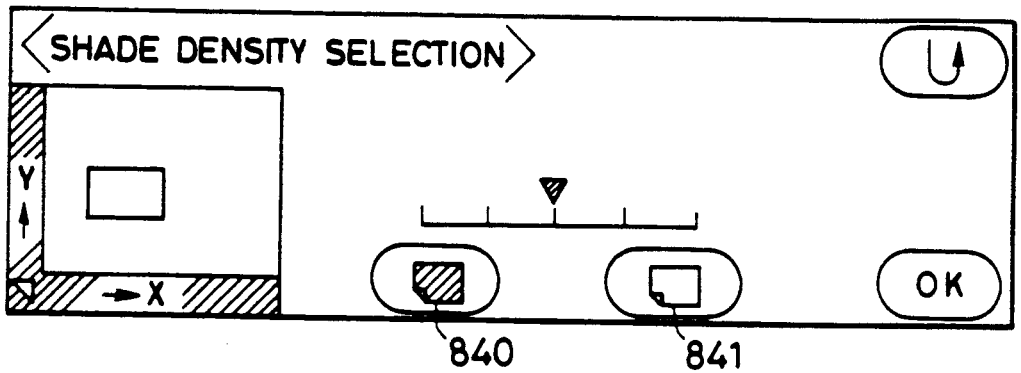

A pattern select key 834 cyclically select several shading patterns registered in advance and the auxiliary pattern, in a sequence of registered pattern 1→registered pattern 2→....→registered pattern N→auxiliary pattern→registered pattern 1 or in the inverse order, and each pattern is displayed with $32 \times 32$ dots at the pattern display 832. Also the depression of a touch panel input key 835 changes the display to a state shown in FIG. 27J, thereby enabling the resetting of the shading area. If the OK key 836 is depressed in a display state shown in FIG. 27M, the display changes to a state shown in FIG. 27N, in which the size of the shading pattern can be designated with size keys 838, 839. Then the actuation of the OK key 837 changes the display to a state shown in FIG. 27O in which the density of the shading pattern can be selected with a density increasing key 840 and a density reducing key 841.

Figure 31:
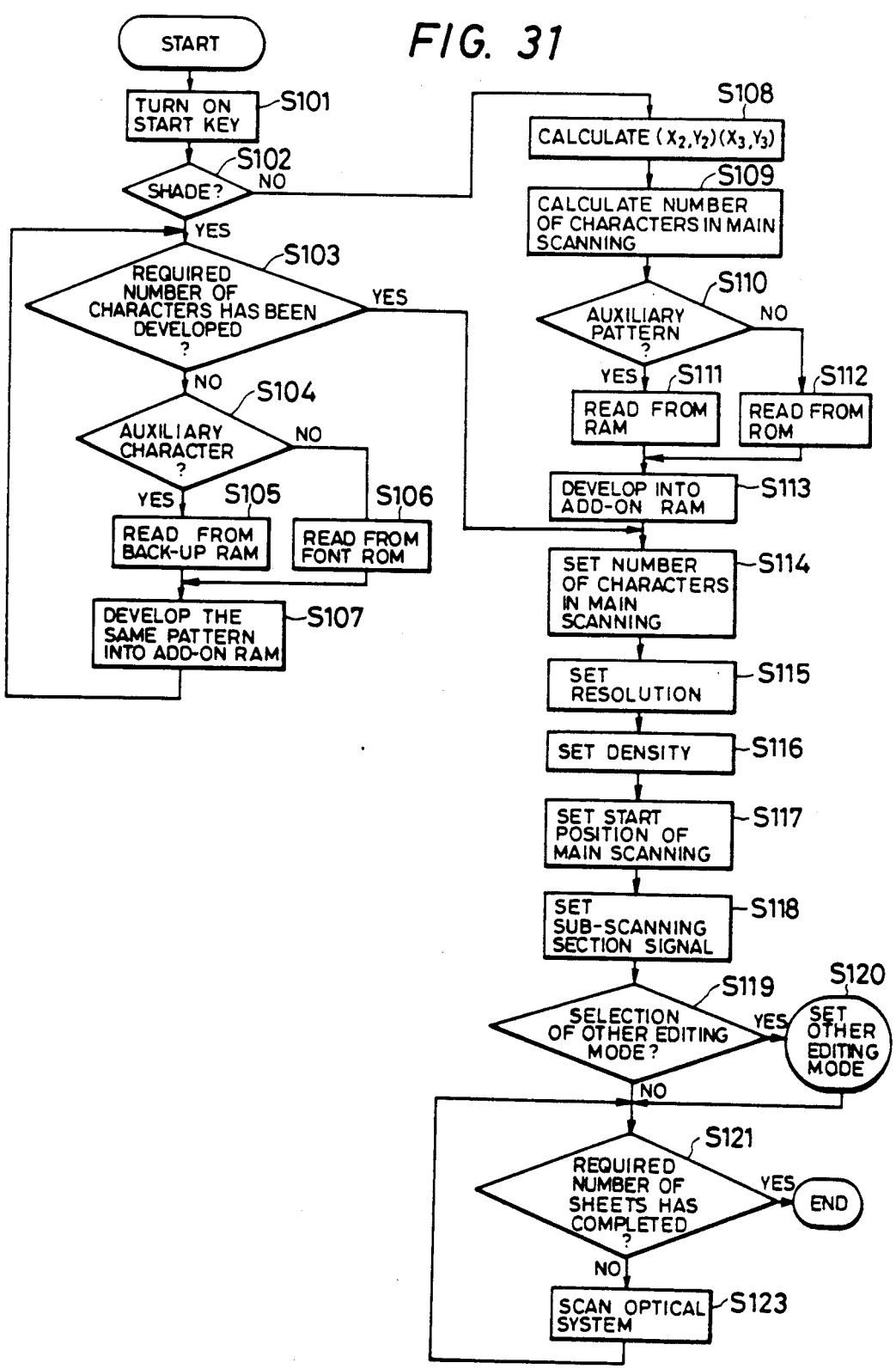
FIG. 31 is a flow chart showing the sequence of a copying operation.

In the following there will be explained the image processing in the character mode or the shading mode designated in the above-explained procedure. The control sequence of the CPU 210 is shown in FIG. 31. The add-on image generating circuit is same as that shown in FIGS. 21 and 22.

At first there will be explained a case of printing the characters shown in FIG. 27C in the character mode.

Figures 1, 32:
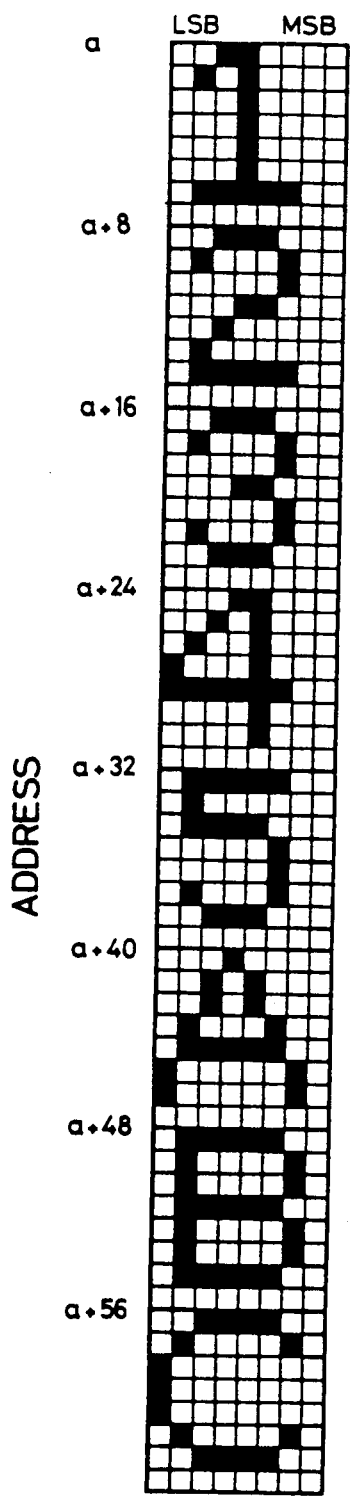
Figures 2, 32:
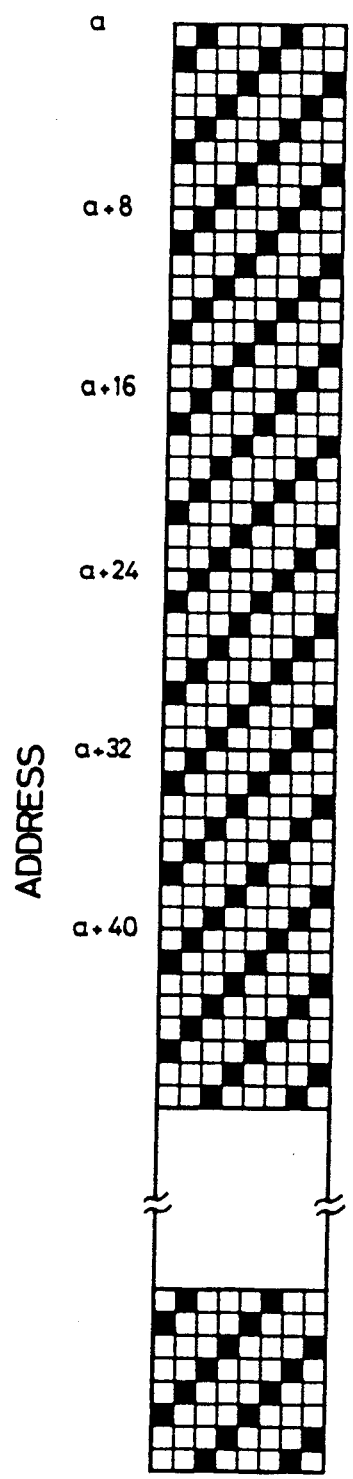

After the actuation of the start key (S101), the CPU develops the font data, corresponding to the character codes stored in the add-on display RAM 207, in the add-on RAM 205 constituting a bit map memory. Since the example shown in FIG. 27C does not contain an auxiliary character, the font data are all obtained from the add-on font ROM 208 (S106). If an auxiliary character is used, corresponding font data are read from a part of the back-up RAM 215 (S105), and are developed in the add-on RAM 205 (S107). In the present embodiment, for reading the font data of $8 \times 8$ dots, the add-on RAM 205 has a capacity, in number of bytes, equal to $8 \times$ the maximum number of characters in the main scanning direction, enough for accommodating the maximum number of characters that can be displayed in the character area 804 in FIG. 27C. FIG. 32-1 shows the development of the characters of FIG. 27C, in the add-on RAM 205. In this example the development is made in the form of 4 characters in the horizontal direction and 2 characters in the vertical direction, since 13 blank characters following the characters "1234" need not be recorded.

The add-on image generating 206 makes access to said add-on RAM 205 to read the font data at addresses a, a+8, a+16, a+24, ... shown in FIG. 32-1 to obtain a main scanning line, and then to read the font data at addresses a+1, a+9, a+17, a+25, ... to obtain a next main scanning line. Binary image data corresponding to FIG. 30 can be obtained by repeating the above-explained procedure.

Also the character size can be varied by controlling the clock signal used for reading data from the add-on RAM 205. As the copying apparatus of the present embodiment can provide a resolving power of 50, 100, 200 or 400 dpi (dot/inch), a character size of about 4 or 2 mm can be obtained by releasing a matrix of 8×8 dots with a resolving power respectively of 50 or 100 dpi. Said character size can be selected in a display state shown in FIG. 27G. It is also possible to regulate the density of the characters by adding means for giving a designated density for the image information corresponding to the binary signal "1" read from the add-on RAM 205, but, in the character input mode, a black level is automatically given without the selection of density by the operator.

The CPU 210 calculates the number "4" of characters in the main scanning line from the input data in FIG. 27C, and sets said number in the main scanning character number latch 428 (S114), whereby the sequential order of data reading from the add-on RAM 205. Then a resolving power corresponding to the above-explained character size is set in the resolution latch 429 (S115), and the density of image information corresponding to the signal "1" read from the add-on RAM 205 (said density being "256" corresponding to black) is set in the add-on latch 422. Also a signal "0" is set in the mode latch 436 for releasing the original image information in response to a signal "0" read from the add-on RAM 206 (S116). It is also possible to set, in the designated density latch 423, a density of the image information corresponding to "0" read from the add-on RAM 205 and to select said designated density or the above-mentioned original image information by the selector 432, but, in the present embodiment, the selector 432 always selects the original image information at the input A.

Figure 30:
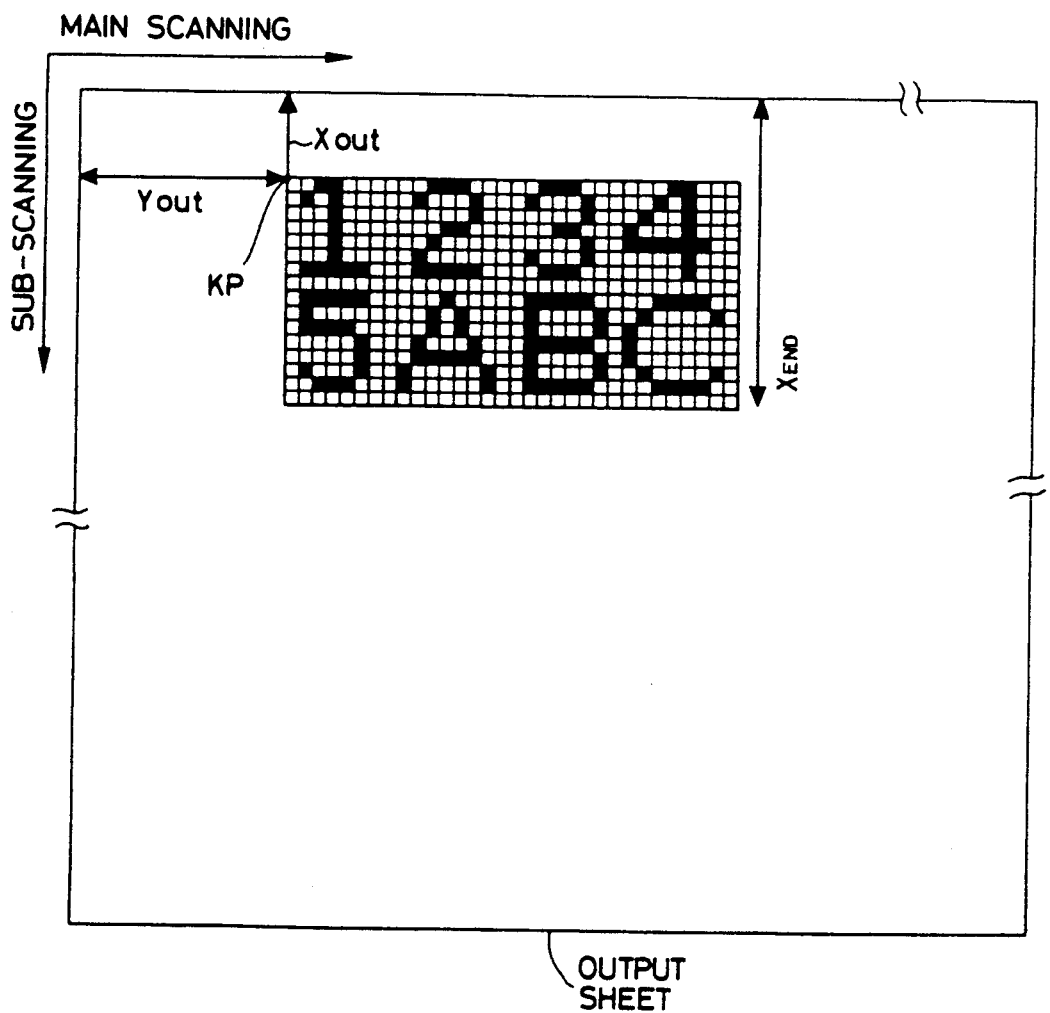

Then the main scanning start position of the information to be added on, namely a signal corresponding to Yout in FIG. 30, is set in the main scanning start latch 437 (S117). More specifically the CPU 210 calculates the output timing of the ripple carry signal of the main scanning counter 435, and sets the calculated value as the load value of said counter 435, into the main scanning start latch 437. Said main scanning counter 435 loads an initial value from the latch 437 and starts a counting operation in response to the main scanning reference signal BD. The ripple carry signal from the counter 435 is used as the add-on main scanning start signal, corresponding to the position Yout shown in FIG. 30. Also a value Xend is calculated from the sub-scanning start position Xout, the number of characters in the sub-scanning direction ("2" in the example shown in FIG. 27C and the resolving power and is set in the sub-scanning counter 209, there enabling generation of the add-on sub-scanning section signal ADST (S118). Then, if any other editing mode, such as size change, shifting or trimming, is designated (S119), parameters corresponding to such editing mode are set in the image processing circuit 202 (S120), and the original scanning operation is conducted for a number of times corresponding to the number of necessary copies (S121, S123).

In this manner it is rendered possible to obtain prints in which characters of a desired size and a desired density are synthesized in a desired position on the recording sheet.

In the following there will be given an explanation on the copying operation in the shading mode, giving emphasis to the difference from the preceding character mode.

In the character mode, the output position is defined with respect to the recording sheet. On the other hand, in the shading mode, the area set in the displays of FIGS. 27H, I and J is defined with respect to the original. Consequently the position of said area changes on the recording sheet by an image editing process such as size change or image shifting. As explained in the foregoing, the add-on information is synthesized in the synthesizing circuit 203 with the original image information after being subjected, in the image processing circuit 202, to such size change or image shift, so that the output position of said add-on information can be designated on the recording sheet.

On the other hand, in the shading mode, such image editing process gives rise to an effect different from that in the character mode, since said designated area is different from the output area. The add-on image data for the entire shading area in the add-on RAM 205 is equivalent to the bit map of the add-on image data, so that the pattern information of 8×8 dots is repeatedly stored in the add-on RAM 205 of a capacity, in number of bytes, equal to 8× maximum number of characters in the main scanning direction, and thus stored information is read in the same manner as in the character mode explained before. However, the data reading in the shading mode is different from that in the character mode in that the data reading from the add-on RAM 205 is repeated plural times and the obtained output is gated by the sub-scanning section signal ADST, in order to provide the pattern information over the entire output area designated before.

Figures 1, 33:
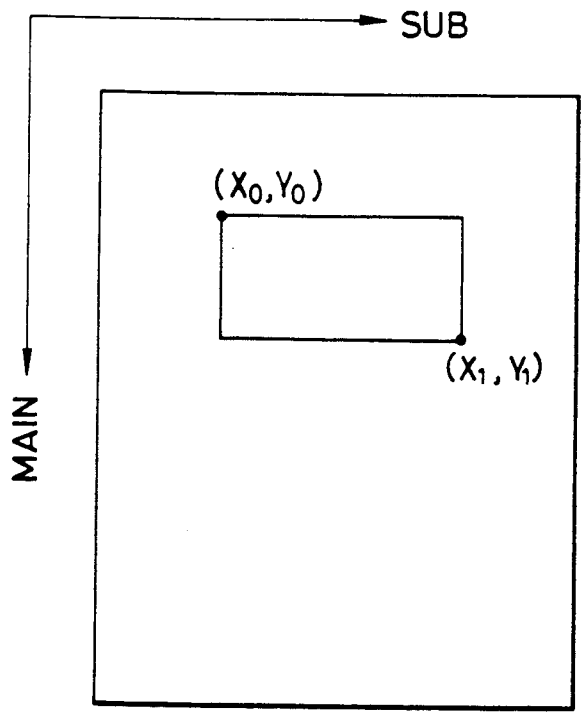
Figures 2, 33:
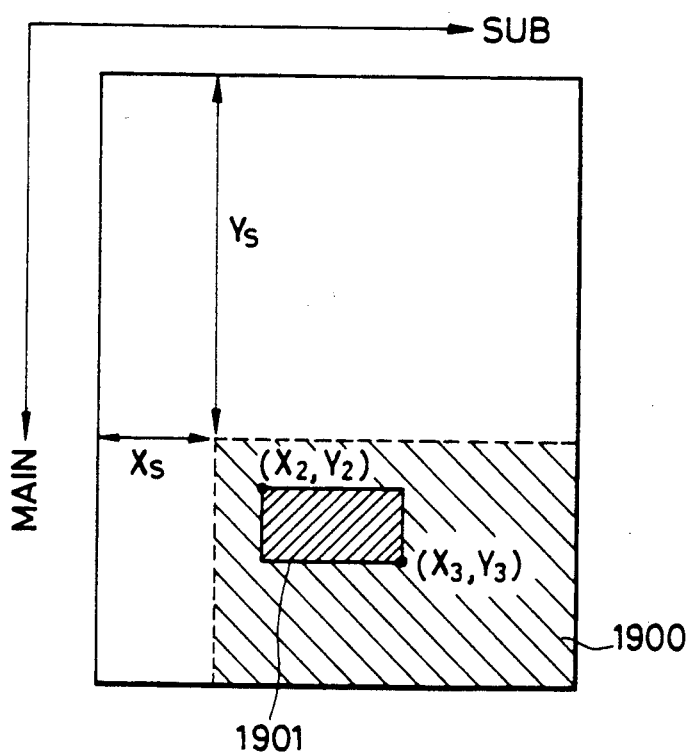

Now reference is made to FIG. 33 for explaining a reproduction ratio zoomX in the X-direction, a reproduction ratio ZoomY in the Y-direction, amounts Xs, Ys of designated shift, and a shading area (X0, Y0), (X1, Y1) set in the display of FIG. 27J. In FIG. 33, (1) indicates an original, and (2) indicates a recording sheet after printing.

As explained in the foregoing, the image processing circuit 202 executes a size change according to values ZoomX, ZoomY, and an image shift according to values Xs, Ys, thereby generating an image 1900 coarsely hatched in FIG. 23-2. Consequently the add-on image generating circuit 206 has to generate the shading pattern in an area 1901 defined by (X2, Y2) and (X3, Y3), and the coordinates of said is calculated by $X2=Xs+X0\times ZoomX$, $Y2=Ys+Y0\times ZoomY$, $X3=Xs+X1\times ZoomX$ and $Y3=Ys+Y1\times ZoomY$ (S108 in FIG. 31). (X0, Y0) and (X1, Y1) are coordinates of the shading area set in FIGS. 27H, 27I and 27J.

Then the number of patterns in the main scanning direction (number of characters in the main scanning direction) is calculated from (X3−X2) and the shading pattern size (or resolution) (S109). The main scanning start position is set as Y2, and the sub-scanning section signal is set as X2, X3 (S117, S118), and the pattern of 8×8 dots selected in the display of FIG. 27M is repeatedly recorded in the add-on RAM 205 as shown in FIG. 32-2, and, in the circuit shown in FIG. 22, the data reading from the add-on RAM 205 is so controlled that the address returns from the final value to the initial value. Since the pattern of 8×8 dots is recorded over the entire add-on RAM 205, same pattern is repeatedly released in the sub-scanning direction. However, as the released signal is finally gated by the sub-scanning section signal ADST, said pattern is overlaid in a desired area on the recording sheet.

The output area corresponding the shading area designated on the original is automatically corrected according to the image editing such as size change or image shift as explained above, so that the shading can be made on a desired area of the original image even when an image editing is applied to said original image.

Also the size of the shading pattern can be designated independently from the enlargement or reduction of the original image, so that a desired shading can be obtained.

In the present embodiment the pattern size is determined by controlling the clock signal for reading the data from the font memory means, so that the pattern size becomes larger when the resolution is made higher (pattern area increases to 4 times when the resolution is made to ½). In the present embodiment, instead of controlling the clock signal, it is also possible to calculate the addresses by the CPU 210 in consideration of the printer output, and to develop thus calculated addresses in the add-on RAM 205. Such method will however increase the load of the CPU 210, and also requires the work for preparing a software for driving the CPU 210.

In the present embodiment, the pattern is formed by repeating the font of 8×8 dots in the main and subscanning directions, but it is also possible to generate the pattern by develop the font of at least a main scanning line in the add-on RAM 205 and repeating said font in the sub-scanning direction. However, there is in fact required only one font of 8×8 dots, the memory capacity of the add-on RAM 205 can be economized by repeating such font.

FIG. 34 shows another embodiment of the add-on image generating circuit, which can generate a pattern of a large size without sacrificing the resolving power, by repeating the data reading from the add-on RAM by a designated number of times in the main scanning direction.

Since the circuit shown in FIG. 34 is a modification of the circuit shown in FIG. 21, there will be given an explanation only on the modified parts, and other parts will not be explained.

In said modified parts, the operator selects to use the ordinary information add-on or the repeated pattern, and a flip-flop 602 is accordingly set in such a manner that the output Q thereof assumes a level "1" or "0" respectively in case of ordinary add-on or repeated pattern. In a case of the ordinary add-on, newly added gates 601, 603, 604 are turned on to achieve a function same as that in FIG. 21. On the other hand, in a case of the repeated pattern, the gate 603 is closed whereby the output of an AND gate 410 is supplied directly to an OR gate 601. Consequently, at each coincidence signal from a comparator 409, the main scanning character number counter 403 is initialized to repeat same values in the output signal RCP.

Thus, by setting the number of repetition (for example 4 characters or 4 patterns) in the main scanning character number latch 428, 4 characters are repeated in the main scanning direction. Though a pattern is normally has a size of 8×8 dots, it is also possible to form a pattern of a size of 16×16 dots, by repeating two different patterns of 8×8 dots each in the main scanning direction and repeating two other different patterns in the next main scanning line.

In the following there will be explained the method of renewing the add-on characters in a copying operation with an automatic original feeder.

Figure 35:
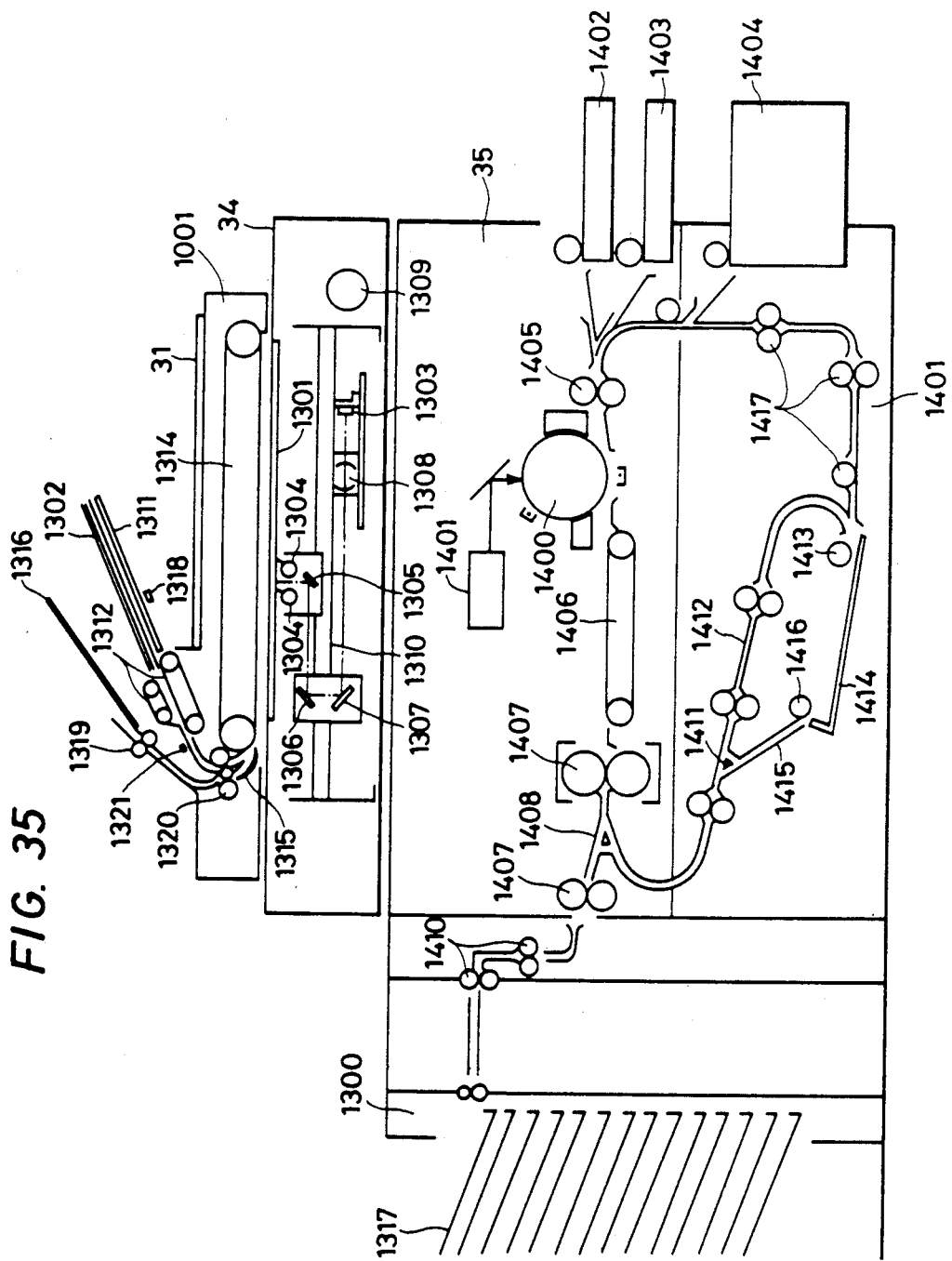
FIG. 35 is a cross-sectional view of a copying apparatus embodying the present invention.

FIG. 35 shows a copying apparatus embodying the present invention, composed of a reader 34 for reading the original image; a printer 35 for recording an image on a recording sheet; an automatic document feeder (ADF) 1001 for automatically feeding the originals to the reader 34; a two-side unit 1401 for feeding the recording sheets after image recording again to the printer; and a sorter 1300 for collating the recording sheets after image recording.

The image information of an original 1302, placed by the operator on a platen 1301, composed for example of a glass plate, of the reader 34, or automatically fed onto said platen 1301 by the ADF 1001, is read by an image sensor 1303 containing a linear array of plural photosensor elements, such as a CCD line sensor. The illuminating light from a light source 1304 is reflected by the original 1302, guided through mirrors 1305, 1306, 1307 and focused by a lens 1308 on the CCD 1303. A unit of the light source 1304 and the mirror 1305 and another unit of the mirrors 1306, 1307 are reciprocated on a rail 1310 with a relative speed ratio 2:1 in order to scan the entire area of the original. The optical system composed of the mirrors 1305, 1306, 1307 and the light source 1304 is driven by a DC servo motor 1309 at a constant speed under phase locked loop control. Said speed is variable from 90 to 360 mm/sec according to the reproduction ratio in the forward movement from left to right, but is constant at 630 mm/sec in the reverse movement from right to left.

The moving direction of said optical system is called the sub-scanning direction, and a direction substantially perpendicular thereto is called the main scanning direction. The photosensor elements of the CCD 1303 are aligned along said main scanning direction, and the original is read on each main scanning line by said CCD 1303 with a resolving power of 400 dot/inch, while said optical system is moved from left to right and finally returned to the left-hand end. In this manner a scanning operation is completed. The image read by the CCD 1303 is released as a serial digital image signal representing the image density.

In the following there will be explained the function of the ADF 1001 for automatically feeding the originals onto the platen 1301 of the reader 34. On said ADF 1001 there is provided the aforementioned editor 31 for setting various image processing modes.

One or plural originals 1302 are placed, with their images upwards, on an original stacker tray 1311 of the ADF 1001. In response to the actuation of the start key in the operation unit of the reader 34, an original feeding instruction is supplied from the reader 34 to the ADF 1001, which separates the lowermost one of the originals placed on the stacker tray 1311 by means of separating belts 1312 and transports said separated original onto the platen 1301 by means of a transport roller 1313 and a conveyor belt 1314. The original image is read in this state.

After the original reading of a number of times determined by the operator, the conveyor belt 1314 is reversed, and the original is moved by a deflecting cam 1315 toward transport rollers 1320, 1319 and discharged onto a discharge tray 1316. As already known, the original is so controlled as to exactly stop on the platen 1301 by means of sheet sensors (1321 and other unrepresented ones) provided on the sheet path and an unrepresented timing pulse generator so provided as to generate pulses in synchronization with the roller driving system.

If plural originals are placed on the stacker tray 1311, after the completion of reading of the original fed to the platen 1301, a next original on the stacker tray 1311 is fed in synchronization with the discharge of the preceding original from the platen 1301, and the reading operation is executed automatically in succession for the plural originals until all the originals on the stacker tray 1311 are read. A sensor 1318 is provided for detecting the originals on the stacker tray 1311.

In the following there will be explained the function of the printer 35 for recording an image on a recording sheet, in response to the image signal supplied by the original reading operation of the reader 34.

When a start instruction is given through the communication with the reader 34, the printer 35 starts the rotation of various units and activates a high-voltage unit. After the completion of a predetermined preparatory operation, and in response to a sheet feed start signal from the reader 34, sheet feeding is started from a designated sheet feeding deck (upper cassette 1402, lower cassette 1403 or a paper deck 1404). Upon reaching registration rollers 1405, the recording sheet is once stopped, and is fed again in synchronization with the latent image formation on a photosensitive drum 1400 with a laser beam from a laser unit 1401, modulated by the image signal from the reader 34.

The latent image formed on the drum 1400 is developed into a visible image by a known electrophotographic process, and thus developed image is transferred onto the recording sheet fed as explained above. Said recording sheet is then supplied, through a transport unit 1406, to a fixing unit 1407, and the image recording on a first face of the recording sheet is completed in this manner.

If two-sided recording or overlay recording is selected, the recording sheet is guided toward the two-side unit 1401 by a deflecting cam 1408. Said two-side unit 1401 guides said recording sheet again to the photosensitive drum 1400, after sheet inversion through a path 1412 in case of two-sided recording, or without inversion through a deflecting cam 1411 and a path 1415 in case of overlay recording. The recording sheets introduced into the two-side unit 1401 are stacked, by a transport roller 1413 or 1416, on an intermediate tray 1414. When a required number of sheets, after image recording on the first faces thereof, are stacked on the intermediate tray 141, said sheets are transported, in response to a second face copy start instruction from the reader 34, through transport rollers 1413 and 1417, one by one to the registration rollers 1405. In the same manner as the image formation on the first face, the image formed on the photosensitive drum 1400 is transferred, and the recording sheet is transported through the fixing unit 1407, deflecting cam 1408 and transport rollers 1409, 1410 to the sorter 1300 to be explained later. In this manner the two-sided recording or the overlay recording on one side is achieved.

On the other hand, if the two-sided recording or the overlay recording is not selected, the recording sheet after image recording on the first face is not guided to the two-side unit 1401 but is discharged to the sorter 1300 through the deflecting cam 1408 and transport rollers 1409, 1410.

The operating mode of the sorter 1300 (sort mode, collate mode or non-sort mode) is transmitted thereto through communication with the reader 34 at the start of the recording operation. Consequently, upon detection of a sheet with an unrepresented sensor mounted on transport rollers 1410, the sorter 1300 functions according to the designated operating mode. For example, in the sorting mode, after receiving a recording sheet, bins 1317 are shifted upwards by a step to receive the next sheet in a next bin. In the illustrated sorter, the collating operation is achieved by vertical movement of the bins 1317. In the collating mode, the bins are shifted upwards every time the original is changed, and, in the non-sorting mode, the sheets are always discharged into the uppermost bin.

The operation unit 143 and the editor 31 provided on the upper face of the reader 34 will not be explained as they are same as those explained in FIG. 3A. Also the control unit of the copying apparatus is same as that explained in FIG. 4.

Exchange of control signals with the ADF 1001, two-side unit 1401 and sorter 1300 is achieved through the I/O port shown in FIG. 4.

The above-explained structure enables, for example, the image editing shown in FIG. 36 in which (1)–(3) indicate three originals, while (4)–(6) indicate five one-sided copies each, respectively obtained from said originals. The copies (4), (5) and (6) respectively obtained from the originals (1), (2) and (3) respectively have add-on characters "MURAM 178", "MURAM 179" and "MURAM 180" on the lower right corner thereof.

In the following there will be explained the procedure for obtaining such copies as shown in FIG. 36.

Figures 1, 37:
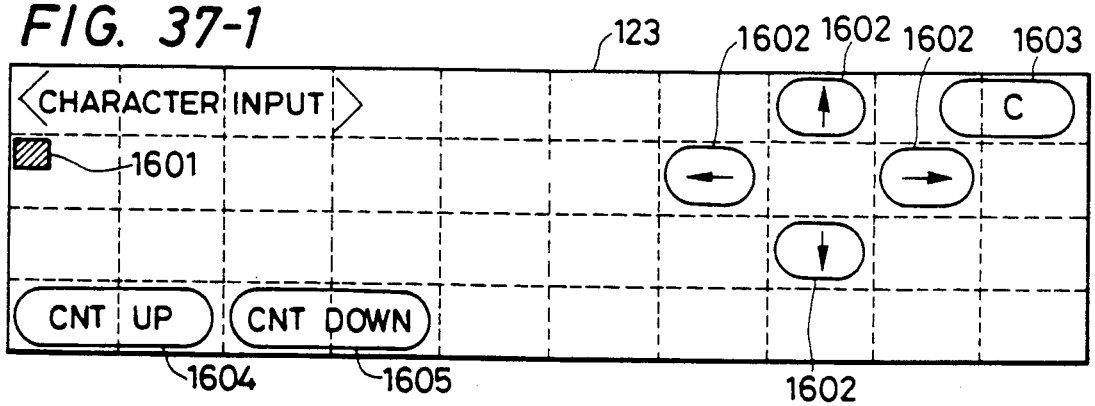
Figures 2, 37:
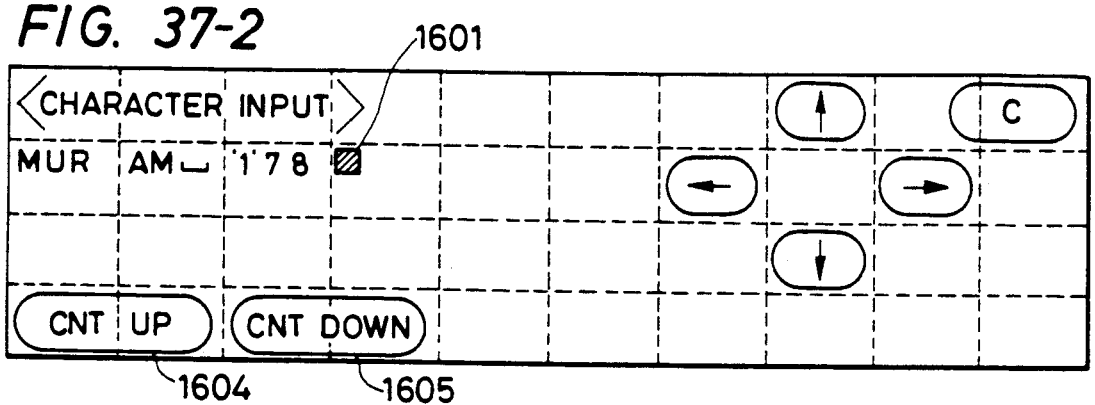
Figures 3, 37:
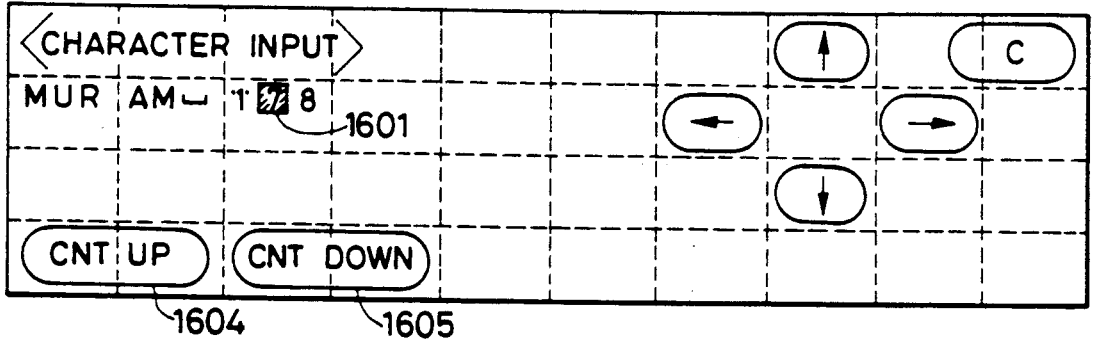
Figures 4, 37:
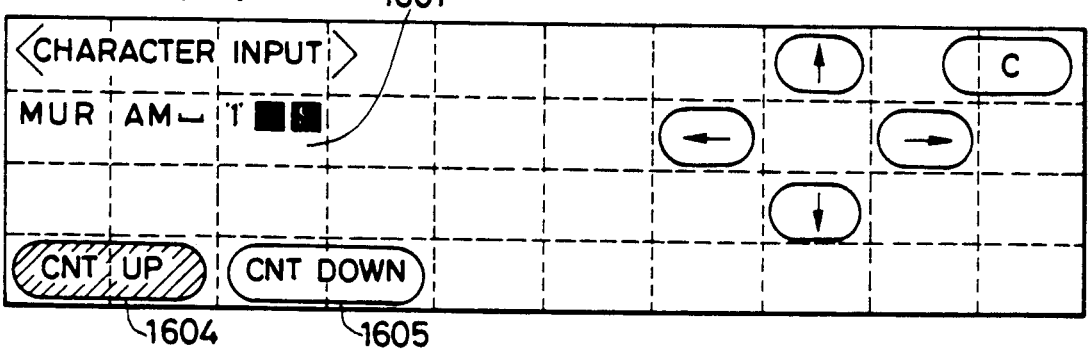

At first there will be explained the procedure of character input by means of the character input board 143 of the editor. FIG. 37 shows various display states of the liquid crystal display unit 123 at the character input.

In response to the depression of the character input key 134 of the editor, the liquid crystal display unit 123 provides a state shown in FIG. 37-1. Said display unit is in communication with the CPU 210, and each area divided by the broken lines can function as an input key for the CPU 210. A cursor 1601 flashes at the position of character input, and can be moved in the horizontal or vertical direction with cursor moving keys 1602. The operator can correct an erroneous character input by moving the cursor 1601 to the erroneously entered character and entering a character again. Also all the characters are erased by a clear key 1603.

In the following there will be explained the procedure of entering characters with the editor.

Figure 38:
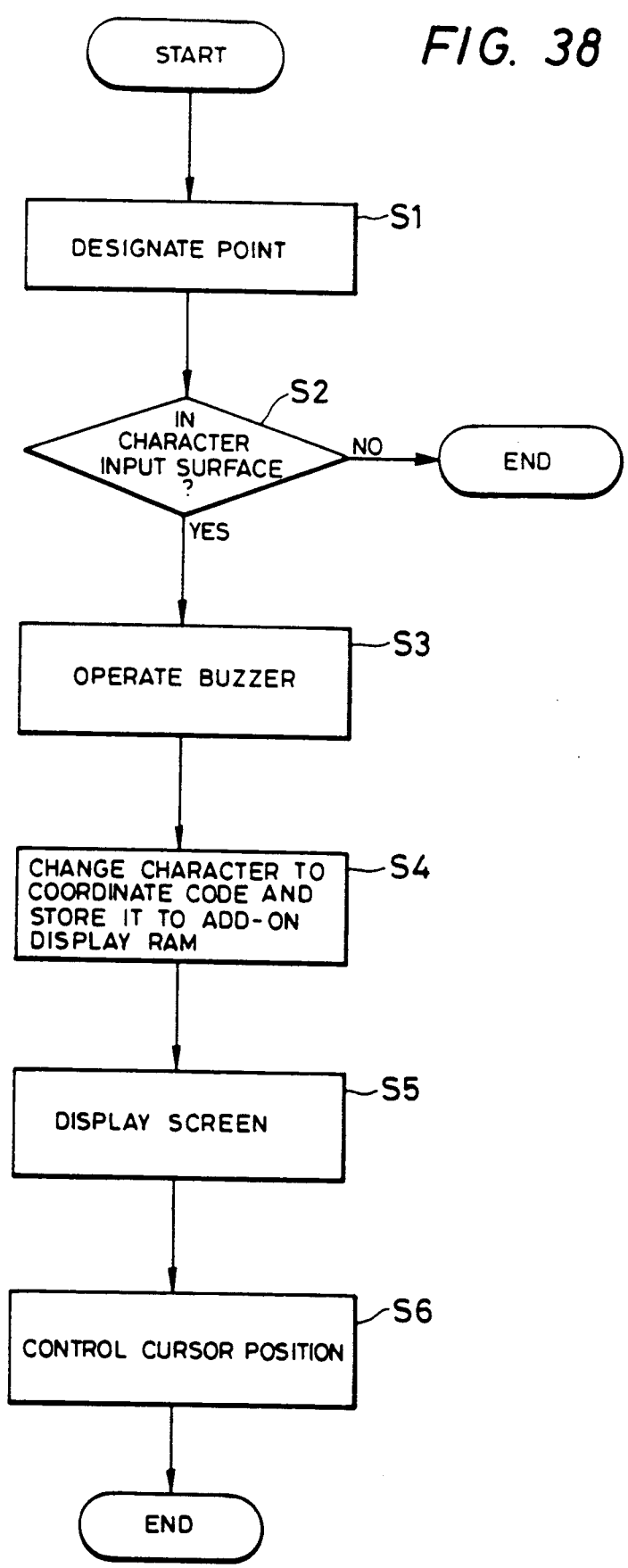
FIGS. 38, 40 and 41 are flow charts showing control sequence of the CPU.

A position on the digitizer 139 of the editor pointed to by the pointer 138 is transmitted to the CPU 210 through serial communication between the editor and the CPU 210. FIG. 38 shows the control sequence of the CPU 210 for the character input.

Figures 1, 39:
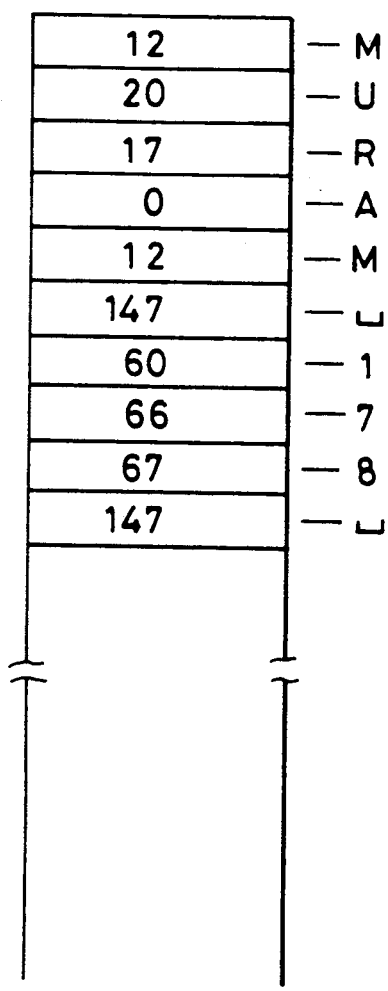
Figures 2, 39:
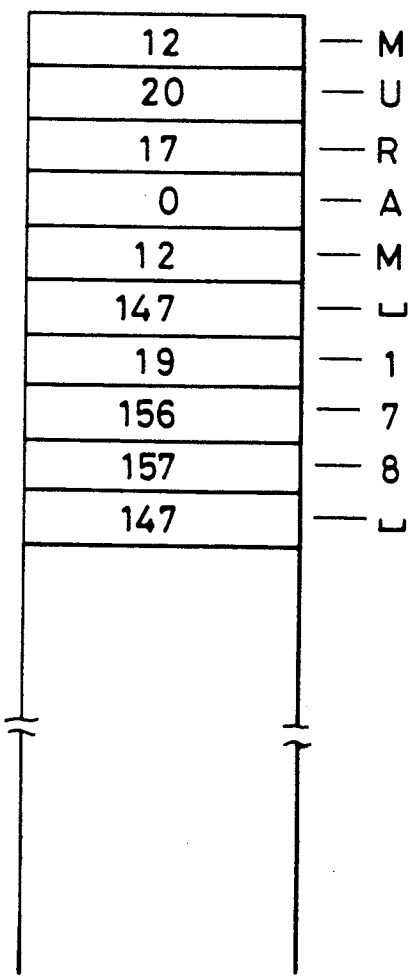

When a position on the editor is pointed to by the pointer 138 (S1), there is discriminated whether the coordinates of said position transmitted from the editor are within the character input board 143 (S2). If said position is within the board 143, the buzzer 39 is activated to inform the operator of a character input (S3), and a code corresponding to each character (0 for "A", 1 for "B", ..., 147 for "blank") is determined and stored in the add-on display RAM 207 (S4). Said character is displayed on the display unit 123 (S5), and the cursor is normally advanced to right by a digit. If the cursor is at the right-end position, it is moved to the left-end position in a next row. FIG. 37-2 shows an example of display, and FIG. 39 shows the corresponding content of the add-on display RAM 207, in which "L" indicates a space.

The operator can enter a desired character in this manner.

In the following there will be explained a count up/-down mode utilizing the character input mode.

The count up/down mode can overlay numerals with the original image information, with stepwise increment or decrement of said numerals as shown in FIG. 36, and can be utilized for numbering the copies or attaching page numbers thereto.

In FIG. 37, there are shown a count up key 1604 for designating a count up mode, and a count down key 1605 for designating a count down mode.

At first the operator enters an initial value of the number to be counted up or down, in the same manner as in ordinary character input. FIG. 37-2 shows a state after such number input, in which, after the entry of a number "178", the cursor 1601 is positioned next to the numeral "8".

Figure 40:
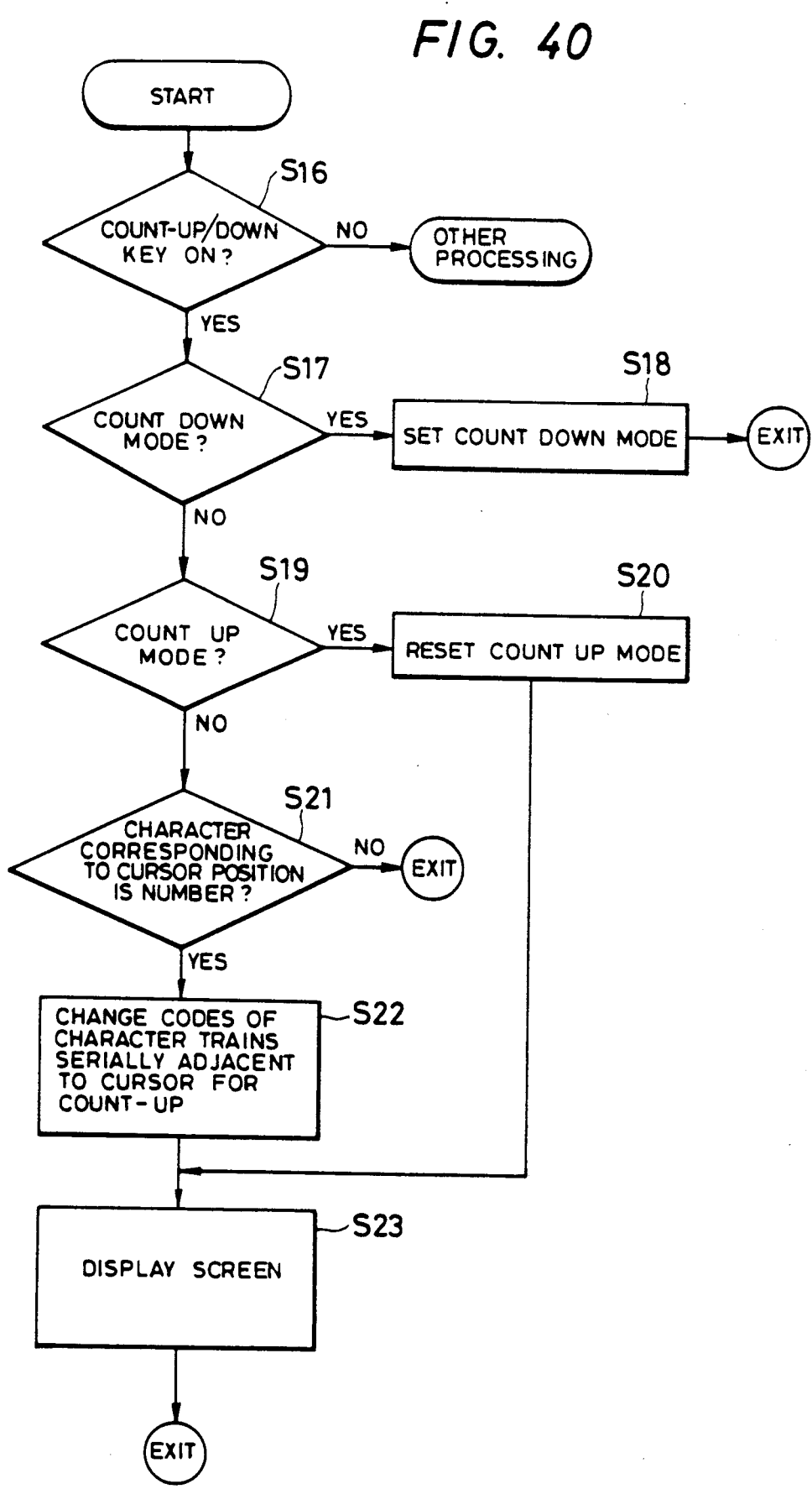

A same control sequence is executed in response to the depression of the count up key 1604 or the count down key 1605. Consequently there will be explained the control sequence when the count up key 1604 is depressed, while making reference to FIG. 40.

If the count up key 1604 is depressed in a display state shown in FIG. 37-2 (S16), the sequence proceeds to a step S21 since neither the count up mode nor the count down mode is designated in the initial state (S17, S19), but no operation is executed as the cursor 1601 is not positioned on a numeral.

For designating the count up mode or the count down mode, the operator moves the cursor 1601, with the cursor moving keys 1603, to the position of the initial value of the number to be counted up or down, as shown in FIG. 37-3.

When the count up key 1604 is depressed in a display state shown in FIG. 37-3, since neither the count up mode nor the count down mode has been designated (S17, S19) and since the cursor 1601 is positioned on the numeral "8" (S11), there is designated the count up mode (S22), by rewriting the numeral codes, corresponding the position of the cursor 1601 and stored in the add-on display RAM 207, into count-up data. In the present embodiment, as the codes 0–147 are used for ordinary character, codes 150–159 are used for count-up data "0", "1", ..., "9" and codes 160–169 are used for count-down data "0", "1", ..., "9".

FIG. 39-2 shows the content of the add-on display RAM 207 after the conversion for the count-up mode. The codes for the numeral "7" at the cursor position and for the numeral "8" at right are changed to the count-up codes "156" and "157". These changes are made only for the internal process, so that it is necessary to inform the operator of the numerals in the count-up mode and those in the count-down mode. Therefore the content of the add-on display RAM 207 after conversion is utilized to display, in reverse state, the numbers in the count up mode or in the count down mode and the count up key 1604 or the count down key 1605 (S23).

Such state is shown in FIG. 37-4, in which the cursor 1601 flashes at a numeral "7" which is in reverse display. The count-up mode can be cancelled by depressing again the count-up key 1604 in the reverse display state (S20), whereby the numerals and the count-up key in reverse display returns to the ordinary display state.

Figure 41:
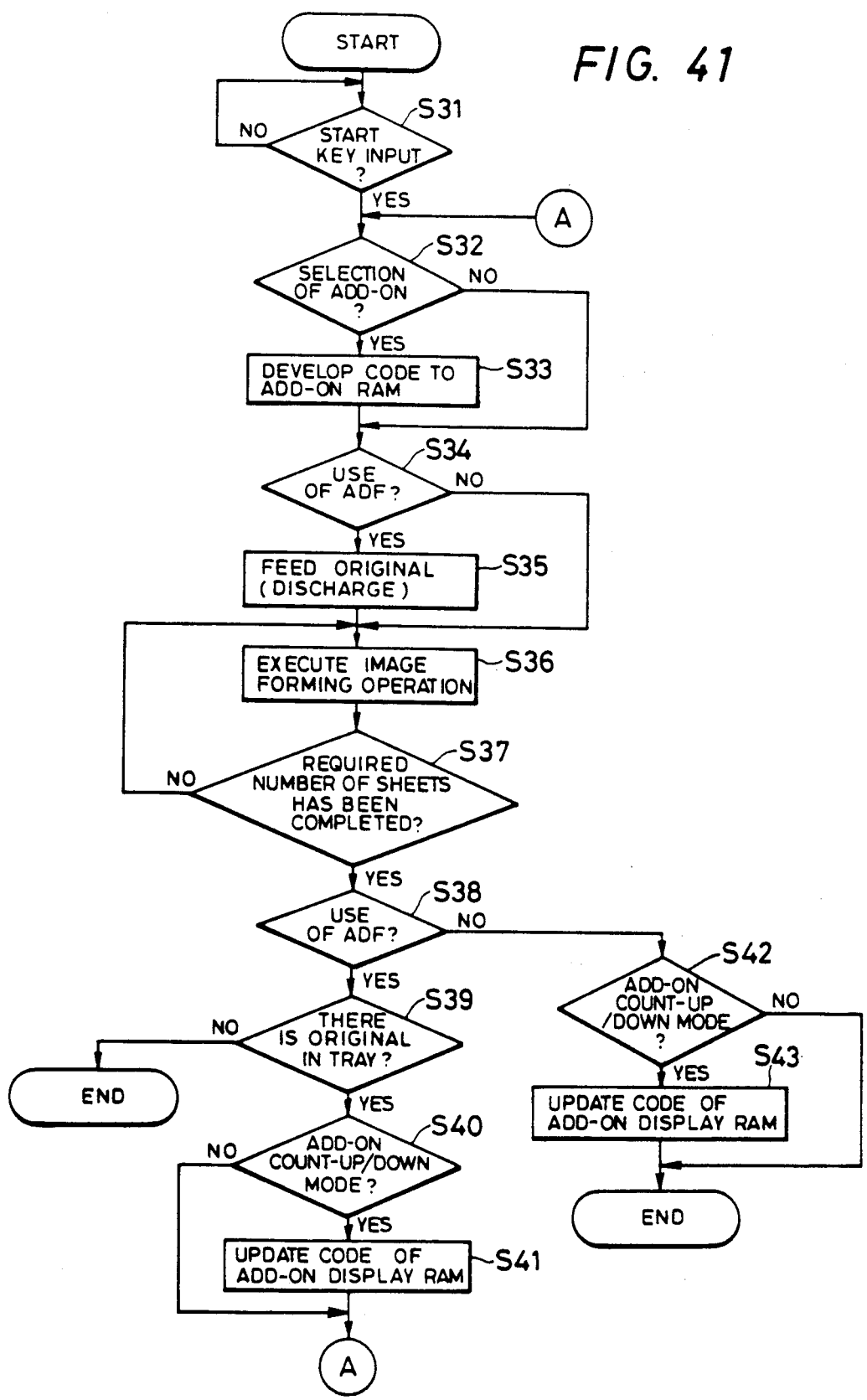

After the setting of the count-up/down mode in this manner, the operator initiates the copying operation by depressing the start key 101. FIG. 41 shows the control sequence of the CPU 210 in said copying operation.

The characters entered as explained above are merely stored in the form of codes in the add-on display RAM 207 and do not have the properties as the image information.

Thus, in response to the actuation of the start key 101 by the operator (S31), the CPU 210 at first discriminates whether the count up mode or the count down mode is selected (S32), and, if selected, reads the font information from the add-on font ROM 208, corresponding to the codes stored in the add-on display RAM 207, and develops said font information in the add-on RAM 205 (S33). In this state the font information of the entered characters are merely arranged in sequential order in the add-on RAM 205, and image information cannot be obtained by direct reading of said add-on RAM 205. Therefore the CPU 210 sets, in the add-on image generating circuit 206, various parameters such as the character size, positional information in the main and sub-scanning directions, thereby enabling to obtain image information by reading the add-on RAM 205 through said generating circuit 206.

Said parameters may be preset in fixed manner or may be set with the operation unit 143 of the editor. After the development of font information in the add-on RAM 205 and the parameter setting in the add-on image generating circuit 206, the CPU 210 discriminates whether a copying operation with the ADF 1001 is instructed (S34).

If such copying operation with the ADF 1001 is instructed, an original is fed from the stacker tray 1311 to the platen 1301 (S35), then the reader 34 repeats the image forming operation by a predetermined number of times, in which the original image is photoelectrically converted by the CCD 201, then subjected to an image processing such as shading correction or gamma correction in the image processing circuit 202, synthesized with the data of the characters from the add-on image generating circuit 206 in the synthesizing circuit 203 and supplied to the printer 204 to obtain the prints of a desired number (S36).

On the other hand, if the ADF 1001 is not used, the image forming operation is repeated for the desired number of copies without the function of the ADF 1001 (S36).

When the image forming operation is repeated for a number of times designated by the numeral keys 105 (S37), the CPU 210 discriminates whether the ADF 1001 is used or not (S38).

If the ADF is used, at first there is discriminated whether another original is present on the stacker tray 1311 (S39), then, if present, there is discriminated whether an add-on count up mode or an add-on count down mode is selected (S40), and, if selected, the count up code or the count down code of the add-on display RAM 207 is increased or decreased by one respectively in the count up mode or the count down mode, thereby renewing the code (S41). Then the sequence proceeds to a step S32 to execute an image forming operation for the next original on the stacker tray of the ADF 1001.

Thus, when the ADF is used, for example initial character "MURAM 178" are set as shown in FIG. 37, and, if the add-on count up mode is selected, the image forming operation is continued until all the original on the stacker tray 1311 are exhausted while increasing or decreasing the count up or down code in the add-on display RAM 207 for every three originals automatically fed as shown in FIG. 36-1 - 3, thereby obtaining the prints as shown in FIG. 36-4 - 6.

On the other hand, in a copying operation without the ADF 1001, after the completion of copying operation of a desired number (S37), there is discriminated whether the add-on count up or down mode is selected (S42), and, if selected, the count up or down code in the add-on display RAM 207 is increased or decreased by one respectively in the count up or down mode, thereby renewing the code (S43). Then the image forming operation is terminated, and the sequence awaits the next actuation of the start key 101 by the operator.

Thus, if the ADF 1001 is not used, an original set on the platen 1301 by the operator is copied for a desired number of times, then the count up or down code of the add-on display RAM 207 is renewed, and the sequence stops in a state capable of printing the image of an original set by the operator, with the add-on of a number increased or decreased by one. Then, in response to the next actuation of the start key 101, the renewed number of the add-on display RAM 207 is synthesized with the original image.

Consequently, in case the ADF 1001 is not used, the prints shown in FIG. 36-4 - 6 can be obtained by the manual setting of the originals of FIG. 36-1 - 3 on the platen 1301 and the actuation of the start key 101 for each original.

As explained in the foregoing, the number information to be synthesized with the original image can be automatically increased or decreased without the setting of the number information by the operator for each original.

Though the foregoing embodiments have been limited to a copying apparatus in which the original is photoelectrically read, the present invention is also applicable to a copying apparatus in which the copying operation is achieved by projecting the original image directly onto a photosensitive member. Also instead of increasing or decreasing the number information to be synthesized by one, it is also possible to effect an increase or a decrease by a desired number, and it is furthermore possible to automatically renew character information such as alphabetic characters instead of the numbers.

The present invention is not limited to the foregoing embodiments but is subject to various modifications within the scope and spirit of the appended claims.

We claim:

1. An image synthesizing apparatus comprising:
   means for exposure of an original;
   image forming means;
   a digitizer having an array of plural characters to be synthesized with the image of the original exposed by said exposure means;
   means for designating the characters on said digitizer; and
   control means for causing said image forming means to form an image on a recording material by synthesizing the characters designated by said designating means and the image of the original.

2. An image synthesizing apparatus according to claim 1, further comprising means for informing said control means that a character has been designated by said designating means.

3. An image synthesizing apparatus according to claim 1, further comprising a memory storing data indicating the characters arranged on said digitizer.

4. An image synthesizing apparatus according to claim 1, wherein said digitizer comprises means for entering coordinates of an area relating to the formation of the original image.

5. An image synthesizing apparatus according to claim 1, further comprising means for displaying characters designated by said designating means.

6. An image synthesizing apparatus according to claim 1, wherein said designating means comprises means adapted to be pressed for designating the characters on said digitizer.

7. An image synthesizing apparatus comprising:
   means for exposure of an original;
   output means for outputting an electric signal indicative of an image of the original exposed by said exposure means;
   means for providing a character;
   image forming means for forming an image on a recording material on the basis of the electrical signal output from said output means, wherein said image forming means synthetically forms both the image of the original and the character provided by said providing means;
   first setting means for setting an image formation mode for use by said image forming means in forming the image of the original; and
   second setting means for setting an image formation mode of the character regardless of the image formation mode set by said first setting means.

8. An image synthesizing apparatus according to claim 7, wherein said first setting means sets an image formation density of the original, and said second setting means sets an image formation density of the character.

9. An image synthesizing apparatus according to claim 8, wherein said image forming means is adapted to achieve image formation utilizing the original image or an image of a predetermined density as the background for the character.

10. An image synthesizing apparatus according to claim 7, wherein said first setting means sets an image formation size of an original, and said second setting means sets an image formation size of the character.

11. An image synthesizing apparatus according to claim 10, wherein said image forming means is adapted to vary the size of the character by controlling provision of character data from said providing means.

12. An image synthesizing apparatus according to claim 7, wherein said second setting means sets a direction in which characters of a sequence of characters from said providing means are to be arranged on the recording material.

13. An image synthesizing apparatus according to claim 12, wherein said second setting means sets the direction to be either horizontal or vertical.

14. An image synthesizing apparatus according to claim 7, further comprising a digitizer for designating characters to be provided from said providing means, wherein said digitizer is provided with an array of plural characters.

15. An image synthesizing apparatus according to claim 7, wherein said first setting means sets an image formation position of an original, and said second setting means sets an image formation position of a character.

16. An image synthesizing apparatus according to claim 15, further comprising means for providing an indication that the output position set by said second setting means is inadequate.

17. An image synthesizing apparatus according to claim 7, further comprising means for arbitrarily generating character patterns.

18. An image synthesizing apparatus according to claim 17, further comprising means for storing the character patterns generated by said means for arbitrarily generating character patterns.

19. An apparatus according to claim 7, wherein said signal providing means reads out a character from a memory in which the character has been stored.

20. An image synthesizing apparatus comprising:
means for transporting plural originals, one by one, to an exposure position;
means for exposing the originals transported to said exposure position;
a memory storing character data; and
means for forming an image on a recording material by synthesizing the image of an exposed original and character data read from said memory,
wherein said image forming means renews the character data when the original is exchanged by the transport means, and arbitrarily setting the initial data to be renewed.

21. An image synthesizing apparatus according to claim 19, further comprising means for setting the characters to be renewed and those not to be renewed, in a different manner.

22. An image synthesizing apparatus according to claim 20, wherein said characters include numbers, and further comprising means for the up-count or the down-count of said numbers.

23. An image synthesizing apparatus comprising:
means for exposing an original;
means for generating pattern data;
means for setting a desired image processing mode in which an image of the original exposed by said exposing means is processed;
means for synthesizing the image of the original to be processed in the image processing mode set by said setting means and the pattern data generated by said generating means; and
control means for controlling the size or synthesis position of the pattern data to be synthesized by said synthesizing means according to the image processing mode set by said setting means.

24. An image synthesizing apparatus according to claim 23, wherein said control means is adapted to control the generation of pattern data from said generating means.

25. An image synthesizing apparatus according to claim 23, wherein said control means is adapted to control the output area of the pattern data.

26. An image synthesizing apparatus according to claim 23, wherein said setting means sets a reproduction magnification of the image of the original.

27. An image synthesizing apparatus according to claim 23, wherein said generating means is adapted to generate a shade pattern.

28. An image synthesizing apparatus according to claim 23, wherein said setting means sets a reproduction position of the image of the original.

29. An image synthesizing apparatus according to claim 23, further comprising means for displaying the pattern data to be synthesized by said synthesizing means.

30. An image synthesizing apparatus comprising:
exposure means for exposing an original;
image forming means for forming on a recording material an image of the original exposed by said exposure means;
character providing means for providing a character array including at least a single character; and
character pattern producing means for arbitrarily producing a contructional pattern of a character,
wherein said image forming means forms an image by synthesizing the image of the original and a character array including the character arbitrarily produced by said character pattern producing means.

31. An apparatus according to claim 30, wherein said character providing means reads out a character from a memory in which at least a single character has been stored.

32. An apparatus according to claim 30, further comprising a memory for storing a character produced by said character pattern producing means.

33. An apparatus according to claim 32, wherein said memory is capable of storing a plurality of characters produced by said character pattern producing means.

34. An apparatus according to claim 33, further comprising an input means for selecting characters corresponding to respective characters stored in said memory.

35. An apparatus according to claim 30, further comprising display means for displaying a character produced by said character pattern producing means.

36. An image synthesizing apparatus comprising:
exposure means for exposing an original;
image forming means for forming on a recording material an image of the original exposed by said exposure means;
signal providing means for providing an electric signal indicative of a pattern image with repetition of a predetermined pattern; and
control means for controlling repeated provision of the electric signal from said providing means such that the pattern image and the image of the original are synthesized at a predetermined area of the original,
wherein said image forming means forms the pattern image on the recording material on the basis of the electric signal repeatedly provided by said signal providing means.

37. An image synthesizing apparatus according to claim 30, wherein said character pattern producing means produces a dot pattern of character.

38. An apparatus according to claim 36 wherein said signal providing means reads out the pattern image from a memory in which the pattern image has been stored.

39. An apparatus according to claim 36, wherein said image forming means synthetically forms the pattern image at an entire area of original image designated by said designating means.

40. An apparatus according to claim 36, further pattern image producing means for arbitrarily producing the pattern image.

41. An apparatus according to claim 40, further comprising a memory for storing the pattern image arbitrarily produced by said pattern image producing means.

42. An apparatus according to claim 36, wherein said signal providing means is capable of providing a plurality of types of electric signals each indicative of a different pattern image, and includes selecting means for selecting a desired pattern image.

43. An apparatus according to claim 36, further comprising display means for displaying the pattern image.

44. An apparatus according to claim 36, further comprising adjustment means for adjusting a density of pattern image formed by said image forming means.

45. An apparatus according to claim 36, further comprising means for changing a size of the pattern.

46. An image synthesizing apparatus according to claim 36, further comprising means for designating a desired area in the original.

47. An image synthesizing apparatus comprising:
exposure means for exposure of an original;
character providing means for providing a character;
image forming means for forming on a recording material an image of the original exposed by said exposure means, wherein said image forming means synthetically forms both the image of the original and the character provided by said character providing means;
first setting means for setting an image formation density of the image of the original formed by said image forming means; and
second setting means for setting an image formation density of the character regardless of the image formation density set by said first setting means.

48. An apparatus to claim 47, wherein said character providing means reads out a character from a memory in which the character has been stored.

49. An apparatus according to claim 47, further comprising a digitizer for designating characters to be provided from said character providing means, wherein said digitizer is provided with an array of plural characters.

50. An image synthesizing apparatus comprising:
exposure means for exposure of an original;
character providing means for providing a character;
image forming means for forming on a recording material an image of the original exposed by said exposure means, wherein said image forming means synthetically forms both the image of the original and the character provided by said character providing means;
first setting means for setting an image formation size of the image of the original formed by said image forming means; and
second setting means for setting an image formation size of the character regardless of the image formation size of set by said first setting means.

51. An apparatus according to claim 50, wherein said character providing means reads out a character from a memory in which the character has been stored.

52. An apparatus according to claim 50, further comprising a digitizer for designating characters to be provided from said character providing means, wherein said digitizer is provided with an array of plural characters.

* * * * *

UNITED STATES PATENT AND TRADEMARK OFFICE
CERTIFICATE OF CORRECTION

PATENT NO. : 4,989,042
DATED : January 29, 1991
INVENTOR(S) : MASANORI MURAMATSU, ET AL.

It is certified that error appears in the above-identified patent and that said Letters Patent is hereby corrected as shown below:

SHEET 20 OF 51

Figure 14A:
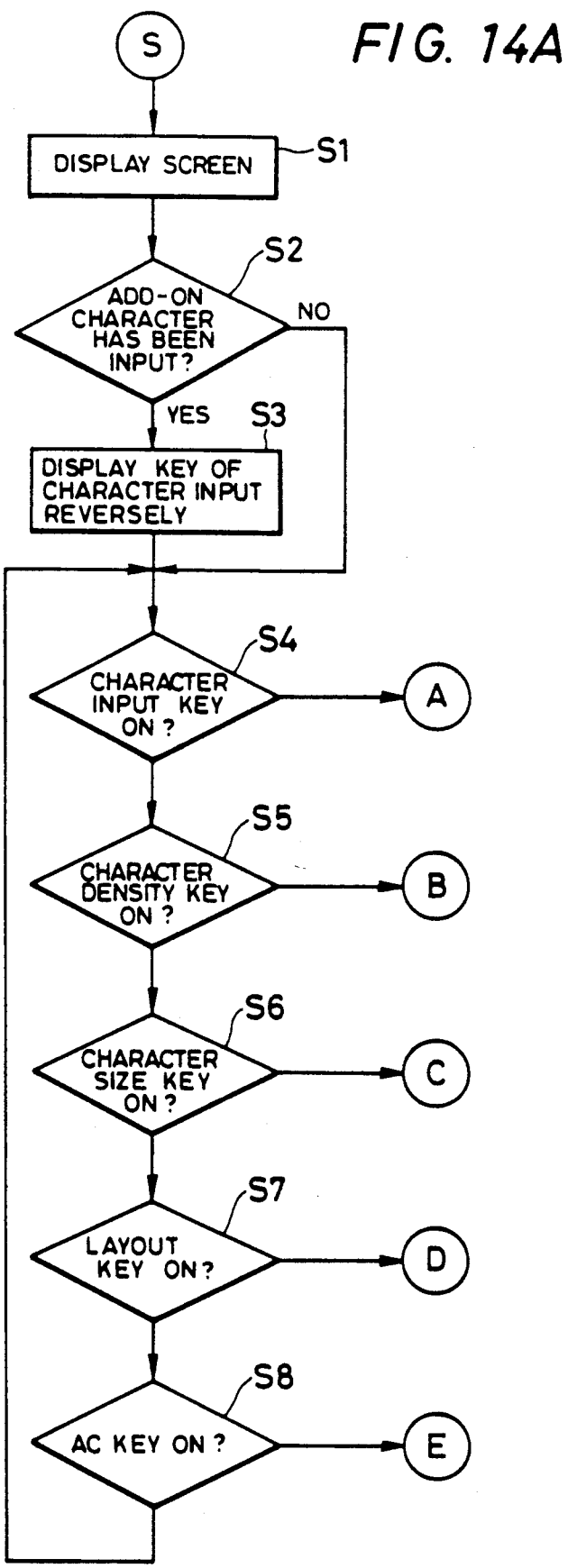
FIGS. 14A to 14H and 24 are flow charts showing control sequences of the CPU.
Figure 14B:
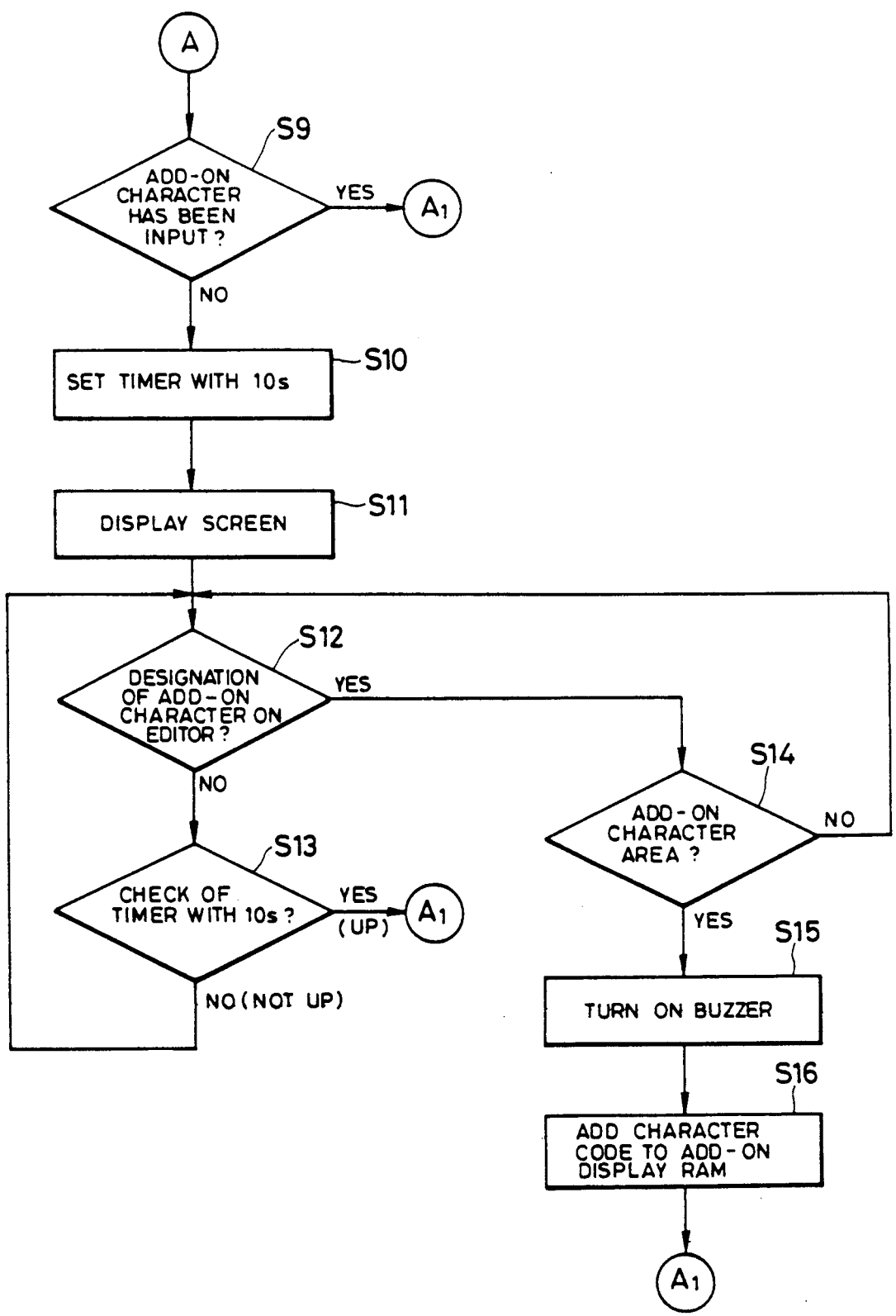
Figure 14C:
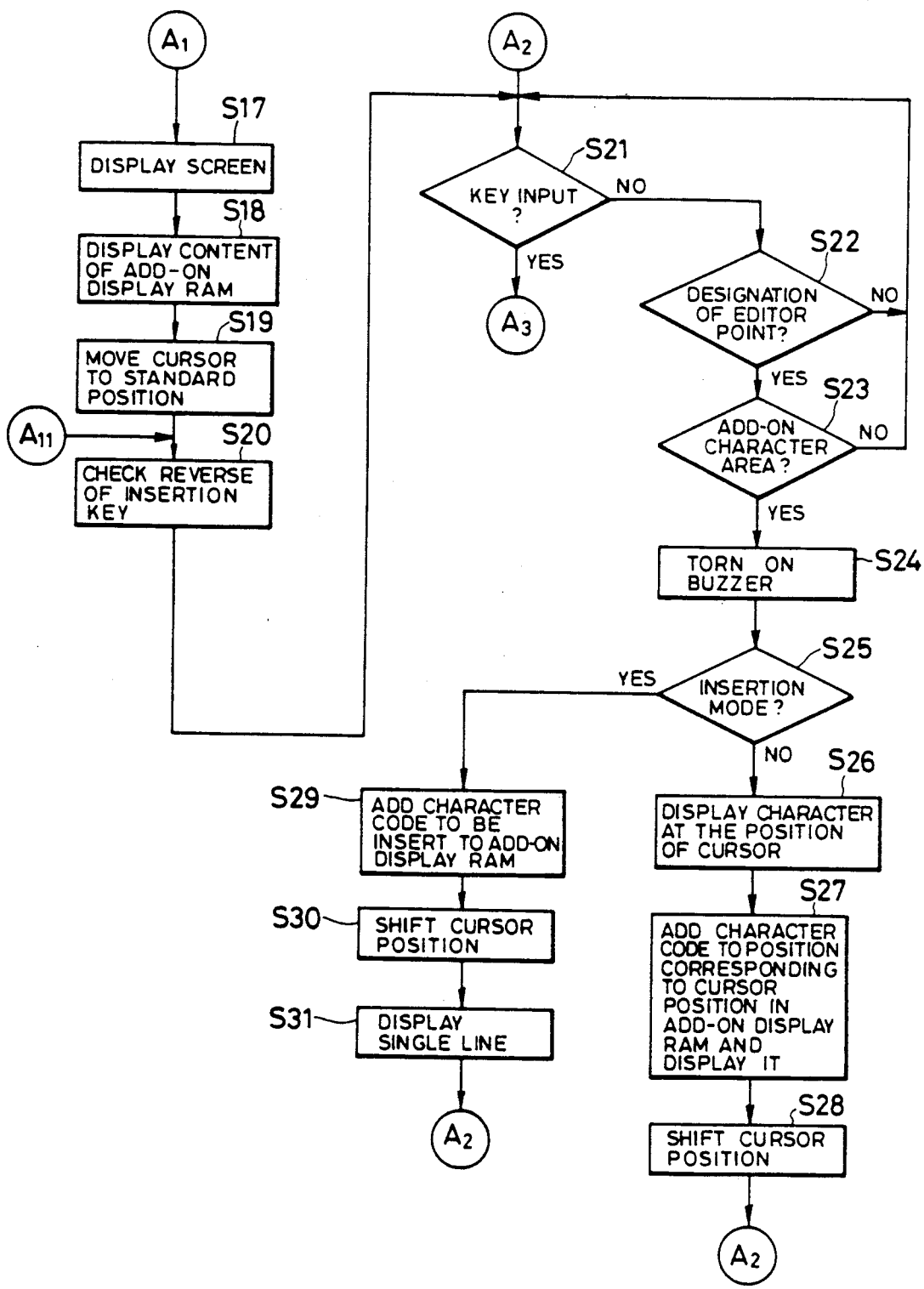
Figure 14D:
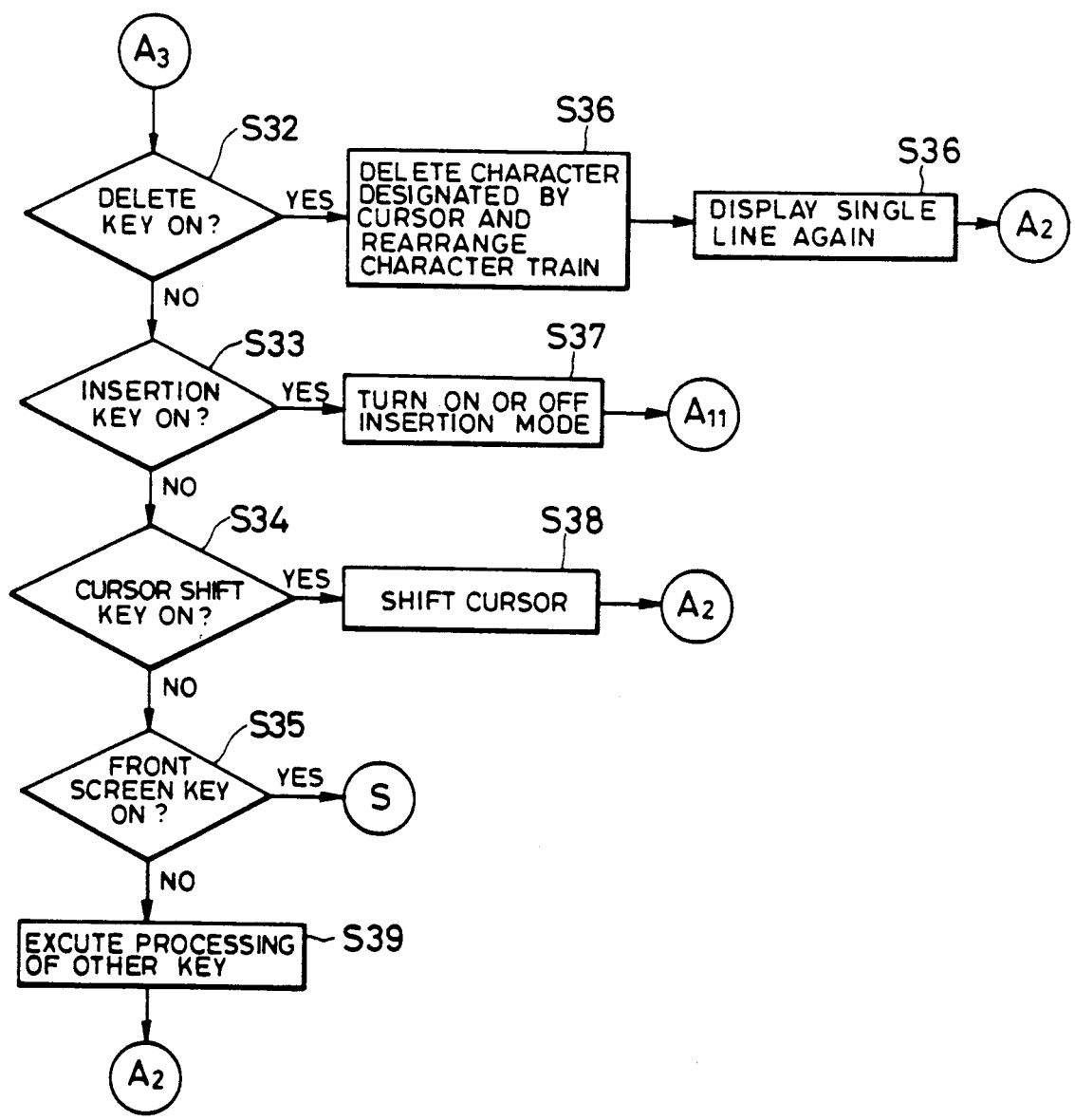
Figure 14E:
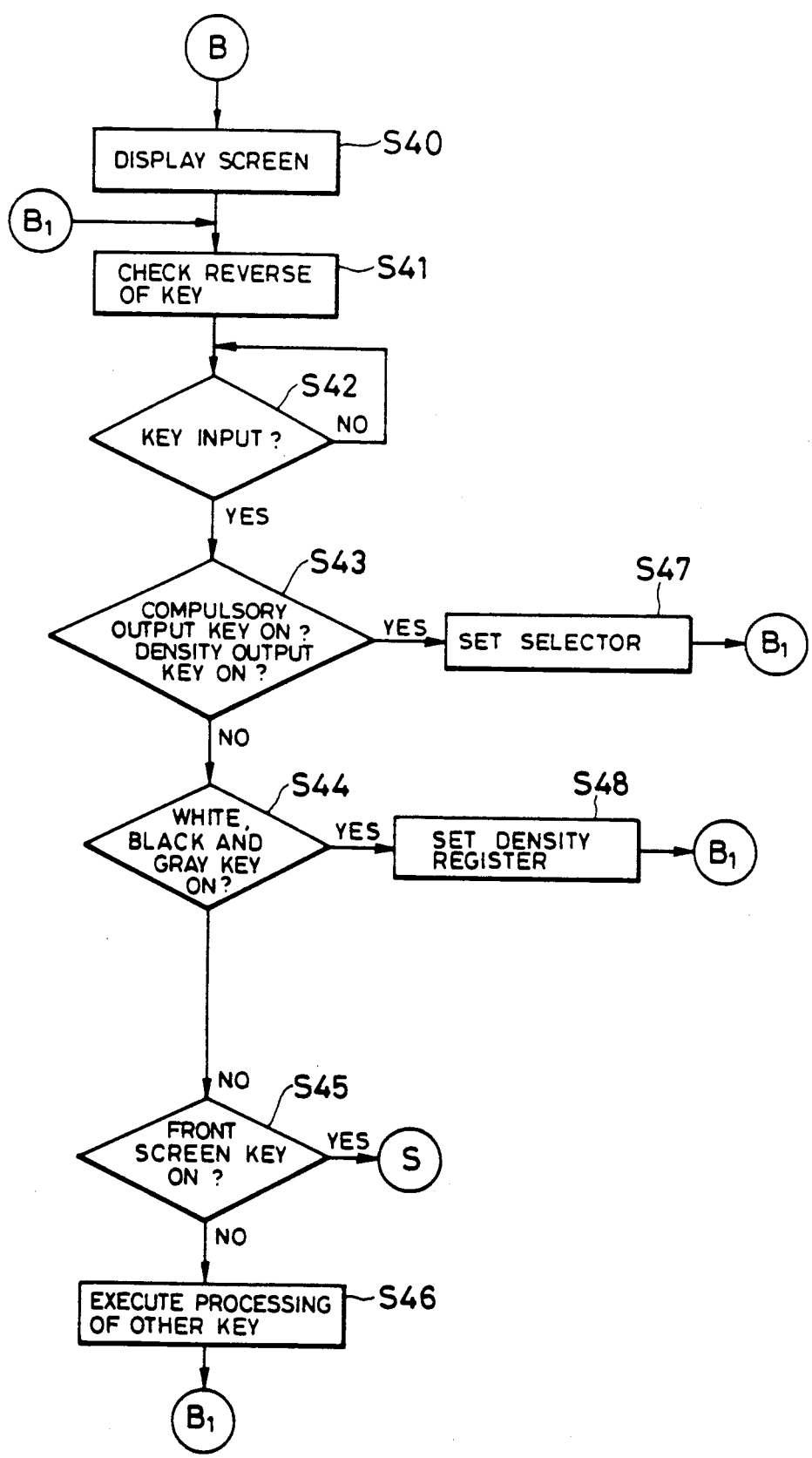
Figure 14F:
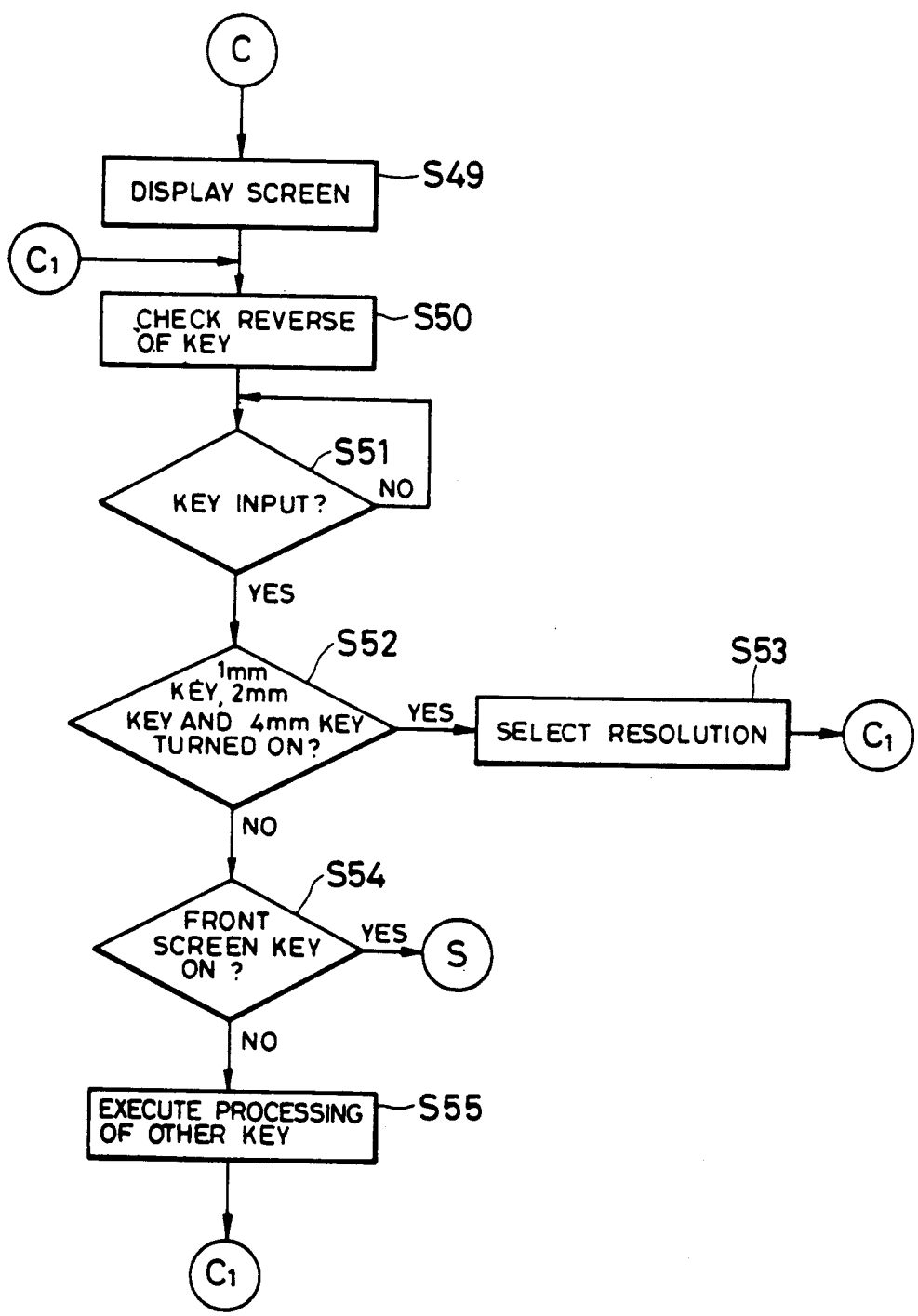
Figure 14G:
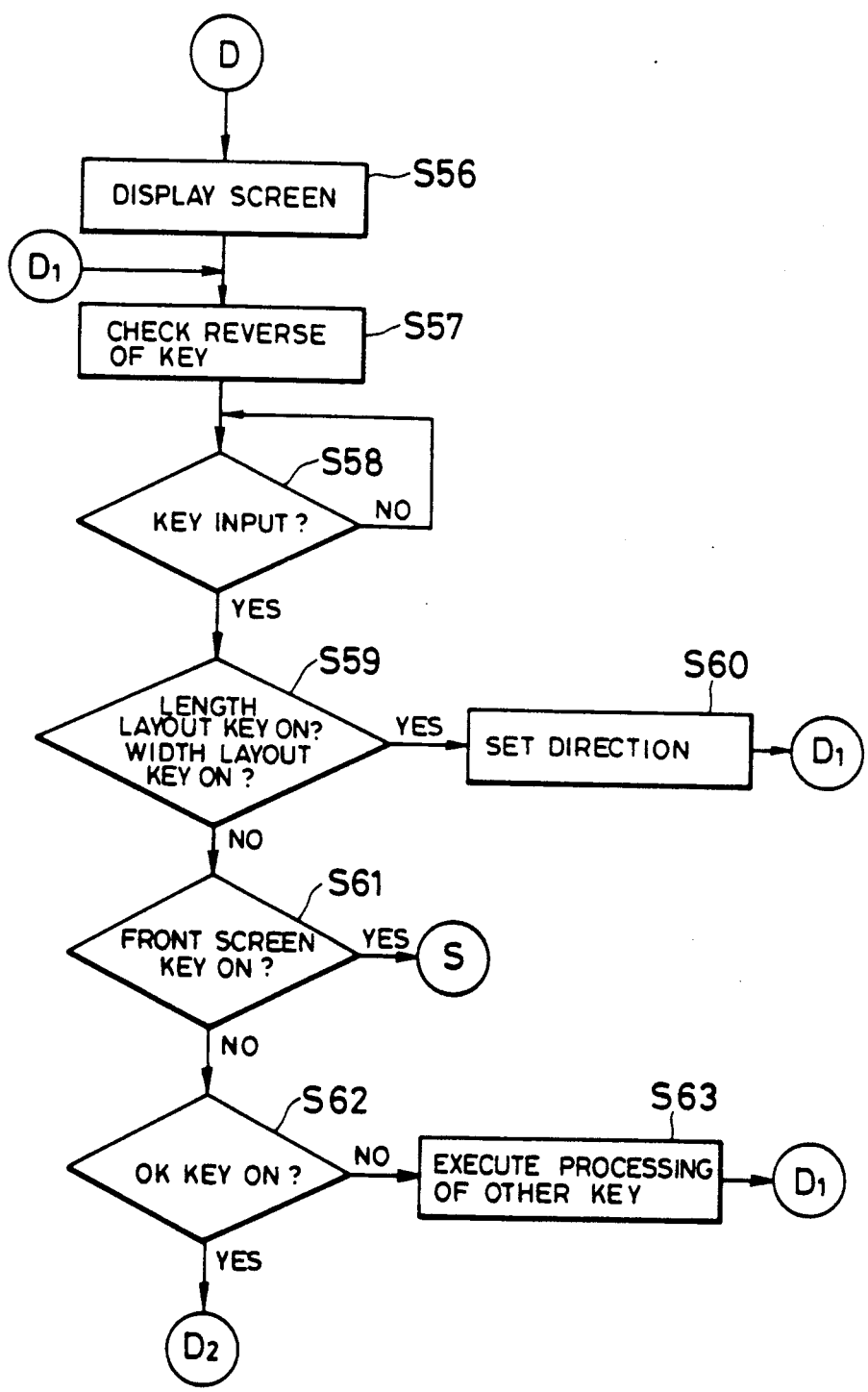
Figure 14H:
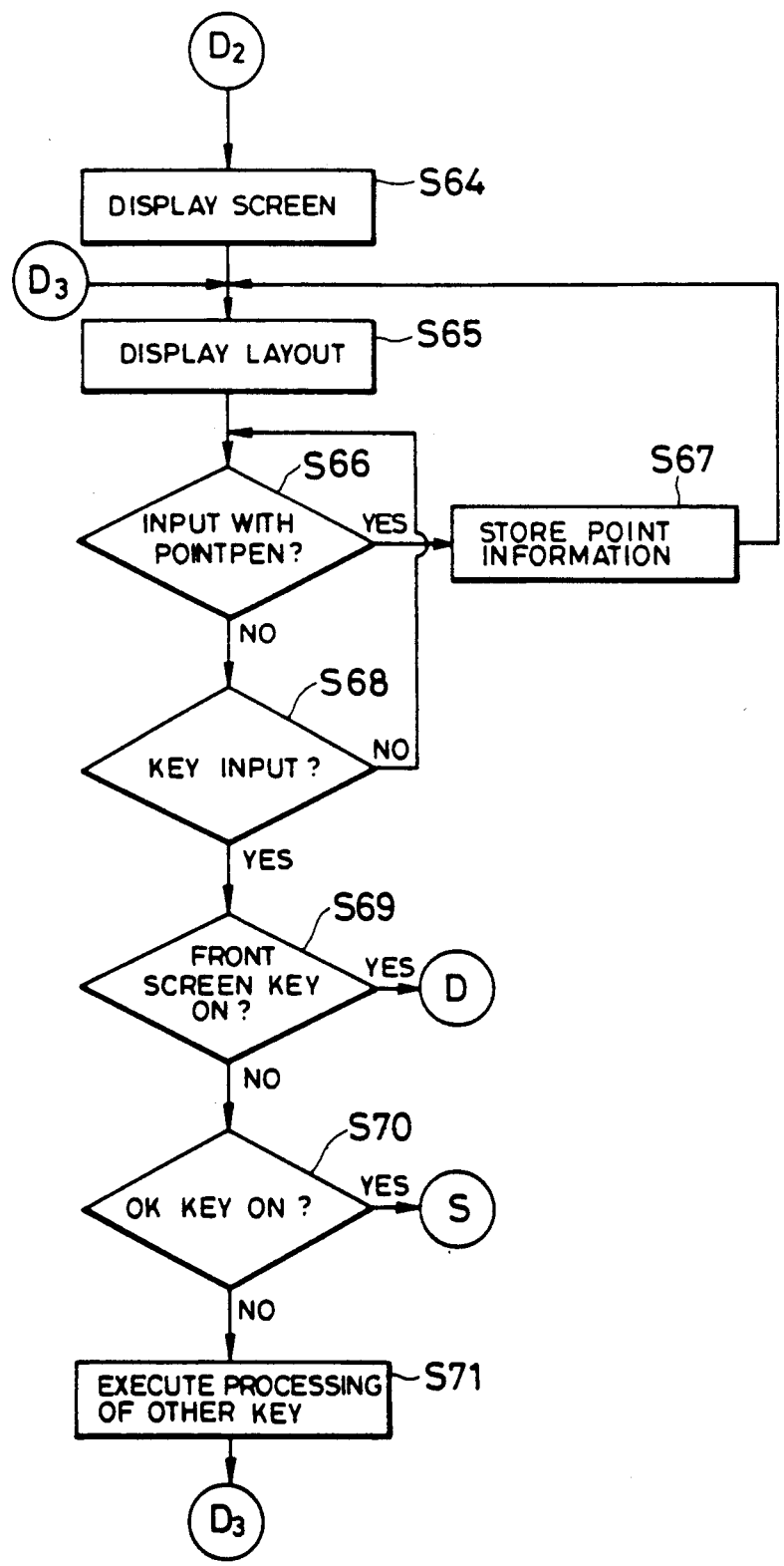

FIG. 14C, "TORN ON BUZZER" should read --TURN ON BUZZER--.

SHEET 39 OF 51

Figure 29:
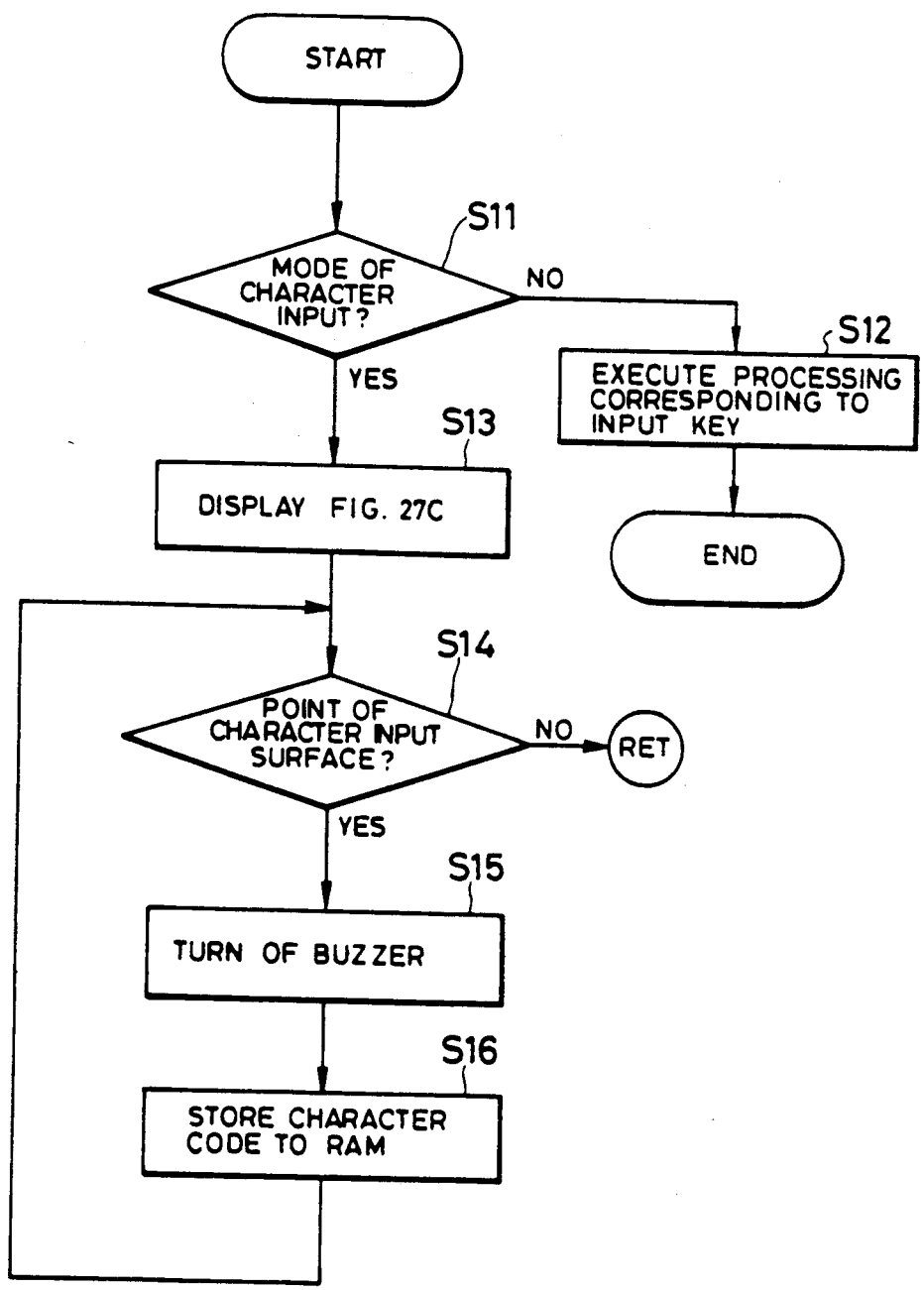
FIG. 29 is a flow chart showing the sequence of character input.

FIG. 29, "TURN OF BUZZER" should read --TURN OFF BUZZER--.

COLUMN 2

Line 40, "stat of" should read --states of--.
    Line 49, "FIGS. 27A to 27C" should read --FIGS. 27A to 27O--.

COLUMN 3

Line 18, "there against" should read --thereagainst--.

COLUMN 4

Line 39, "displays" should read --display--.

COLUMN 5

Line 37, "etc. are" should read --etc., are--.

COLUMN 6

Line 7, "and" should read --an--.
    Line 49, "displayed" should read --display--.
    Line 61, "buzzer 39" should read --buzzer--.

UNITED STATES PATENT AND TRADEMARK OFFICE
CERTIFICATE OF CORRECTION

PATENT NO. : 4,989,042
DATED : January 29, 1991
INVENTOR(S) : MASANORI MURAMATSU, ET AL.

It is certified that error appears in the above-identified patent and that said Letters Patent is hereby corrected as shown below:

COLUMN 7

Line 24, "etc. in" should read --etc., in--.
    Line 30, "add-on RAm 205" should read --add-on RAM 205--.

COLUMN 9

Line 57, "shaft data" should read --shift data--.

COLUMN 11

Line 53, Close up right margin.
    Line 54, Close up left margin.

COLUMN 12

Line 3, Italics should be deleted.
    Line 4, Italics should be deleted.
    Line 68, Close up right margin.

COLUMN 13

Line 1, Close up left margin.
    Line 2, "OFFH OOH" should read --OFFH, OOH--.

COLUMN 14

Line 5, "etc. to" should read --etc., to--.
    Line 8, "etc. are" should read --etc., are--.
    Line 68, "add-on RAM" should read --add-on RAM 205--.

UNITED STATES PATENT AND TRADEMARK OFFICE
CERTIFICATE OF CORRECTION

PATENT NO. : 4,989,042
DATED : January 29, 1991
INVENTOR(S) : MASANORI MURAMATSU, ET AL.

It is certified that error appears in the above-identified patent and that said Letters Patent is hereby corrected as shown below:

COLUMN 16

Line 57, "resolution counter 416" should read --resolution counter 414--.
    Line 30, "in case" should read --in a case--.
    Line 39, "414 Thus" should read --414. Thus--.
    Line 66, "a" should read --an-- and "FIG. 12C;" should read --FIG. 20C;--.

COLUMN 17

Line 25, "add" should read --adds--.

COLUMN 18

Line 18, "16 character" should read --16 characters--.
    Line 47, "buzzer 39" should read --buzzer--.

COLUMN 20

Line 26, "select" should read --selects--.
    Line 40, "FIG. 270" should read --FIG. 270--.

COLUMN 21

Line 5, "add-on image generating 206" should read --add-on image generating circuit 206--.
    Line 65, "FIG. 27C and" should read --FIG. 27C) and--.

UNITED STATES PATENT AND TRADEMARK OFFICE
CERTIFICATE OF CORRECTION

PATENT NO. : 4,989,042
DATED : January 29, 1991
INVENTOR(S) : MASANORI MURAMATSU, ET AL.

It is certified that error appears in the above-identified patent and that said Letters Patent is hereby corrected as shown below:

COLUMN 22

Line 52, "FIG. 23-2." should read --FIG. 33-2.--.

COLUMN 23

Line 39, "develop" should read --developing--.
    Line 59, "in case" should read --in a case--.

COLUMN 24

Line 4, "is" should be deleted.

COLUMN 25

Line 60, "intermediate tray 141," should read --intermediate tray 1414,--.

COLUMN 27

Line 1, "buzzer 39" should read --buzzer--.

COLUMN 29

Line 5, Close up right margin.
    Line 6, Close up left margin.
    Line 9, "nal" should read --nals--.

UNITED STATES PATENT AND TRADEMARK OFFICE
CERTIFICATE OF CORRECTION

PATENT NO. : 4,989,042
DATED : January 29, 1991
INVENTOR(S) : MASANORI MURAMATSU, ET AL.

It is certified that error appears in the above-identified patent and that said Letters Patent is hereby corrected as shown below:

COLUMN 31

Line 34, "setting" should read --sets--.
    Line 37, "claim 19," should read --claim 20,-- and "setting" should read --designating--.
    Line 43, "the up-count or the down-" should read --counting--.
    Line 44, "count of said" should read --the--.

COLUMN 32

Line 19, "contructional" should read --constructional--.
    Line 61, "claim 36" should read --claim 36,--.
    Line 65, "claim 36," should read --claim 46,--.

COLUMN 33

Line 1, "further pat-" should read --further comprising pat- --.

UNITED STATES PATENT AND TRADEMARK OFFICE
CERTIFICATE OF CORRECTION

PATENT NO. : 4,989,042

DATED : January 29, 1991

INVENTOR(S) : MASANORI MURAMATSU, ET AL.

It is certified that error appears in the above-identified patent and that said Letters Patent is hereby corrected as shown below:

COLUMN 34

Line 4, "apparatus to" should read --apparatus according to--.
Line 26, "of" should be deleted.

Signed and Sealed this

Twelfth Day of January, 1993

Attest:

DOUGLAS B. COMER

Attesting Officer

Acting Commissioner of Patents and Trademarks